(12) United States Patent
Adachi et al.

(10) Patent No.: US 7,725,809 B2
(45) Date of Patent: May 25, 2010

(54) SIGNAL QUALITY EVALUATION DEVICE, INFORMATION READ/WRITE DEVICE, SIGNAL QUALITY EVALUATION METHOD, WRITE CONDITIONS DETERMINING METHOD, SIGNAL QUALITY EVALUATION COMPUTER PROGRAM, COMPUTER-READABLE STORAGE MEDIUM CONTAINING SIGNAL QUALITY EVALUATION COMPUTER PROGRAM

(75) Inventors: Yoshihisa Adachi, Kyoto (JP); Atsushi Etoh, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1123 days.

(21) Appl. No.: 11/366,125

(22) Filed: Feb. 28, 2006

(65) Prior Publication Data
US 2006/0193406 A1    Aug. 31, 2006

(30) Foreign Application Priority Data
Feb. 28, 2005    (JP)    ............................. 2005-054721
Jan. 16, 2006    (JP)    ............................. 2006-008014

(51) Int. Cl.
*H03M 13/03* (2006.01)
(52) U.S. Cl. ................ 714/795; 714/715; 714/E11.177; 370/332; 370/333
(58) Field of Classification Search ................. 714/795, 714/715, E11.177; 370/332, 333
See application file for complete search history.

(56) References Cited

U.S. PATENT DOCUMENTS

| | | | |
|---|---|---|---|
| 5,916,537 A | 6/1999 | Kajiwara et al. | |
| 5,924,995 A | 7/1999 | Klein et al. | |
| 5,938,791 A | 8/1999 | Narahara | |
| 6,031,228 A | 2/2000 | Abramson | |
| 6,355,416 B1 | 3/2002 | Abramson | |
| 6,642,059 B2 | 11/2003 | Chait et al. | |

(Continued)

FOREIGN PATENT DOCUMENTS

JP    2001-209941    8/2001

(Continued)

OTHER PUBLICATIONS

Perkins et al., "A Window-Margin-Like Procedure for Evaluating PRML Channel Performance," IEEE Transactions on Magnetics 31(2): 1109-1114 (1995).

(Continued)

*Primary Examiner*—Scott T Baderman
*Assistant Examiner*—Enam Ahmed
(74) *Attorney, Agent, or Firm*—David G. Conlin; Steven M. Jensen; Edwards Angell Palmer & Dodge LLP

(57) ABSTRACT

A Viterbi decoding circuit performs Viterbi decoding on the basis of a reproduced signal obtained by reading an optical disc. A decoded bit sequence is fed to a first specific pattern detection circuit and a first reverse pattern detection circuit. A path metric difference $\Delta M$ is fed to a reproduced signal evaluation circuit. The reproduced signal evaluation circuit extracts path metric differences for a specific pattern and a reverse pattern detected by the first specific pattern detection circuit and the first reverse pattern detection circuit and evaluates the reproduced signal on the basis of results. The evaluation uses not only the bit sequence for which the ideal SAM value is a minimum. The invention achieves accurate evaluation for reproduction.

46 Claims, 37 Drawing Sheets

U.S. PATENT DOCUMENTS

| | | |
|---|---|---|
| 6,680,203 B2 | 1/2004 | Dasseux et al. |
| 6,808,875 B2 | 10/2004 | Hellerstein |
| 6,835,927 B2 | 12/2004 | Becker et al. |
| 6,876,611 B1 | 4/2005 | Adachi |
| 6,902,719 B2 | 6/2005 | Wagner |
| 6,906,320 B2 | 6/2005 | Sachs et al. |
| 7,001,587 B2 | 2/2006 | Hellerstein |
| 7,022,834 B2 | 4/2006 | Hellerstein |
| 7,048,907 B2 | 5/2006 | Groman et al. |
| 7,057,168 B2 | 6/2006 | Miller et al. |
| 7,084,396 B2 | 8/2006 | Schneider |
| 2003/0090980 A1 | 5/2003 | Kashihara et al. |
| 2003/0119069 A1 | 6/2003 | Schneider et al. |
| 2003/0211036 A1 | 11/2003 | Degani et al. |
| 2004/0121305 A1 | 6/2004 | Wiegand et al. |
| 2004/0191916 A1 | 9/2004 | Gross et al. |
| 2005/0014181 A1 | 1/2005 | Galis et al. |
| 2005/0092910 A1 | 5/2005 | Geromanos et al. |
| 2005/0118724 A1 | 6/2005 | Bateman et al. |
| 2005/0135212 A1 | 6/2005 | Adachi |
| 2005/0153346 A1 | 7/2005 | Schneider |
| 2005/0175982 A1 | 8/2005 | Iwatani et al. |
| 2005/0193318 A1* | 9/2005 | Okumura et al. ............ 714/795 |
| 2005/0202406 A1 | 9/2005 | Hellerstein |
| 2005/0221278 A1 | 10/2005 | Iwatani et al. |
| 2005/0238577 A1 | 10/2005 | Hellerstein |
| 2005/0281745 A1 | 12/2005 | Lee et al. |
| 2006/0015797 A1 | 1/2006 | Miyaoka |
| 2006/0020440 A1 | 1/2006 | Hellerstein |
| 2006/0094057 A1 | 5/2006 | Hellerstein |
| 2006/0100903 A1 | 5/2006 | Lee et al. |
| 2006/0105322 A1 | 5/2006 | Iwatani et al. |
| 2006/0105339 A1 | 5/2006 | Hellerstein |
| 2006/0120961 A1 | 6/2006 | Schneider et al. |
| 2006/0203679 A1 | 9/2006 | Kashihara et al. |
| 2006/0204439 A1 | 9/2006 | Hellerstein |
| 2006/0251576 A1 | 11/2006 | Hellerstein |
| 2006/0280682 A1 | 12/2006 | Hellerstein |

FOREIGN PATENT DOCUMENTS

| | | |
|---|---|---|
| JP | 2003-151219 | 5/2003 |
| JP | 2004-213759 | 7/2004 |
| JP | 2004-273078 | 9/2004 |
| JP | 2005-332437 | 12/2005 |
| WO | WO 2006/050130 A2 | 5/2006 |
| WO | WO 2006/081521 A2 | 8/2006 |
| WO | WO 2006/107814 A2 | 10/2006 |

OTHER PUBLICATIONS

Bier, D. M. (Nov. 1987). "The Use of Stable Isotopes in Metabolic Investigation," *Balliere's Clinical Endocrinology and Metabolism* 1(4):817-836.

Lefebvre, P. J. (Jan. 1979). "Naturally Labeled 13C-Glucose: A New Tool to Measure Oxidation Rates of Exogenous Glucose," *Diabetes* 28(Suppl. 1):63-65.

Maric, D. et al. (2000). "Functional Ionotropic Glutamate Receptors Emerge During Terminal Cell Division and Early Neuronal Differentiation of Rat Neuroepithelial Cells," *Journal of Neuroscience Research* 61(6):652-662.

Royale, G. T. et al. (1981). "Techniques for Investigating Substrate Metabolism in Patients," *Annals of the Royal College of Surgeons of England* 63:415-419.

Schneiter, P. et al. (1998). "Kinetics of Dexamethasone Induced Alterations of Glucose Metabolism in Healthy Humans," *American Journal of Physiology*, pp. E806-E813.

Supplementary Partial European Search Report mailed Sep. 22, 2006, for European patent application No. EP 03768624.3, filed Nov. 4, 2003, 4 pages.

U.S. Office Action mailed on Aug. 24, 2006, for U.S. Appl. No. 10/407,435, filed Apr. 4, 2003, 9 pages.

U.S. Office Action mailed on Aug. 8, 2006, for U.S. Appl. No. 10/519,121, filed Dec. 23, 2004, 8 pages.

U.S. Office Action mailed on Jan. 11, 2007, for U.S. Appl. No. 10/963,967, filed Oct. 12, 2004, 6 pages.

U.S. Office Action mailed on Jan. 19, 2007, for U.S. Appl. No. 10/872,280, filed Jun. 17, 2004, 5 pages.

U.S. Office Action mailed on Jan. 24, 2007, for U.S. Appl. No. 10/701,990, filed Nov. 4, 2003, 6 pages.

U.S. Office Action mailed on Jan. 31, 2007, for U.S. Appl. No. 11/078,083, filed Mar. 11, 2005, 16 pages.

U.S. Office Action mailed on Jul. 21, 2006, for U.S. Appl. No. 10/963,967, filed Oct. 12, 2004, 7 pages.

U.S. Office Action mailed on Jun. 20, 2005, for U.S. Appl. No. 10/872,280, filed Jun. 17, 2004, 9 pages.

U.S. Office Action mailed on Jun. 9, 2006, for U.S. Appl. No. 10/872,280, filed Jun. 17, 2004, 6 pages.

U.S. Office Action mailed on Mar. 30, 2006, for U.S. Appl. No. 10/664,513, filed Sep. 16, 2003, 15 pages.

U.S. Office Action mailed on May 17, 2007, for U.S. Appl. No. 10/407,435, filed Apr. 4, 2003, 15 pages.

U.S. Office Action mailed on Oct. 20, 2005, for U.S. Appl. No. 10/664,513, filed Sep. 16, 2003, 12 pages.

U.S. Appl. No. 11/796,438, filed Apr. 26, 2007 for Hellerstein.

\* cited by examiner

FIG. 35 (a) SAM Distribution in Waveform Actually Measured
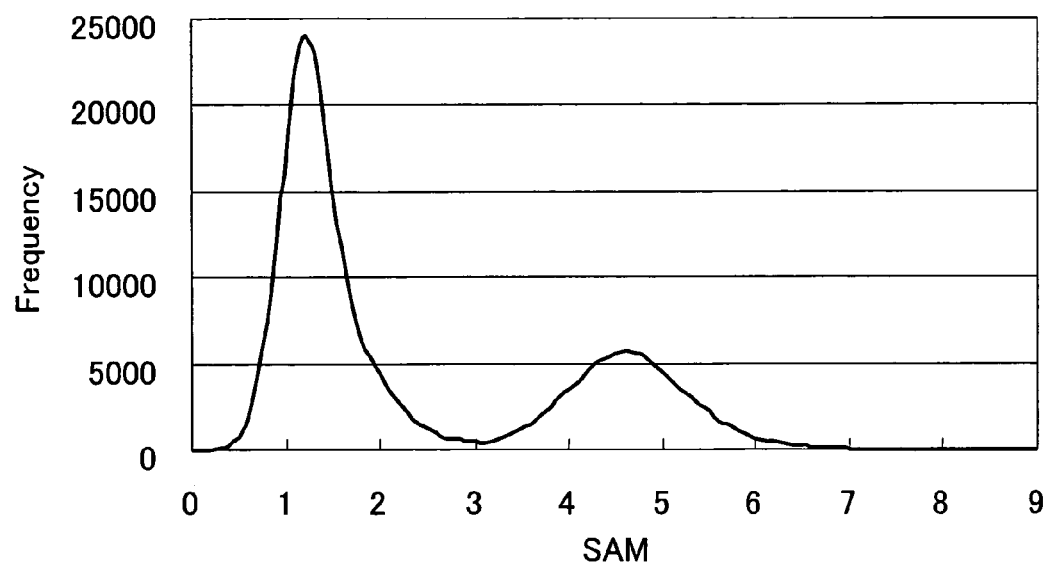
FIG. 35 (b) SAM Distribution in Ideal Waveform
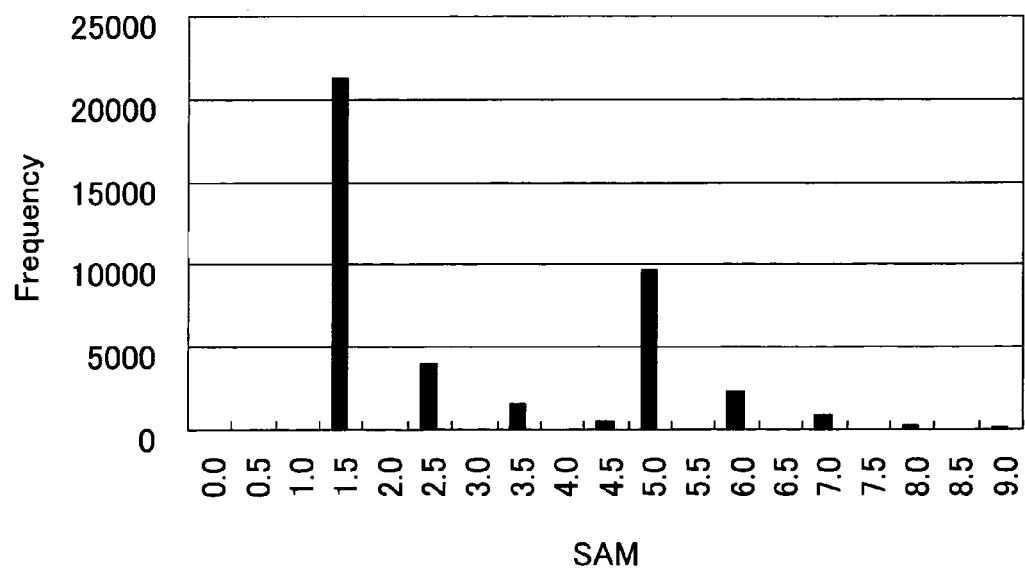

SIGNAL QUALITY EVALUATION DEVICE, INFORMATION READ/WRITE DEVICE, SIGNAL QUALITY EVALUATION METHOD, WRITE CONDITIONS DETERMINING METHOD, SIGNAL QUALITY EVALUATION COMPUTER PROGRAM, COMPUTER-READABLE STORAGE MEDIUM CONTAINING SIGNAL QUALITY EVALUATION COMPUTER PROGRAM

This nonprovisional application claims priority under U.S.C. §119(a) on Patent Applications No. 2005-054721 filed in Japan on Feb. 28, 2005 and No. 2006-008014 filed in Japan on Jan. 16, 2006, the entire contents of which are hereby incorporated by reference.

FIELD OF THE INVENTION

The present invention relates to quality evaluation of Viterbi-decodable signals.

BACKGROUND OF THE INVENTION

Conventionally, jitter is often used as an index in the evaluation of quality of signals reproduced from an optical disc. However, in view of a recent trend to detect data with PRML (Partial Response Maximum Likelihood) to achieve high density recording, Jitter, which varies with time, does not make a suitable quality index. Another evaluation index used is the bit error rate of PRML data detection results, which however requires measurement of a lot of sample bits and is likely to be affected by defects caused by scratches on the disc and other factors.

With such a background, T. Perkins, "A Window Margin Like Procedure for Evaluating PRML Channel Performance," IEEE Transactions on Magnetics, Vol. 31, No. 2, 1995, pp. 1109-1114 suggests a quality evaluation method for reproduced signals called "SAM (Sequenced Amplitude Margin)."

The concept of SAM will be described in reference to FIGS. 33 and 34. An example is taken here in which a bit sequence recorded by (1,7) RLL (Run Length Limited) encoding is decoded by PRML based on PR (1,2,1).

As shown in FIG. 33, the reproduced signal waveform for an ideal 1T mark which reflects PR (1,2,1) and is free of distortion and noise has a 1:2:1 sample level ratio for each channel clock. "T" is the time equivalent to one cycle of a channel clock. An "nT mark" is a mark which has a length equivalent to nT. The reproduced signal waveform for a mark longer than or equal to 2T is obtainable through superimposition of waveforms like this one for a 1T mark. For example, the sample level ratio is 1:3:3:1 for a 2T mark, 1:3:4:3:1 for a 3T mark, and 1:3:4:4:3:1 for a 4T mark. An ideal reproduced signal waveform for a given bit sequence is thus known. There are five ideal sample levels: 0, 1, 2, 3, and 4. For convenience, the sample levels are normalized for maximum amplitudes of ±1. The five normalized, ideal sample levels are −1, −0.5, 0, +0.5, and +1.

Viterbi decoding is employed here as a specific way to realize PRML decoding. Let us examine the trellis diagram shown in FIG. 34 which is drawn for the Viterbi decoding with the sample levels specified above. In FIG. 34, S(00), S(01), S(10), and S(11) denote different states. State S(00) indicates that the preceding bit is a 0 and the current bit is a 0. State S(01) indicates that the preceding bit is a 0 and the current bit is a 1. State S(10) indicates that the preceding bit is a 1 and the current bit is a 0. State S(11) indicates that the preceding bit is a 1 and the current bit is a 1.

A line connecting one state to another is called a branch, indicating a state transition. For example, the S(00)-to-S(01) branch represents a "001" bit sequence. In FIG. 34, letters a to f are allocated to identify individual branches. The identifying letters are accompanied by an ideal waveform level expected in the state transition. For example, the ideal level for "a" is −1 because the letter represents a "000" bit sequence. The ideal level for "b" is −0.5 because the letter represents a "100" bit sequence. The S(01)-to-S(10) and S(10)-to-S(01) branches are missing from the diagram, because the "010" and "101" bit sequences cannot occur due to the d=1 Run Length Limit in the (1,7) RLL code which is a modulation scheme where the shortest mark length is 2T.

In a trellis diagram, a "path" is formed by connecting continuous branches from a given state via another. To consider all possible paths is to consider all possible bit sequences. The most likely path, or "correct path", can be determined by comparing the signal waveform actually reproduced from the optical storage medium with every ideal waveform expected from the paths to find the ideal waveform that is the closest to the reproduced waveform, that is, the one with the least Euclidean distance from the reproduced waveform.

Now, a Viterbi decoding procedure based on a trellis diagram will be specifically described. At a given time, there are two paths merging at each of states S(O) and S(11), whereas there is a single path coming in to each of S(01) and S(10). Of the two paths merging at S(00) and S(11), retain as the survivor path the one with a less Euclidean distance between the ideal waveform for each path and the reproduced signal waveform. This leaves four paths each terminating at a different one of the four states at a given time. The square of the Euclidean distance between the ideal waveform for the path and the reproduced signal waveform is termed the path metric. The path metric is calculated by summing up branch metrics for all branches making up the path (the branch metric is the square of the difference between the ideal sample level of the branch and the sample level of a reproduced signal waveform.

Let X[t] represent the sample level of the reproduced signal waveform at time t; Ba[t], Bb[t], Bc[t], Bd[t], Be[t], and Bf[t] represent branch metrics for the respective branches a, b, c, d, e, f at time t; and M(00)[t], M(01)[t], M(10)[t], and M(11)[t] represent path metrics for the respective survivor paths leading to states S(00), S(01), S(10), and S(11) at time t. These branch metrics and path metrics are calculated by the following set of equations (1) and (2):

$$Ba[t]=(X[t]+1)^2$$

$$Bb[t]=Bc[t]=(X[t]+0.5)^2$$

$$Bd[t]=Be[t]=(X[t]-0.5)^2$$

$$Bf[t]=(X[t]-1)^2 \qquad (1)$$

$$M(00)[t]=\mathrm{Min}\{M(00)[t-1]+Ba[t], M(10)[t-1]+Bb[t]\}$$

$$M(01)[t]=M(00)[t-1]+Bc[t]$$

$$M(10)[t]=M(11)[t-1]+Bd[t]$$

$$M(11)[t]=\mathrm{Min}\{M(01)[t-1]+Be[t], M(11)[t-1]+Bf[t]\} \qquad (2)$$

Note that $\mathrm{Min}\{m,n\}=m$ if $m \leq n$ and n if $m>n$.

The process of selecting a smaller path metric from M(00)[t] and M(11)[t] corresponds to the determination of a survivor path.

By repeating the procedure for determining the survivor path every time a sample value for the reproduced signal waveform is received, the path with a greater path metric is removed, so that the number of paths decrements to one. This path is regarded as the correct path so that the original data bit sequence is correctly reproduced.

Here, let us now consider conditions under which Viterbi decoding is correctly done. For the correct path to be ultimately chosen, the path metric must be less for the correct path than for the other path (error path) every time the survivor path is determined. These conditions are expressed by the following set of equations (3):

(3) For a correct bit sequence ending with 000, $$\Delta M=(M(10)[t-1]+Bb[t])-(M(00)[t-1]+Ba[t])>0$$

For a correct bit sequence ending with 100, $$\Delta M=(M(00)[t-1]+Ba[t])-(M(10)[t-1]+Bb[t])>0$$

For a correct bit sequence ending with 011, $$\Delta M=(M(11)[t-1]+Bf[t])-(M(01)[t-1]+Be[t])>0$$

For a correct bit sequence ending with 111, $$\Delta M=(M(01)[t-1]+Be[t])-(M(11)[t-1]+Bf[t])>0$$

For a correct bit sequence ending with 001 or 110, $\Delta M>0$ because the survivor path is always determined correctly.

In the set of equations (3), $\Delta M$ is a path metric difference between two paths one of which will be the survivor path. The difference is termed the SAM. To allow no error occurrence, it is required that SAM>0. This fact indicates that error occurrence is increasingly unlikely with increasing SAM value.

A method of evaluating system reliability using SAM is suggested in U.S. Pat. No. 5,938,791 (Date of patent, Aug. 17, 199). According to the method, the reliability of a reproduction device is examined with the standard deviation of the frequency distribution of SAM as an evaluation index.

FIG. 35($a$) is a SAM frequency distribution graph prepared from an actual signal reproduced from a (1,7) RLL code sequence recorded on an optical disc. As apparent from these results, a typical SAM distribution has a plurality of peaks. This is because in the calculation of a SAM for all reproduced signals, the Euclidean distance between the correct and error paths differs from one bit sequence to the other.

Now referring to FIG. 35($b$), for completely noise-free, ideal reproduced signals from (1,7) RLL code sequences, the SAM frequency distribution shows a plurality of ideal discrete values: namely, 1.5, 2.5, 3.5, 4.5, 5, 6, 7, 8, and 9. The frequencies of the ideal values vary because the ideal values involve different numbers of bit sequences, and the bit sequences occur at different frequencies in the (1,7) RLL code sequences. Actual values deviate from these ideal values due to various noise on the reproduced signal, resulting in multiple distributions being superimposed as shown in FIG. 35($a$).

The U.S. Pat. No. 5,938,791 technique generates a SAM distribution as an evaluation index by selecting a bit sequence which, due to noise, yields a SAM<0 at a high probability and a minimum ideal SAM value of (1.5). Although some two or more bit sequences yield the minimum ideal SAM value. The technique however does not distinguish between those bit sequences. In addition, the technique does not use the bit sequences that do not yield the minimum ideal SAM value.

Thus, information is insufficient for use in the evaluation of reproduced signals at high accuracy.

SUMMARY OF THE INVENTION

The present invention, conceived in view of these conventional problems, has an objective to improve accuracy in quality evaluation for Viterbi-decodable signals.

A signal quality evaluation device in accordance with the present invention is a signal quality evaluation device for evaluating quality of a Viterbi-decodable signal, and to solve the problems, characterized in that the device includes: Viterbi decoding means for Viterbi decoding the signal to generate a decoded bit sequence and to generate a path metric difference obtained in the Viterbi decoding; specific pattern detection means for detecting a specific pattern in the decoded bit sequence; reverse pattern detection means for detecting a reverse pattern of the specific pattern in the decoded bit sequence; and signal quality evaluation means for detecting respective path metric differences for the specific pattern and the reverse pattern from the path metric difference generated by the Viterbi decoding means and results of detection by the specific pattern detection means and the reverse pattern detection means, to evaluate quality of the signal from the respective path metric differences for the specific pattern and the reverse pattern.

A signal quality evaluation method in accordance with the present invention is a method of evaluating quality of a Viterbi-decodable signal, and to solve the problems, characterized in that the method includes the steps of: (a) Viterbi decoding the signal to generate a decoded bit sequence and to generate a path metric difference obtained in the Viterbi decoding; (b) detecting a specific pattern in the decoded bit sequence; (c) detecting a reverse pattern of the specific pattern in the decoded bit sequence; and (d) detecting respective path metric differences for the specific pattern and the reverse pattern from the path metric difference generated in step (a) and results of steps (b) and (c), to evaluate quality of the signal from the respective path metric differences for the specific pattern and the reverse pattern.

With the structure and method, a specific pattern and a reverse pattern are detected in a decoded bit sequence decoded by Viterbi decoding. Path metric differences for these patterns are then detected respectively. The signal quality evaluated from the Path metric differences. A path metric difference is the difference between path metrics for two respective paths one of which will be the survivor path in the decoding of patterns detected in a decoded bit sequence decoded by Viterbi decoding.

Signal quality can be evaluated from the path metric difference for the specific pattern and the path metric difference for the reverse pattern for the following reasons.

The quality of a Viterbi-decodable signal can be evaluated on the basis of the waveform of the signal. Generally, a signal has good quality if its amplitude is symmetric with respect to the amplitude center of the ideal waveform (hereinafter, "0 level"). If the amplitude is asymmetric, the signal has poor quality.

With the ideal waveform, the waveform level of the specific pattern and the waveform level of the reverse pattern are symmetric with respect to the 0 level. Furthermore, the waveform level of the error pattern with respect to the specific pattern and the waveform level of the error pattern with respect to the reverse pattern are symmetric with respect to the 0 level.

Therefore, the amplitude asymmetry in the signal which is the evaluation target appears in the relationship between the path metric difference for the specific pattern and the path metric difference for the reverse pattern. In other words, the smaller the difference between the path metric difference for the specific pattern and the path metric difference for the reverse pattern, the smaller the amplitude asymmetry in the signal waveform; the larger the difference between the path metric difference for the specific pattern and the path metric difference for the reverse pattern, the larger the amplitude asymmetry in the signal waveform.

By utilizing these properties, the quality of the signal can be evaluated from the path metric difference for the specific pattern and the path metric difference for the reverse pattern.

As described in the foregoing, unlike the signal quality conventional evaluation technique where consideration is given only to the bit sequence with which the probability of SAM<0 is highest due to noise, in other words, the bit sequence with a minimum ideal SAM value, the above structure and method is capable of evaluation with amplitude asymmetry in the signal being considered. The structure and method is therefore more accurate in signal quality evaluation.

For a fuller understanding of the nature and advantages of the invention, reference should be made to the ensuing detailed description taken in conjunction with the accompanying drawings.

BRIEF DESCRIPTION OF THE DRAWINGS

FIG. 35(a) is a graph representing a SAM frequency distribution obtained from a (1,7) RLL code sequence signal actually reproduced from an optical disc.

FIG. 35(b) is a graph representing a SAM frequency distribution for a completely noise-free, ideal reproduced signal.

DESCRIPTION OF THE EMBODIMENTS

Embodiment 1

The following will describe a first embodiment of the present invention in reference to FIG. 1 to FIG. 5. The embodiment will describe an optical disc device of a PRML (Partial Response Maximum Likelihood) scheme.

Figure 1:
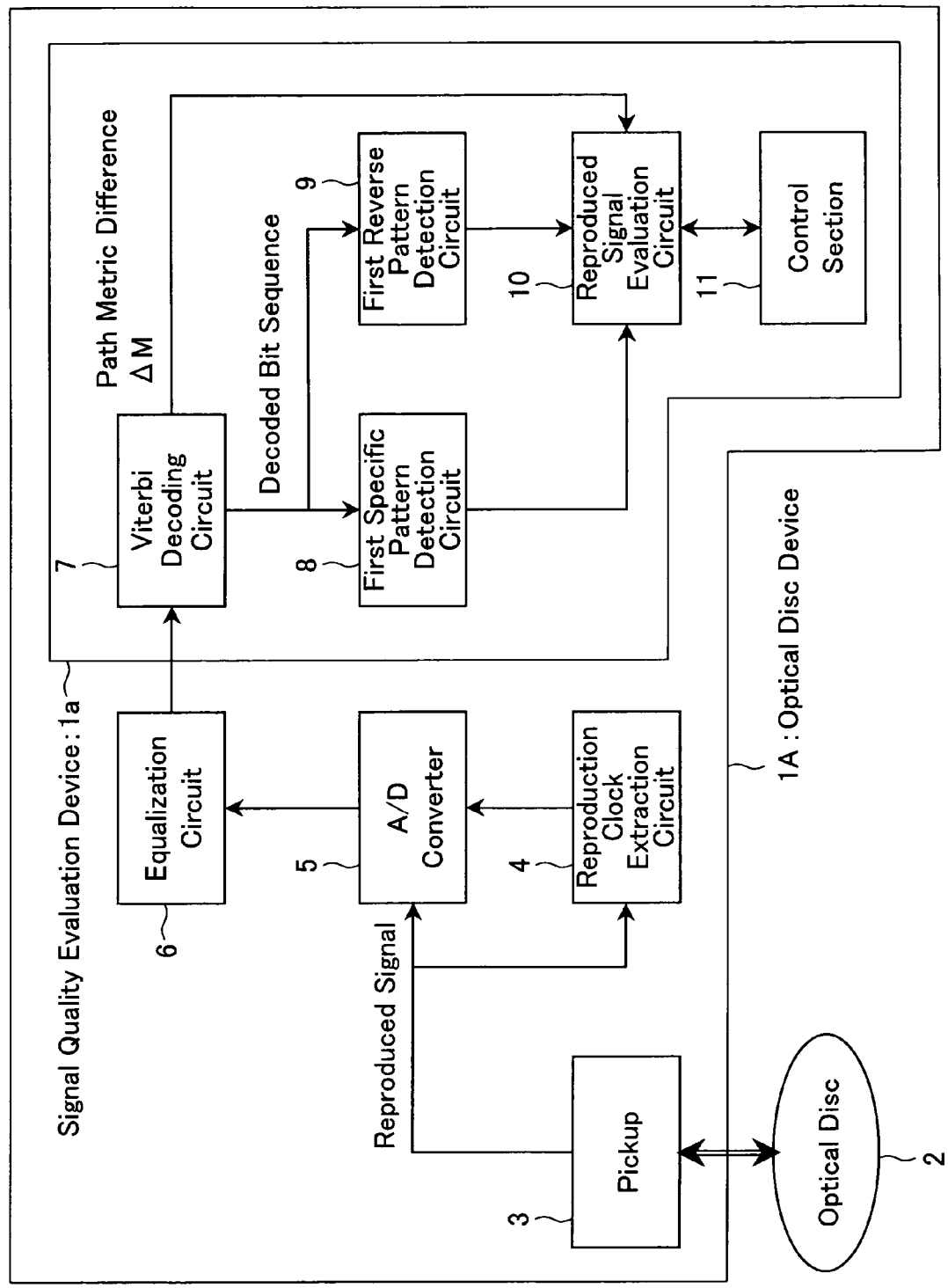
FIG. 1 is a block diagram illustrating the structure of an optical disc device in accordance with a first embodiment of the present invention.

An optical disc device 1A in accordance with the present embodiment includes, as shown in FIG. 1, a pickup 3, a reproduction clock extraction circuit 4, an A/D converter 5, an equalization circuit 6, a Viterbi decoding circuit 7, a first specific pattern detection circuit 8, a first reverse pattern detection circuit 9, a reproduced signal evaluation circuit 10, and a control section 11. The Viterbi decoding circuit 7, the first specific pattern detection circuit 8, the first reverse pattern detection circuit 9, the reproduced signal evaluation circuit 10, and the control section 11 constitute a signal quality evaluation device 1a. The pickup 3 serves as reading means and writing means. The Viterbi decoding circuit 7 serves as Viterbi decoding means. The first specific pattern detection circuit 8 and the first reverse pattern detection circuit 9 serve as specific pattern detection means and reverse pattern detection means respectively. The reproduced signal evaluation circuit 10 serves as signal quality evaluation means.

Figure 2:
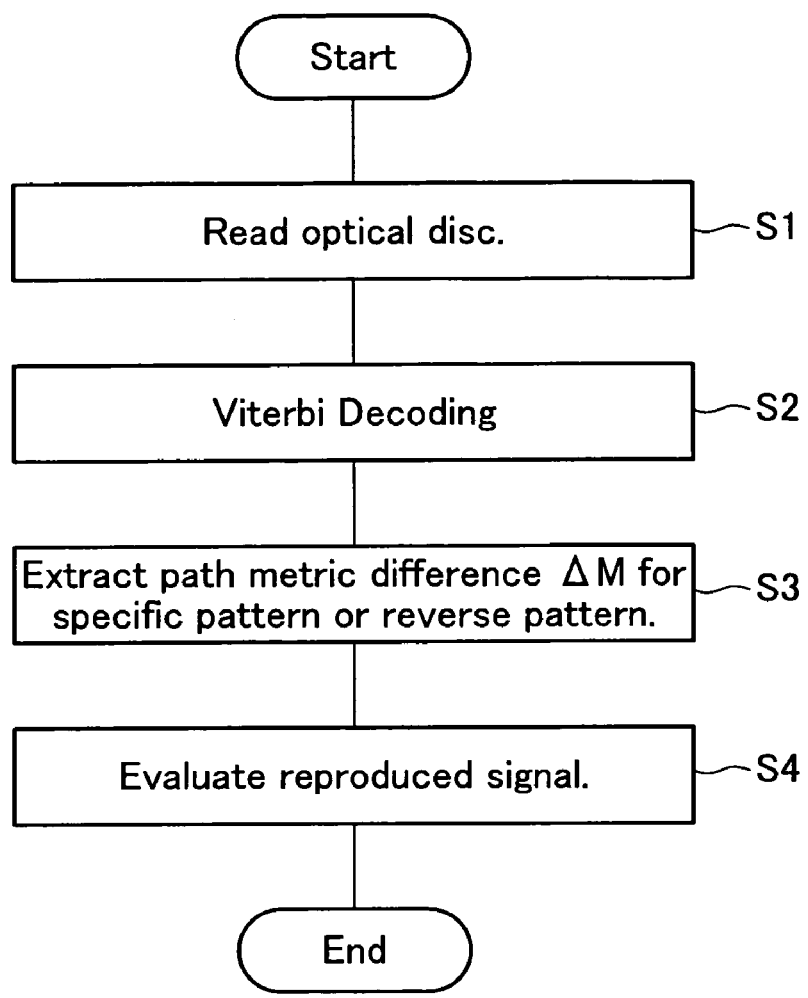
FIG. 2 is a flow chart illustrating the flow of a reproduction operation carried out by the optical disc device shown in FIG. 1.

Referring to the functional block diagram in FIG. 1 and the flow chart in FIG. 2, the following will describe operation of members in the optical disc device 1A thus arranged, in other words, reproduction operation.

First, the optical disc is read (step S1).

Specifically, the pickup 3 projects a light beam onto the optical disc 2 and receives the reflection. The incoming light is converted to an electrical signal by the pickup 3 for output as a reproduced signal. At this stage, the reproduced signal is an analog signal.

The reproduced signal output from the pickup 3 is fed to a next stage: the reproduction clock extraction circuit 4 and A/D converter 5. The reproduction clock extraction circuit 4, consisting of a PLL (Phase Locked Loop) circuit, extracts a reproduction clock needed in the A/D converter 5 from the incoming reproduced signal. The A/D converter 5 converts the reproduced signal from analog to digital on the basis of the timings given by the reproduction clock extracted by the reproduction clock extraction circuit 4. The A/D converter 5 may carry out AC coupling to remove the DC component.

The converted, digital reproduced signal is subjected to waveform equalization in the next-stage equalization circuit 6. The output is fed to the Viterbi decoding circuit 7. The equalization circuit 6 manipulates the frequency characteristics of the reproduced waveform to yield frequency characteristics which are as close to ideal ones.

Next, Viterbi decoding is carried out (step S2).

Specifically, the Viterbi decoding circuit 7 calculates path metrics similarly to conventional art. That is, the squares of differences between the digital data produced from the incoming reproduced signal and the ideal levels of the branches in the trellis diagram (branch metrics) are summed up across all the branches making up the paths in accordance with the set of equations (1) and (2) detailed above.

The Viterbi decoding circuit 7 calculates a path metric and makes a selection every time it receives a piece of digital data produced from the reproduced signal. Ultimately, the path with a minimum path metric is survives, from which a decoded bit sequence is obtained.

Accordingly, the SAM (Sequenced Amplitude Margin) is calculated as a path metric difference $\Delta M$ between the two paths leading to the correct state from the set of equations (3) above.

The process has been so far similar to conventional art.

The decoded bit sequence is fed to the first specific pattern detection circuit 8 and the first reverse pattern detection circuit 9. The path metric difference $\Delta M$ is fed to the reproduced signal evaluation circuit 10.

Next, a path metric difference for a specific pattern or a reverse pattern is extracted (step S3).

Specifically, if a specific pattern is detected in the decoded bit sequence, the first specific pattern detection circuit 8 sends a signal to the reproduced signal evaluation circuit 10. The path metric difference $\Delta M$ fed from the Viterbi decoding circuit 7 which corresponds to the specific pattern is recorded as a path metric difference $\Delta Ms1$ in a memory (not shown) in the reproduced signal evaluation circuit 10.

Figure 3:
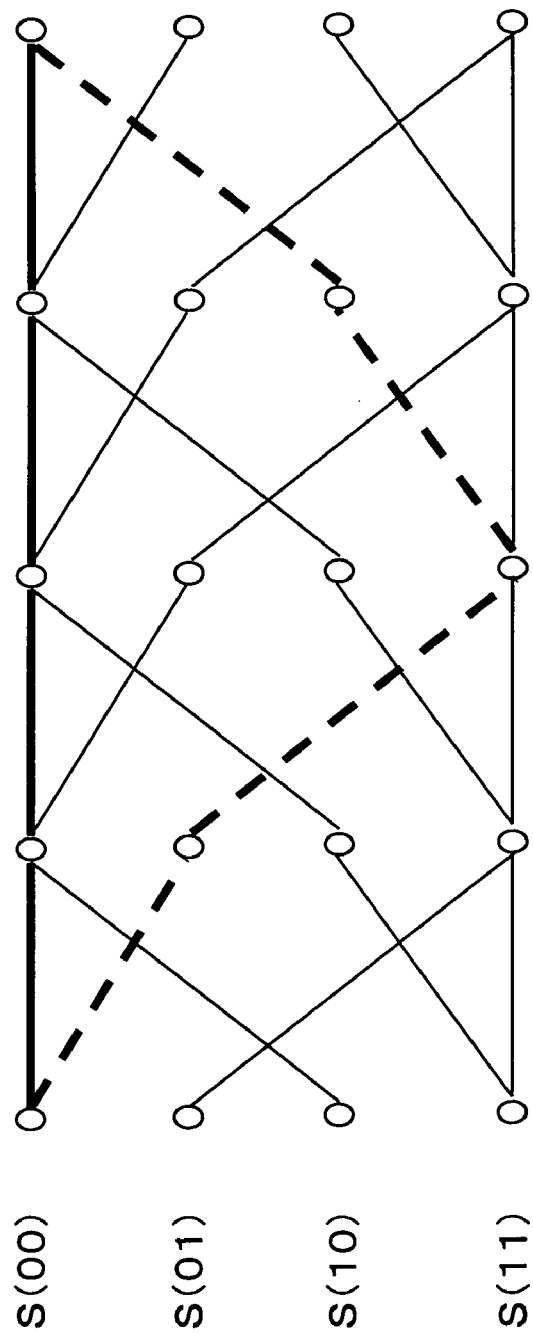
FIG. 3 is a trellis diagram showing a correct path (solid line) and an error path (broken line) corresponding to a pattern "000000" in Viterbi decoding.

FIG. 3 shows two paths leading to a correct state in a trellis diagram for a specific pattern of "000000." The thick sold line is the correct path. The thick broken line is the error path. So, the correct path is "000000," and the error path is "001100." The path metric difference $\Delta Ms1$ is the difference between the path metric for the ideal waveform and reproduced signal waveform for the correct path "000000" (the square of the Euclidean distance) and the path metric for the ideal waveform and reproduced signal waveform for the error path "001100."

Figure 36:
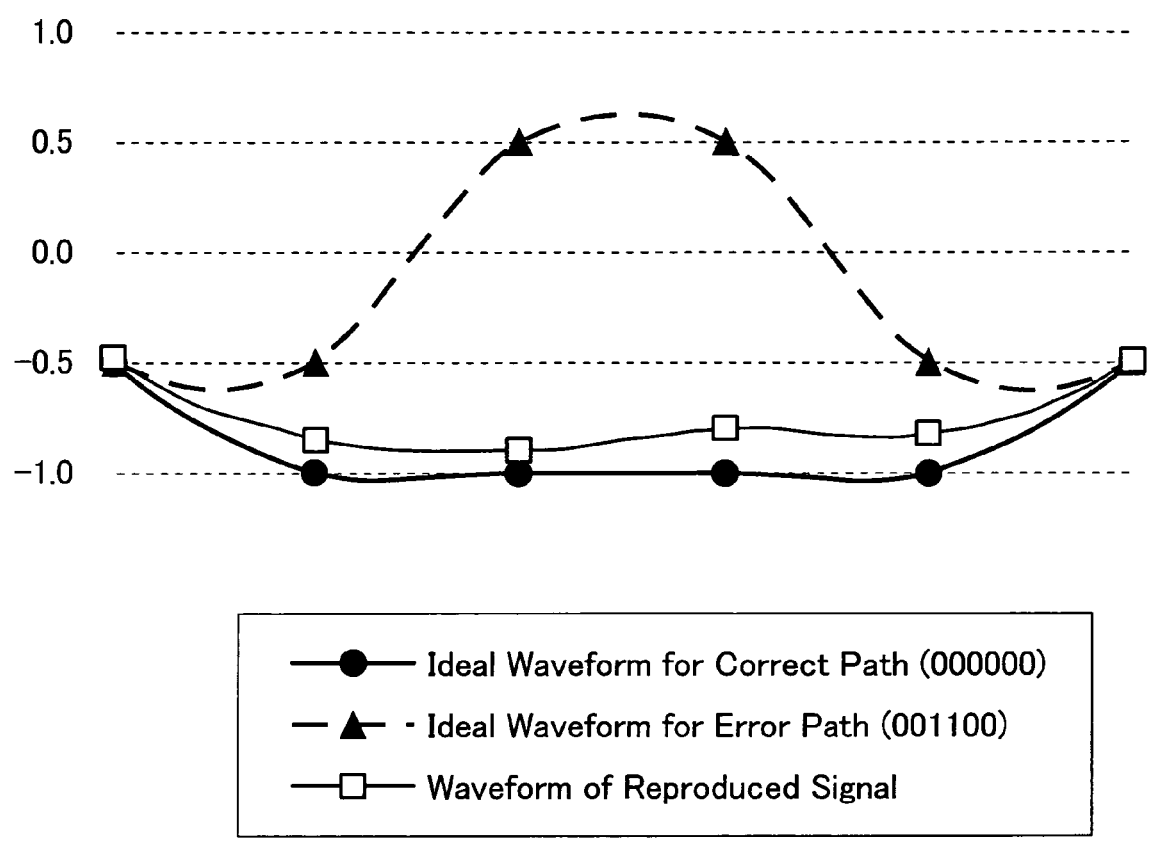
FIG. 36 is a waveform diagram illustrating a relationship between an ideal waveform for a correct path, an ideal waveform for an error path, and a reproduced signal waveform in relation to the pattern "000000."

FIG. 36 represents relationship between the ideal waveform for a correct path, the ideal waveform for an error path, and an incoming reproduced signal waveform. It is understood from FIG. 36 that the greater the value of the path metric difference $\Delta Ms1$, the more the reproduced signal waveform approaches the ideal waveform for the correct path and moves away from the ideal waveform for the error path. This fact demonstrates that the path metric difference $\Delta Ms1$ can be an index for the magnitude of difference between the ideal waveform for an error path which is the ideal waveform for a 2T space and the reproduced signal waveform for a 6T or longer mark. This specific pattern "000000" has an ideal SAM value of 5. The value is different from the minimum ideal SAM value (=1.5) which has a high error probability.

If a reverse pattern is detected in the decoded bit sequence, the first reverse pattern detection circuit 9 sends a signal to the reproduced signal evaluation circuit 10. The path metric difference ΔM fed from the Viterbi decoding circuit 7 which corresponds to the reverse pattern is recorded as a path metric difference ΔMi1 in a memory (not shown) in the reproduced signal evaluation circuit 10.

Figure 4:
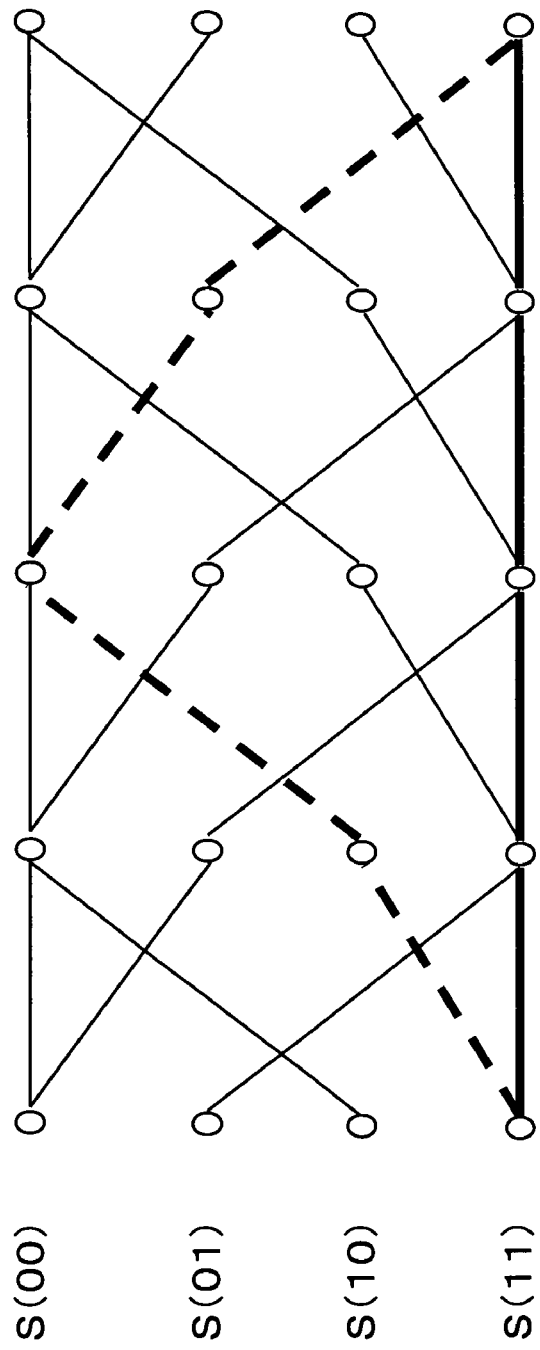
FIG. 4 is a trellis diagram showing a correct path (solid line) and an error path (broken line) corresponding to a pattern "111111" in Viterbi decoding.

FIG. 4 shows two paths leading to a correct state in a trellis diagram for a reverse pattern "111111" for the specific pattern "000000." The thick sold line is the correct path. The thick broken line is the error path. So, the correct path is "1111111," and the error path is "110011." The path metric difference ΔMi1 is the difference between the path metric for the ideal waveform and reproduced signal waveform for the correct path "111111" and the path metric for the ideal waveform and reproduced signal waveform for the error path "110011."

Figure 37:
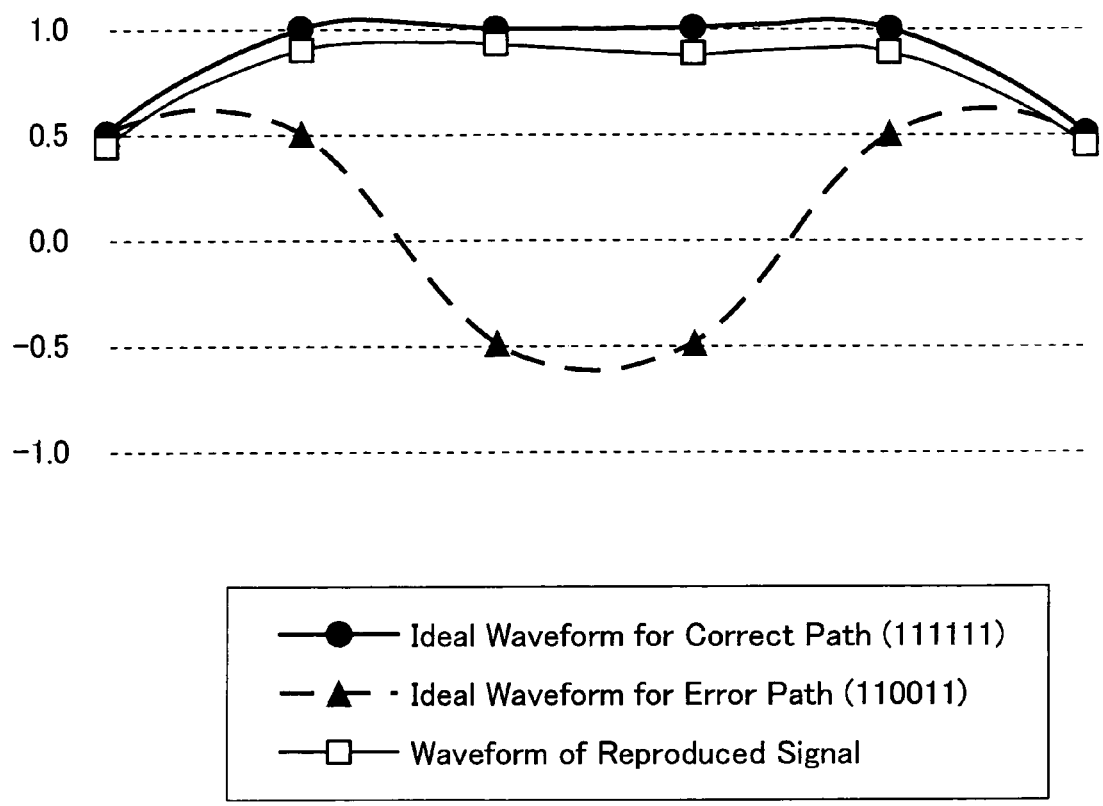
FIG. 37 is a waveform diagram illustrating a relationship between an ideal waveform for a correct path, an ideal waveform for an error path, and a reproduced signal waveform in relation to the pattern "111111."

FIG. 37 represents relationship between the ideal waveform for a correct path, the ideal waveform for an error path, and an incoming reproduced signal waveform. It is understood from FIG. 37 that the greater the value of the path metric difference ΔMi1, the more the reproduced signal waveform approaches the ideal waveform for the correct path and moves away from the ideal waveform for the error path. This fact demonstrates that the path metric difference ΔMi1 can be an index for the magnitude of difference between the ideal waveform for an error path which is the ideal waveform for a 2T mark and the reproduced signal waveform for a 6T or longer space. This reverse pattern "111111" has an ideal SAM value of 5. The value is different from the minimum ideal SAM value (=1.5) which has a high error probability.

It is generally known that if the reproduced signal waveform shows a large difference between (i) the amplitude between the waveform level of a specific pattern and the 0 level and (ii) the amplitude between the waveform level of a reverse pattern and the 0 level, that is, if the reproduced signal waveform has an asymmetric amplitude with respect to 0 level, the reproduced signal does not have good quality. This amplitude asymmetry is often caused by insufficient write power (will be detailed later).

With the ideal waveform, the waveform level of the specific pattern and the waveform level of the reverse pattern are symmetric with respect to the 0 level. Furthermore, the waveform level of the error pattern with respect to the specific pattern and the waveform level of the error pattern with respect to the reverse pattern are symmetric with respect to the 0 level. Therefore, the amplitude asymmetry in the reproduced signal waveform appears in the relationship between the value of the path metric difference ΔMs1 and the value of the path metric difference ΔMi1. In other words, the smaller the difference between the value of the path metric difference ΔMs1 and the value of the path metric difference ΔMi1, the smaller the amplitude asymmetry in the reproduced signal waveform; the larger the difference between the value of the path metric difference ΔMs1 and the value of the path metric difference ΔMi1, the larger the amplitude asymmetry in the reproduced signal waveform.

From these properties, it can be said that the reproduced signal quality is better if an examination shows similarity between the distributions (histograms) of the value of the path metric difference ΔMs1 and the value of the path metric difference ΔMi1 which are detected from the reproduced signal. An example of a method to describe the similarity between the distributions is to calculate an average value for each distribution to see if the difference between the two average values is approaching 0. The reproduced signal can be evaluated by this method.

This examination of the amplitude asymmetry in the reproduced signal waveform by means of the value of the path metric difference ΔMs1 and the value of the path metric difference ΔMi1 generated by the Viterbi decoding circuit 7 is desirable, because the method eliminates the need for an additional structure which directly examines the amplitude asymmetry in the reproduced signal waveform.

Conventional techniques to detect the amplitude asymmetry in the reproduced signal waveform employs a structure which detects the peak and bottom among waveform levels, to determine the asymmetry based on the results produced by that structure. Such a conventional technique uses waveform levels of only a very small portion of the reproduced signal waveform; it is difficult to accurately determine the asymmetry.

In contrast, the technique of the present embodiment detects a waveform level of the specific and reverse patterns at each reproduction clock timing and determines the amplitude asymmetry in the reproduced signal waveform based on the detection. This is possible because Viterbi decoding is employed.

In addition, the conventional technique primarily uses a single repeated pattern or other special data pattern so that the peak and bottom waveform levels are readily detected. The technique of the present embodiment requires only the data pattern recorded on the optical disc containing a specific pattern and a reverse pattern.

The specific pattern and reverse pattern in a case like this is desirable, because the use of a long mark and a long space (e.g., "000000" and "111111") allows the amplitude asymmetry in the reproduced signal waveform to clearly appear in the relationship between the value of the path metric difference ΔMs1 and the value of the path metric difference ΔMi1.

Lastly, the reproduced signal is evaluated (step S4).

Specifically, at a predetermined timing, for example, when a predetermined amount of data has been reproduced, the control section 11 sends a control signal to the reproduced signal evaluation circuit 10 for evaluation of the reproduced signal. Accordingly, the reproduced signal evaluation circuit 10 carries out the evaluation of the reproduced signal on the basis of ΔMs1 and ΔMi1. Specifically, D1=ΔMs1−ΔMi1 (difference between the path metric difference ΔMs1 for the specific pattern and the path metric difference ΔMi1 for the reverse pattern) is calculated. The reproduced signal is evaluated from the D1 value. Therefore, D1 can be used as an evaluation index for the reproduced signal.

If more than one specific pattern is detected while the predetermined amount of data is being reproduced, the average value of the multiple detected path metric differences ΔM is recorded in the memory in the reproduced signal evaluation circuit 10 as the path metric difference ΔMs1. Similarly, if more than one reverse pattern is detected while the predetermined amount of data is being reproduced, the average value of the multiple detected path metric differences ΔM is recorded in the memory in the reproduced signal evaluation circuit 10 as the path metric difference ΔMi1.

The predetermined amount of data may be specified, for example, equal to the amount of data that can be recorded in a region set up as a storage control unit or equal to the amount of data that can be recorded in a region substantially equivalent to one track.

Figure 5:
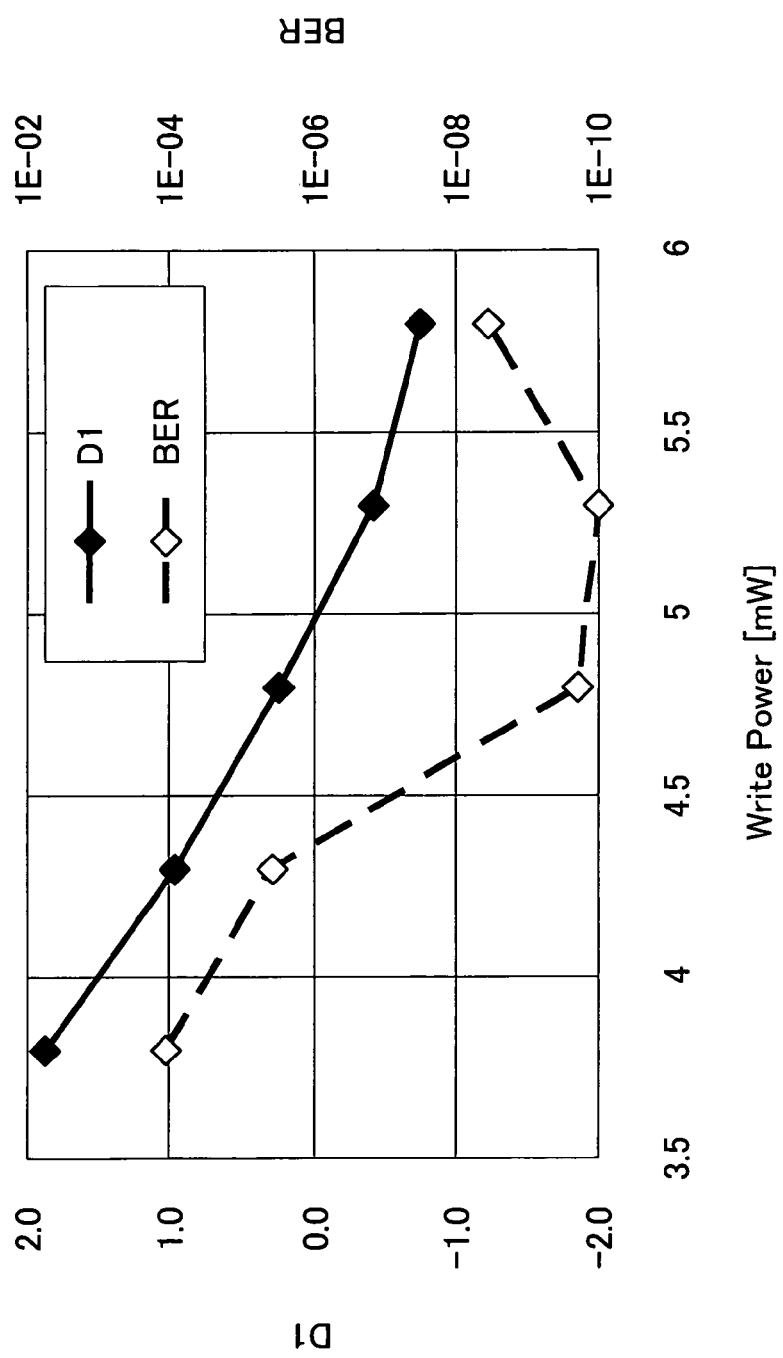
FIG. 5 is a graph representing results of reproduction from marks which are written with different write powers. D1 is the difference between the path metric difference for a pattern "000000" and that for a reverse pattern "111111." BER is bit error rate.

Now, referring to FIG. 5, it will be described why the reproduced signal can be evaluated with D1. FIG. 5 shows relationship between D1 (difference between the path metric difference for the specific pattern and that for the reverse pattern) and the BER (bit error rate) when data is reproduced from recording regions to which data was recorded with different write powers (will be detailed later). D1 changes monotonically with the write power. The BER has good values around D1=0. That means the quality of the reproduced signal can be evaluated in accordance with whether D1 is within a predetermined range near 0.

If D1 is in a predetermined range near 0, the reproduced signal evaluation circuit 10 determines that the reproduced signal has good quality. If D1 is out of the predetermined range near 0, the circuit 10 determines that the reproduced signal does not have good quality. If the signal quality is determined to be good, the optical disc device 1A continues the reproduction process without any change. If the signal quality is determined to be not good, the device 1A determines, for example, to carry out a process to change write conditions relating to the formation of marks for further recording, so that the reproduced signal can have good quality.

As described in the foregoing, unlike the conventional signal quality evaluation technique where consideration is given only to the bit sequence with which the probability of SAM<0 is highest due to noise, in other words, the bit sequence with a minimum ideal SAM value, the optical disc device 1A is capable of evaluation with amplitude asymmetry in the signal being considered. The device 1A is therefore more accurate in signal quality evaluation.

In the foregoing description, the reproduced signal evaluation circuit 10 evaluates the signal using the difference between the average values for the path metric difference ΔMs1 and the path metric difference ΔMi1. Alternative techniques include the following.

For example, the difference between a single path metric difference ΔMs1 obtained by one detection of a specific pattern and a single path metric difference ΔMi1 obtained by one detection of a reverse pattern is calculated. As the specific and reverse patterns are detected more than once, an average value is calculated for the differences. The evaluation may be carried out using this average value.

In addition, the evaluation may be carried out using the difference itself between a single path metric difference ΔMs1 obtained by one detection of a specific pattern and a single path metric difference ΔMi1 obtained by one detection of a reverse pattern. In a case like this, although accuracy may be poor compared to when the average value is used, but processing time is short.

Further, by counting the frequency of each value of the path metric difference ΔMs1 and the path metric difference ΔMi1, the distribution (histogram) of that value is known. Similar advantages to the evaluation based on differences between average values are available by evaluating signal quality in accordance with whether the two distributions obtained this way are approaching. In addition, similar advantages to the aforementioned difference between the average values being within a predetermined range are available by evaluating whether the two distributions are within a predetermined range.

In a case like this, the reproduced signal evaluation circuit 10 shown in FIG. 1 contains frequency distribution calculation means (not shown), and the frequency distribution calculated by the frequency distribution calculation means is used in evaluation.

In the foregoing, the quality of the reproduced signal is evaluated in accordance with whether D1 is within a predetermined range near 0, as an example. This is not the only possibility.

For example, in FIG. 5, the BER is best when write power=5.3 mW. Therefore, a reference value for D1 is determined in advance near 0. Here, the reference value is about −0.4 when write power=5.3 mW. The quality of the reproduced signal can be evaluated in accordance with whether D1 is within a predetermined range (tolerance range) above and below the reference value (center value).

From FIG. 5, the reference value for D1 may be, for example, between −0.5 and +0.5 inclusive. In addition, the predetermined range may be, for example, the reference value ±0.5.

In addition, the reference value (center value of the predetermined range) for D1 may be recorded on an optical disc, optical disc device, or other memory. The value is later retrieved for use in the evaluation of the quality of the reproduced signal.

Embodiment 2

The following will describe a second embodiment of the present invention in reference to FIG. 6 to FIG. 9.

The present embodiment relates to writing the optical disc. The embodiment determines if write conditions are good or not by applying the reproduced signal evaluation of embodiment 1 to a test write operation, so as to set up high accuracy write conditions.

Figure 6:
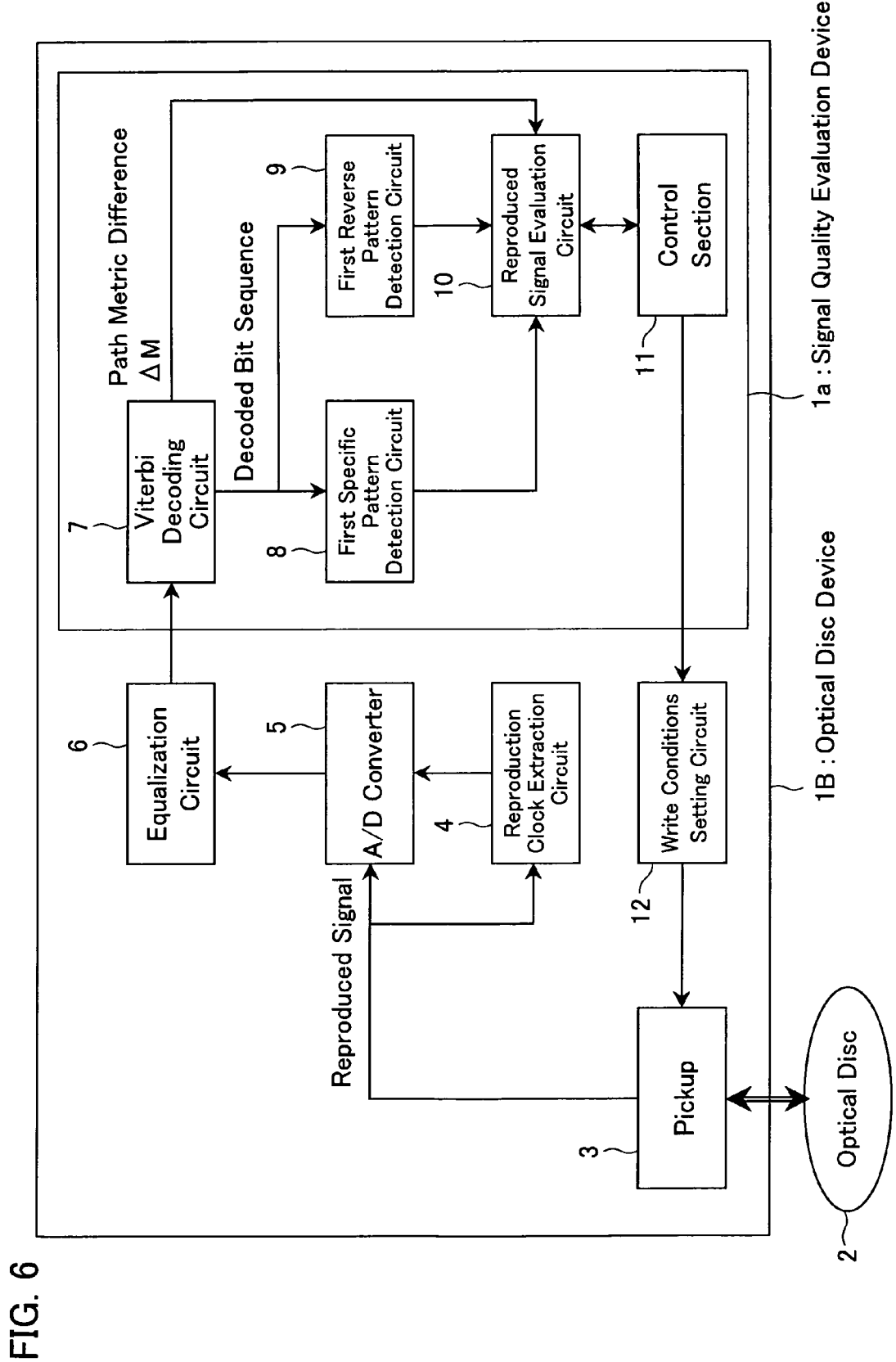
FIG. 6 is a block diagram illustrating the structure of an optical disc device in accordance with a second embodiment of the present invention.

As shown in FIG. 6, an optical disc device 1B in accordance with the present embodiment is an information read/write device. The device 1B additionally contains a write conditions setting circuit 12 when compared to the optical disc device 1A of embodiment 1. The write conditions setting circuit 12 serves as write condition setting means for setting write conditions under which the pickup 3 writes information on the optical disc 2 on the basis of evaluation by the signal quality evaluation device 1a. The members in the optical disc device 1B that have the same arrangement and function as members in the optical disc device 1A of embodiment 1 are indicated by the same reference numerals, and the description thereof is omitted.

Figure 7:
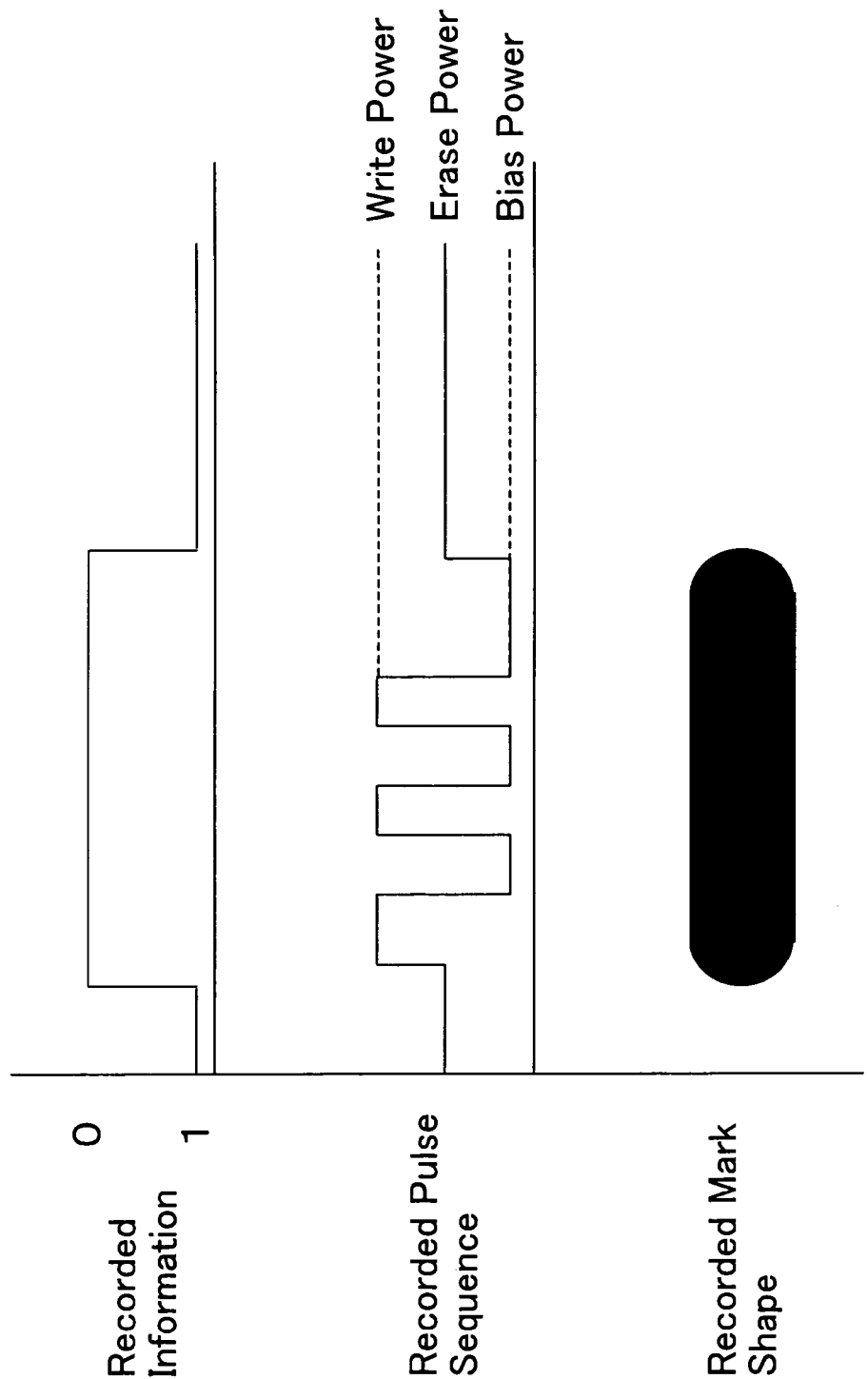
FIG. 7 is an illustration of a relationship between recording information, a light beam pulse sequence, and a recording mark shape in writing information onto the optical disc.

First, referring to FIG. 7, write conditions under which the optical disc 2 is written will be described. As shown in FIG. 7, for a write beam projected onto the optical disc 2, a pulse sequence which represents recording information is specified in consideration of a temperature distribution on the optical disc 2 (medium temperature distribution) due to the projection of the light beam. FIG. 7 shows a pulse sequence corresponding to a 4T mark. Here, "T" is the time equivalent to one cycle of the channel clock. Therefore, for example, a 4T mark contains 0s (recorded information) over the time equivalent to 4 cycles of the channel clock. In addition, the light beam has a pulse sequence which is as shown in FIG. 7 a combination of write, erase, and bias light beam powers. This light beam power will be referred to as the write power parameter. In addition, the parameters for the rise and fall positions of the pulses of the light beam on the time axis will be referred to as write pulse parameters. Therefore, the write conditions for writing the optical disc 2 include the write power parameter and the write pulse parameters.

The graph in FIG. 5 mentioned earlier shows data obtained by changing the write, erase, and bias powers while preserving a constant rate among the powers. The write power is plotted along the horizontal axis in the FIG. 5 graph as a typical example of the powers. The same applies to the horizontal axis of the graph in FIGS. 9, 14, 18, 21, 24, 28 (detailed later).

Among the write, erase, and bias powers, it is the write power that most affects the evaluation index D1. Therefore, when only the write power is changed with the erase and bias powers being fixed, the error rate tends to be lowest when the evaluation index D1 is near 0 as in FIG. 5.

Figure 8:
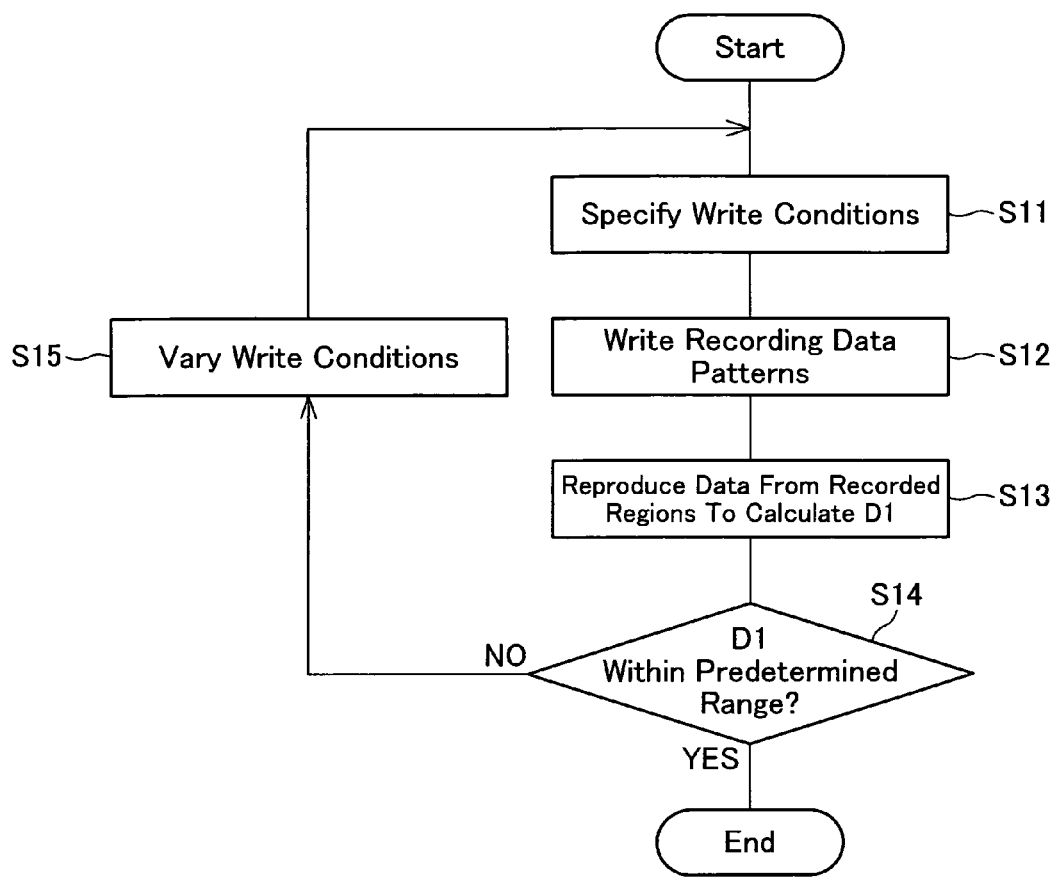
FIG. 8 is a flow chart illustrating the flow of a test write operation carried out by the optical disc device shown in FIG. 6.

Now, referring to the functional block diagram of FIG. 6 and the flow chart of FIG. 8, the following will describe operation of members in the optical disc device 1B arranged as above, in other words, write conditions determining operation.

First, write conditions are specified to write the optical disc 2 (step S11).

Specifically, the control section 11 determines write conditions under which a light beam is projected onto the optical disc 2. The write conditions setting circuit 12 is set up according to the write conditions.

Next, recording data patterns are recorded (step S12).

Specifically, in accordance with the write conditions according to which the write conditions setting circuit 12 is set up, the pickup 3 projects a light beam onto the optical disc 2 to write recording information on data patterns, including a specific pattern and a reverse pattern.

Next, data is reproduced from recorded regions to calculate D1 (difference between the path metric difference for the specific pattern and that for the reverse pattern) (step S13).

The calculation of D1 is explained in embodiment 1; no explanation will be given here.

Next, it is determined whether the D1 value is within a predetermined range (step S14). If the D1 value is within the predetermined range, the write conditions are determined as those yielding good reproduced signals. If the D1 value is not within the predetermined range, the write conditions are varied (step S15) and return to step S11.

Figure 9:
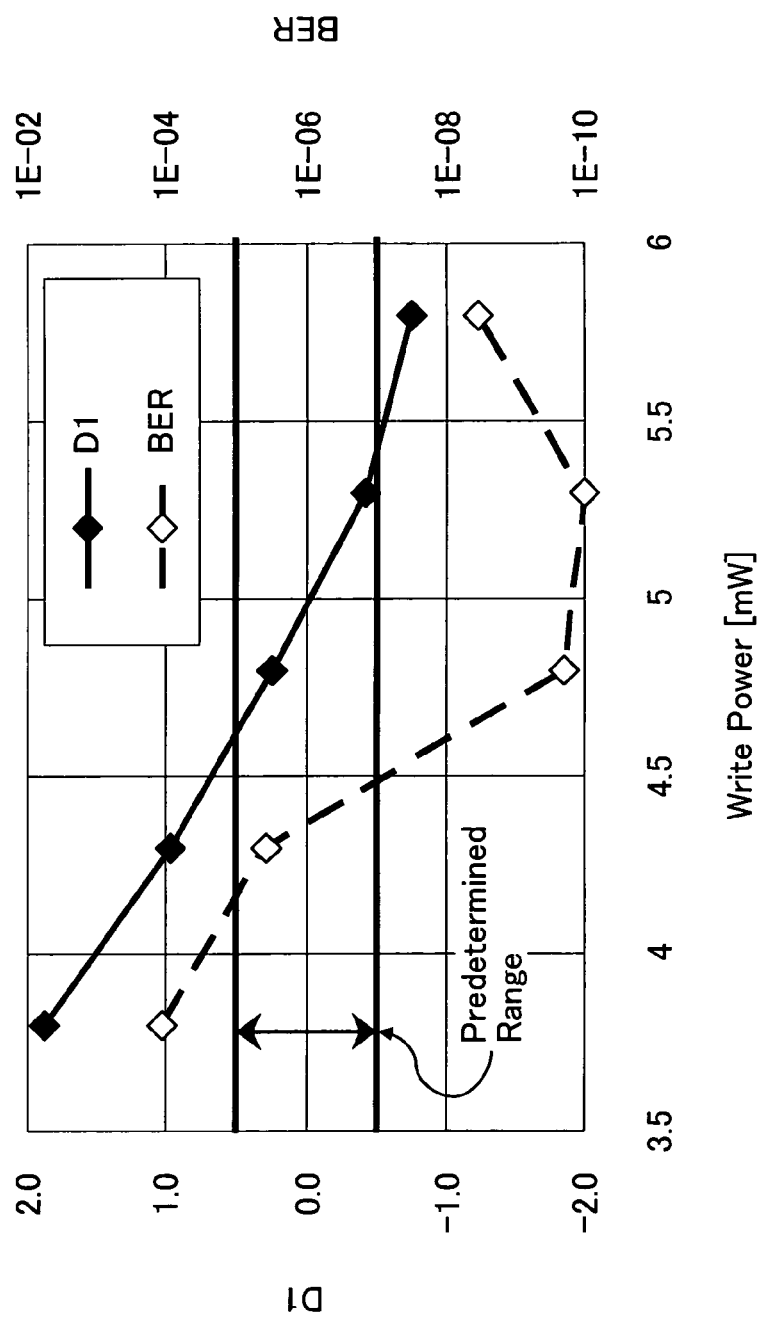
FIG. 9 is a graph representing relationship between results of reproduction of FIG. 7 and a predetermined range which serves as a reference in the determination in step S14 of FIG. 8.

FIG. 9 represents a relationship between (i) results of reproduction from recording regions which are written with different write powers, that is, the results of reproduction in FIG. 5 and (ii) a predetermined range which serves as a reference in the determination in step S14. It is known that D1 changes monotonically with the write power and that the BER has good values around D1=0. The write condition settings (here, the write power) can be determined in accordance with whether D1 is within a predetermined range near 0. The predetermined range may be, for example, $-0.5 \leq D1 \leq +0.5$.

As described in the foregoing, unlike the conventional signal quality evaluation technique where consideration is given only to the bit sequence with which the probability of SAM<0 is highest due to noise, in other words, the bit sequence with a minimum ideal SAM value, the optical disc device 1B is capable of evaluation with amplitude asymmetry in the signal being considered. The device 1B is therefore more accurate in signal quality evaluation.

The foregoing description has taken the write power as an example of write parameters which are part of the write conditions. Alternatively, for example, the write pulse parameters may be used to produce similar effects.

In addition, according to the flow chart of FIG. 8, data is reproduced from recording regions to calculate D1 (difference between the path metric difference for the specific pattern and that for the reverse pattern) (step S13); it is determined whether the D1 value is within a predetermined range (step S14); and if the D1 value is not within the predetermined range, the write conditions are varied (step S15), before returning to step S11. This is not the only possibility.

Mutually different write conditions are specified to write a different set of a specific pattern and a reverse pattern for each write condition. Data is reproduced from all recording region containing data to calculate D1 (difference between the path metric difference for the specific pattern and that for the reverse pattern) and determine if the D1 value is within a predetermined range under that write condition.

In the foregoing, write condition settings are determined in accordance with whether D1 is within a predetermined range near 0, as an example. This is not the only possibility.

For example, in FIG. 9, the BER is best when the write power is 5.3 mW. That is, a reference value near 0 (here, the D1 value of about −0.4 when the write power is 5.3 mW) is determined in advance, and the write condition settings may be determined in the write conditions determining operation depending on whether D1 is within a predetermined range (tolerance range) below and above the reference value.

From FIG. 9, the reference value may be $-0.5 \leq D1 \leq +0.5$. In addition, the predetermined range may be, for example, the reference value ±0.5.

In addition, the reference value (center value of the predetermined range) for D1 may be recorded on an optical disc 2 or a memory in the optical disc device 1B. The value is later retrieved for use in the determination of the write conditions.

Alternatively, the write conditions under which D1 takes a predetermined value (for example, 0) and the write conditions under which the BER is best may be determined in advance, to determine the correlation thereof. Then, in the write conditions determining operation, first, the write conditions under which D1 takes a predetermined value is determined. Next, through calculation on the write conditions based on the correlation (for example, multiplication by a predetermined factor or addition or subtraction of a predetermined value), the write conditions under which a good BER is obtained are determined.

In addition, various error factors, such as servo discrepancy, may occur when information is written on the optical disc 2. It is widely known that to form good recording marks under such conditions, the write power tends to need be raised relative to cases when there are no error factors, or the heat energy applied to the optical disc 2 by the light beam tends to need be increased otherwise. Therefore, first, the write conditions under which D1 takes a predetermined value may be determined. Next, through calculation on the write conditions with error factor compensation being considered (for example, multiplication by a predetermined factor or addition of a predetermined value), the write conditions are determined.

In addition, the information for the calculation of the predetermined factor or value may be recorded on the optical disc 2 or a memory (memory means) in the optical disc device 1B. The value is later retrieved for use in the determination of the write conditions.

Embodiment 3

The following will describe a third embodiment of the present invention in reference to FIG. 10 to FIG. 24.

In embodiments 1 and 2 above, the reproduced signal is evaluated on the basis of the D1 value. However, the reproduced signal evaluation based on the D1 value may not be correct if a DC offset is added to the reproduced signal. Accordingly, in the present embodiment, an operation will describe where the reproduced signal is evaluated at improved accuracy even if a DC offset is added to the reproduced signal.

Figure 10:
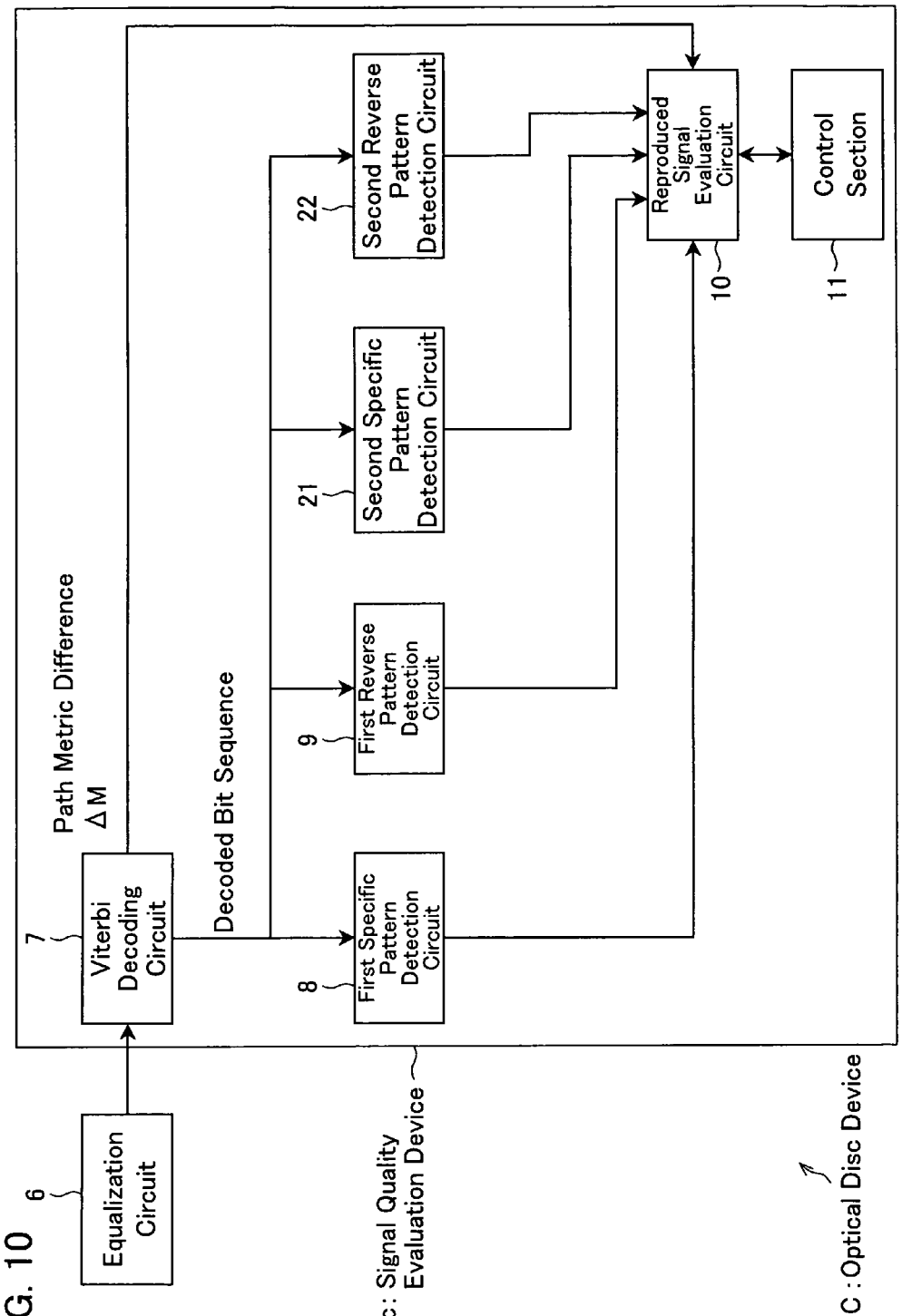
FIG. 10 is a block diagram illustrating the structure of a major part of an optical disc device in accordance with a third embodiment of the present invention.

As shown in FIG. 10, an optical disc device 1C in accordance with the present embodiment includes a signal quality evaluation device 1c in place of the signal quality evaluation device 1a in the optical disc device 1A of embodiment 1. When compared to the signal quality evaluation device 1a, the device 1c includes additional members: a second specific pattern detection circuit 21 and a second reverse pattern detection circuit 22. The first and second specific pattern detection circuits 8, 21 serve as specific pattern detection means. The first and second reverse pattern detection circuits 9, 22 serve as reverse pattern detection means. FIG. 10 shows only the arrangement in and around the signal quality evaluation device 1c in the optical disc device 1C. The members in the optical disc device 1C that have the same arrangement and function as members in the optical disc device 1A of embodiment 1 are indicated by the same reference numerals, and the description thereof is omitted.

Depending on reproduced signals, a DC offset may be added to the reproduced signal fed to the Viterbi decoding circuit 7 in the optical disc devices 1A and 1B by DC level variations caused by duty discrepancy of the recording marks on the optical disc 2 or offset regulation discrepancy in the A/D converter 5 in the optical disc devices 1A and 1B.

Figure 11:
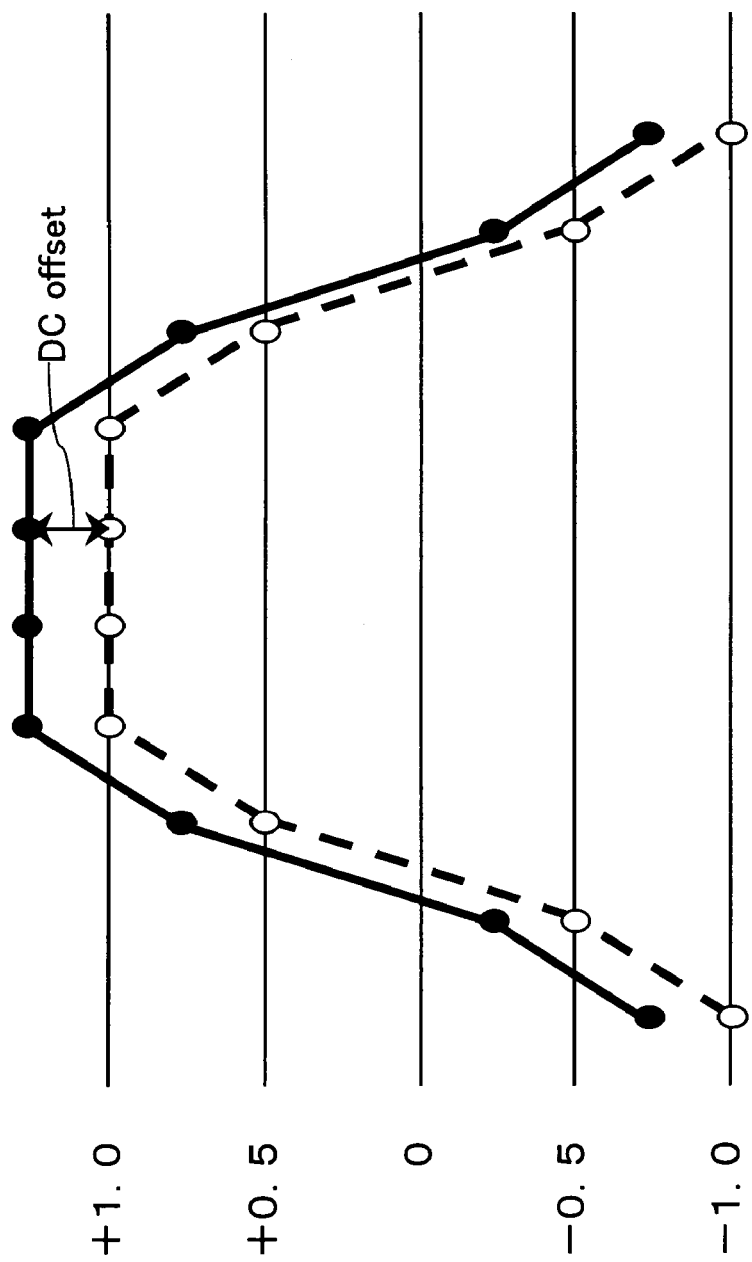
FIG. 11 is a waveform diagram illustrating showing a reproduced signal waveform to which an DC offset is added (solid line) and an ideal reproduced signal waveform (broken line).

The DC offset is defined as the difference between the signal level fed to the Viterbi decoding circuit 7 when there is no reproduced signal and the amplitude's center (0) level in the ideal waveform. Therefore, as shown in FIG. 11, the waveform (solid line) to which a DC offset is added shifts from the ideal waveform (broken line) by an amount equal to the DC offset.

Figure 12:
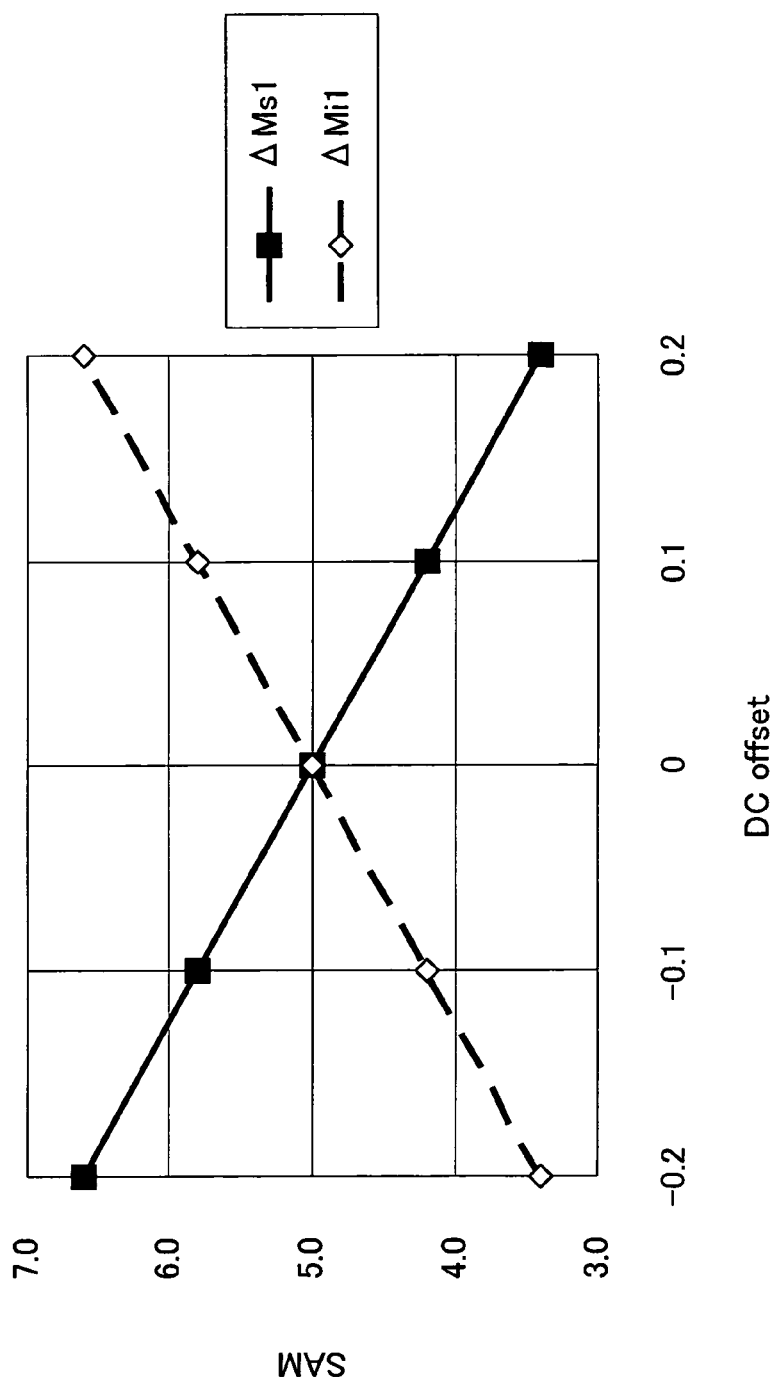
FIG. 12 is a graph representing changes in the value of a path metric difference $\Delta Ms1$ corresponding to a pattern "000000" and the value of a path metric difference $\Delta Mi1$ corresponding to a reverse pattern "111111" when a DC offset is added to an ideal waveform.

FIG. 12 represents changes in the value of the path metric difference $\Delta Ms1$ for the specific pattern "000000" and the value of the path metric difference $\Delta Mi1$ for the reverse pattern "111111" when a DC offset is added to the ideal waveform. The ideal SAM value for the specific and reverse patterns is 5. When the DC offset is 0, $\Delta Ms1$ and $\Delta Mi1$ are both 5. The values are variable due to the DC offset.

Figure 13:
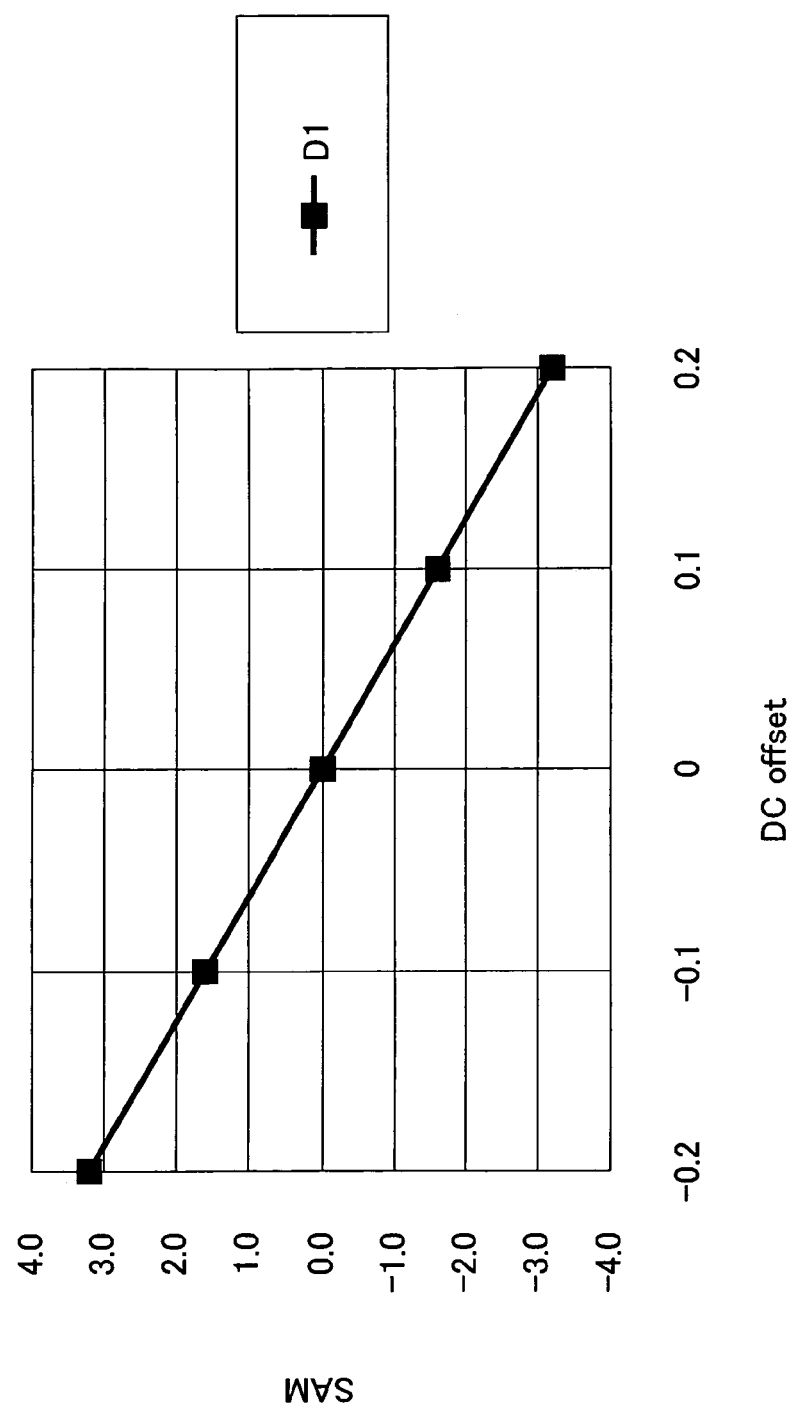
FIG. 13 is a graph representing changes in the value of D1 which is the difference between the path metric difference $\Delta Ms1$ and the value of the path metric difference $\Delta Mi1$ in FIG. 12.

Calculating D1 (difference between the path metric difference $\Delta Ms1$ for the specific pattern and the path metric difference $\Delta Mi1$ for the reverse pattern), the graph in FIG. 13 can be plotted which shows that D1 is variable due to the DC offset value. In other words, reproduced signals in the same writing state produce different evaluation results depending on the DC offset value.

Figure 14:
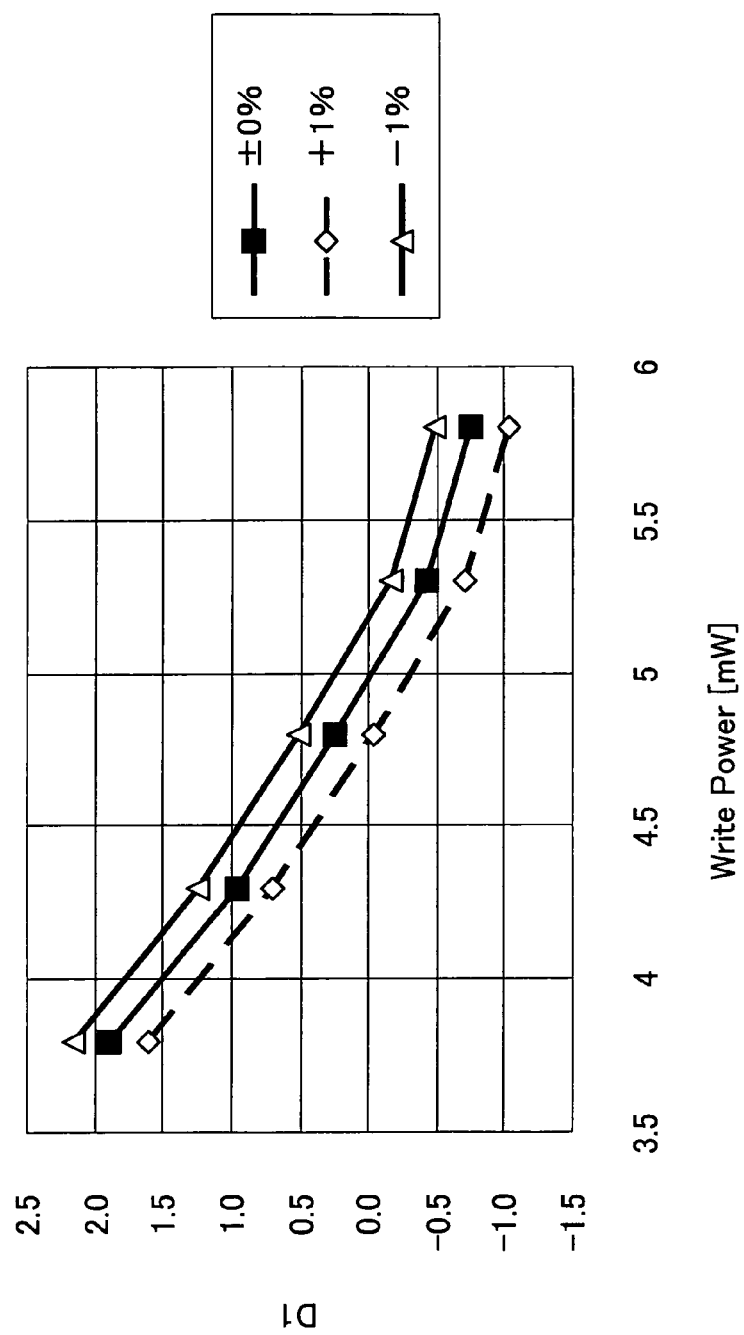
FIG. 14 is a graph representing results of reproduction (D1) from marks which are written with different write powers for cases where DC offsets are added which are 0 and ±1% of an ideal waveform amplitude.

FIG. 14 shows D1 when a DC offset is added to signals reproduced from recording regions which were written with different write powers. The figure shows a case where the DC offset is zero and those where the DC offset is ±1% of the ideal waveform amplitude (−1 to +1). If one tries to determine those write conditions under which D1 is within a predetermined range as in embodiment 2, the determined write conditions change depending on the DC offset value, and good writing may not be possible.

Accordingly, the evaluation of a reproduced signal here lowers the effect of the DC offset through the use of a pattern different from the specific pattern "000000" and the reverse pattern "1111111."

Let the specific pattern "000000" be the first specific pattern, the reverse pattern "111111" be the first reverse pattern, "00111" as a new second specific pattern, and the reverse pattern, "11000," of the second specific pattern as a new second reverse pattern. The second specific pattern and the second reverse pattern are set up as patterns which are to be detected respectively in the second specific pattern detection circuit 21 and the second reverse pattern detection circuit 22.

Figure 15:
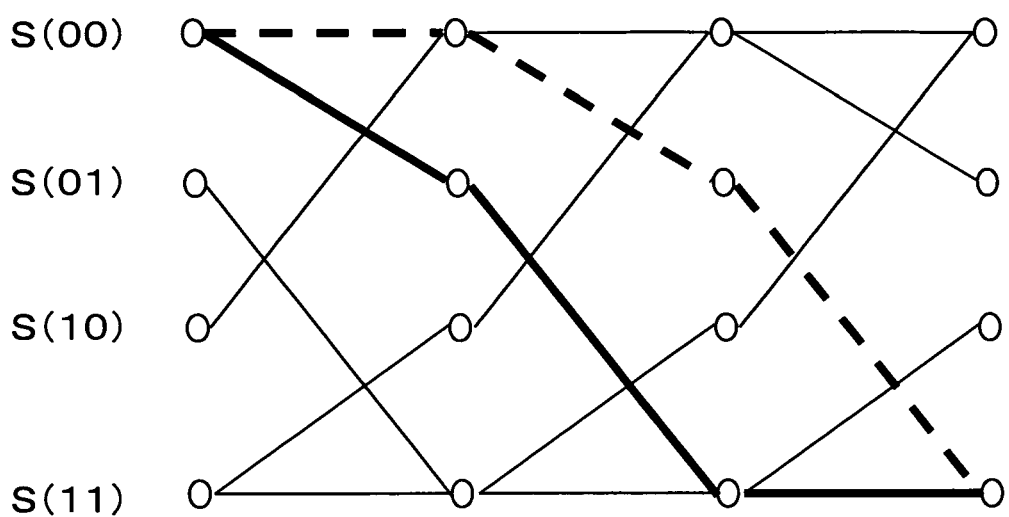
FIG. 15 is a trellis diagram showing a correct path (solid line) and an error path (broken line) corresponding to a pattern "00111" in Viterbi decoding.

Specifically, if the second specific pattern detection circuit 21 detects the second specific pattern "00111" in the decoded bit sequence which is an output from the Viterbi decoding circuit 7, the second specific pattern detection circuit 21 sends a signal to the reproduced signal evaluation circuit 10 so that the path metric difference $\Delta M$ which is an output from the Viterbi decoding circuit 7 corresponding to the second specific pattern is recorded in a memory (not shown) in the reproduced signal evaluation circuit 10 as a path metric difference $\Delta Ms2$. If the path metric difference $\Delta Ms2$ is detected more than once, an average value is calculated as with the path metric difference $\Delta Ms1$ so that the average value is recorded as $\Delta Ms2$. FIG. 15 shows two paths leading to a correct state in a trellis diagram for a specific pattern of "00111." The thick sold line is the correct path. The thick broken line is the error path. The specific pattern has an ideal SAM value of 1.5.

If the second reverse pattern detection circuit 22 detects the second reverse pattern "11000" in the decoded bit sequence which is an output from the Viterbi decoding circuit 7, the second reverse pattern detection circuit 22 sends a signal to the reproduced signal evaluation circuit 10 so that the path metric difference $\Delta M$ which is an output from the Viterbi decoding circuit 7 corresponding to the second reverse pattern is recorded in a memory (not shown) in the reproduced signal evaluation circuit 10 as a path metric difference $\Delta Mi2$. If the path metric difference $\Delta Mi2$ is detected more than once, an average value is calculated as with the path metric difference $\Delta Mi1$ so that the average value is recorded as $\Delta Mi2$.

Figure 16:
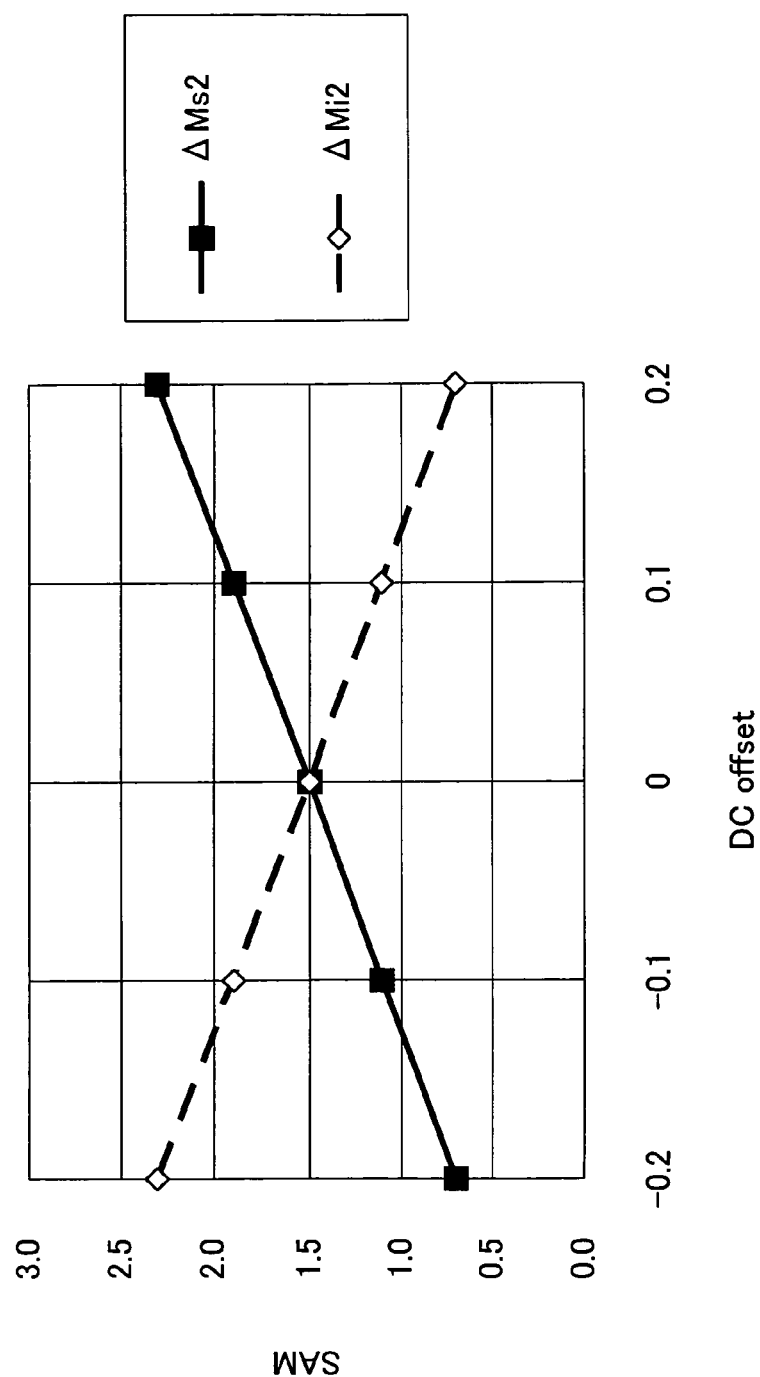
FIG. 16 is a graph representing changes in the value of a path metric difference $\Delta Ms2$ corresponding to a pattern "00111" and the value of a path metric difference $\Delta Mi2$ corresponding to a reverse pattern "11000" when a DC offset is added to an ideal waveform.

FIG. 16 represents changes in the value of the path metric difference $\Delta Ms2$ for the specific pattern "00111" and the path metric difference $\Delta Mi2$ for the reverse pattern "11000" when a DC offset is added to the ideal waveform. When DC offset=0, $\Delta Ms2$ and $\Delta Mi2$ are both equal to 1.5. The values are variable due to the DC offset.

Figure 17:
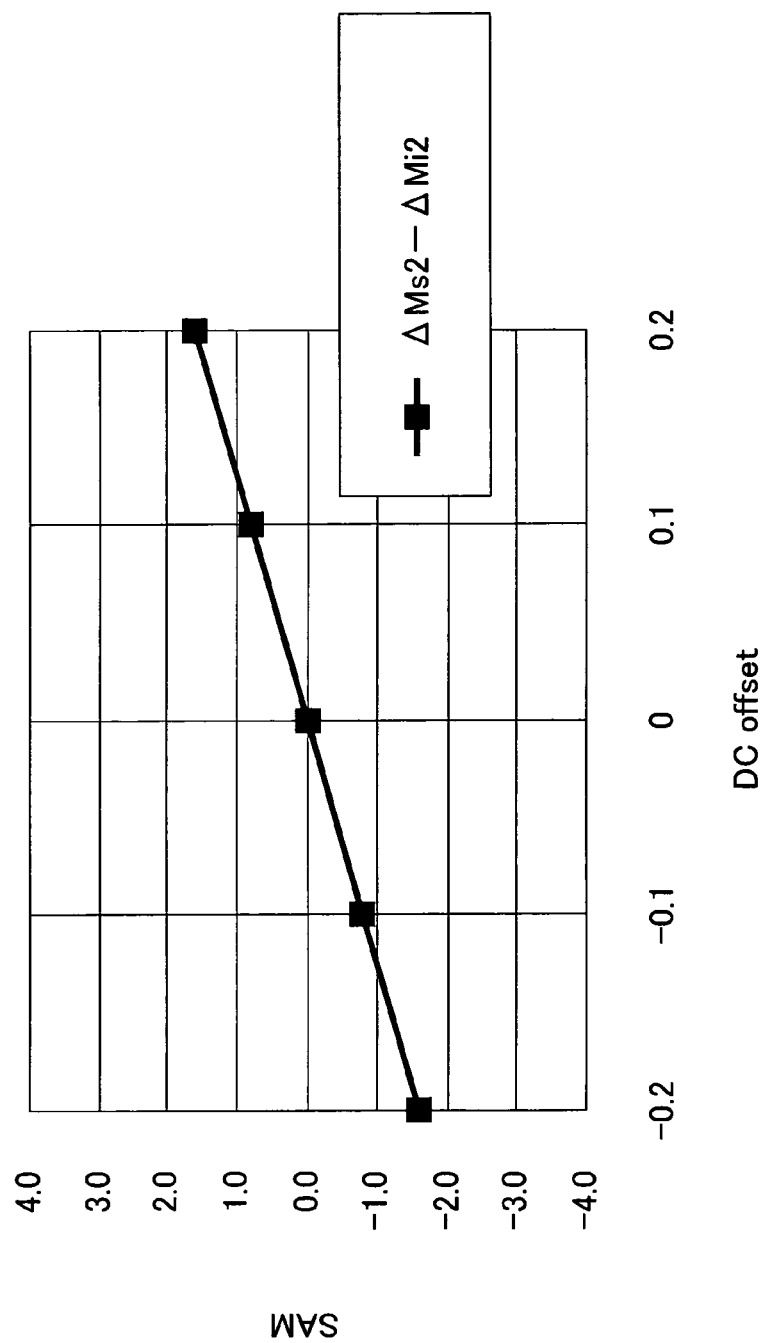
FIG. 17 is a graph representing changes in the value of $\Delta Ms2-\Delta Mi2$ which is the difference between the path metric difference $\Delta Ms2$ and the path metric difference $\Delta Mi2$ in FIG. 16.

Calculating $\Delta Ms2 - \Delta Mi2$ (difference between the path metric difference $\Delta Ms2$ for the second specific pattern and the path metric difference $\Delta Mi2$ for the second reverse pattern), the graph in FIG. 17 can be plotted which shows that $\Delta Ms2 - \Delta Mi2$ is variable due to the DC offset value.

Comparing FIG. 13 to FIG. 17, it is understood that the addition of the same DC offset results in changes of D1 and $\Delta Ms2 - \Delta Mi2$ which have opposite signs and a ratio of 2:1. Let us consider a new reproduced signal evaluation index, $D2 = D1 + 2 \times (\Delta Ms2 - \Delta Mi2)$, using this relationship. The index allows an evaluation of the reproduced signal where the DC offset causes reduced variations.

Now, it is explained why the addition of the same DC offset results in changes of D1 and $\Delta Ms2 - \Delta Mi2$ of opposite signs in a ratio of 2:1. The explanation assumes PR (A, B, A) and that the DC offset component for the ideal waveform is d.

When the specific pattern is "000000," the ideal waveform for the correct path "000000" has levels {A, 0, 0, 0, 0, A}, and the ideal waveform for the error path "001100" has levels {A, A, A+B, A+B, A, A}. When the ideal waveform for the correct path plus the DC offset component d is the waveform of the reproduced signal, the path metric difference $\Delta Ms1$ is given by the equation:

$$\Delta Ms1 = \{d^2 - d^2\} + \{(A-d)^2 - d^2\} + \{(A+B-d)^2 - d^2\}$$
$$+ \{(A+B-d)^2 - d^2\} + \{(A-d^2-d^2\} + \{d^2 - d^2\}$$
$$= \{2A^2 + 2(A+B)^2\} - 4d(2A+B)$$

Meanwhile, as to the path metric difference $\Delta Mi1$ for the reverse pattern "1111111," the ideal waveform for the correct path has levels {A+B, 2A+B, 2A+B, 2A+B, 2A+B, A+B}. The ideal waveform for the error path "110011" has levels {A+B, A+B, A, A, A+B, A+B}. When the ideal waveform for the error path plus the DC offset component d is the waveform of the reproduced signal, the path metric difference $\Delta Mi1$ is given by the equation:

$$\Delta Mi1 = \{(A+d)^2 - (A+d)^2\} + \{(A+d)^2 - d^2\} +$$
$$+ \{(A+B+d)^2 - d^2\} + \{A+B+d)^2 - d^2\}$$
$$+ \{(A+B+d)^2 - d^2\} + \{(A+d)^2 - (A+d)^2\}$$
$$= \{2A^2 + 2(A+B)^2\} + 4d(2A+B)$$

If the reproduced signal waveform is regarded as the ideal waveform, D1 is equal to the difference between the two equations: $-8d(2A+B)$.

Next, when the second specific pattern is "00111," the ideal waveform for the correct path "00111" has levels $\{0, A, A+B, 2A+B, 2A+B\}$, and the ideal waveform for the error path "00011" has levels $\{0, 0, A, A+B, 2A+B\}$. When the ideal waveform for the correct path plus the DC offset component d is the waveform of the reproduced signal, the path metric difference $\Delta Ms2$ is given by the equation:

$$\Delta Ms2 = \{d^2 - d^2\} + \{(A+d)^2 - d^2\} + \{(B+d)^2 - d^2\}$$
$$+ \{(A+d)^2 - d^2\} + \{d^2 - d^2\}$$
$$= \{2A^2 + 2B^2\} + 2d(2A+B)$$

Meanwhile, as to the path metric difference $\Delta Mi2$ for the reverse pattern "11000," the ideal waveform for the correct path has levels $\{2A+B, A+B, A, 0, 0\}$. The ideal waveform for the error path "11100" has levels $\{2A+B, 2A+B, A+B, A, 0\}$. Therefore, $$\Delta Mi2 = \{d^2 - d^2\} + \{(A-d)^2 - d^2\} + \{B-d)^2 - d^2\}$$
$$+ \{(A-d)^2 - d^2\} + \{d^2 - d^2\}$$
$$= \{2A^2 + 2B^2\} - 2d(2A+B)$$

If the reproduced signal waveform is regarded as the ideal waveform, $\Delta Ms2 - \Delta Mi2$ is equal to the difference between the two equations: $4d(2A+B)$.

Therefore, the changes of $D1=-8d(2A+B)$ and $\Delta Ms2-\Delta Mi2=4d(2A+B)$ has opposite signs and a ratio of 2:1.

Figure 18:
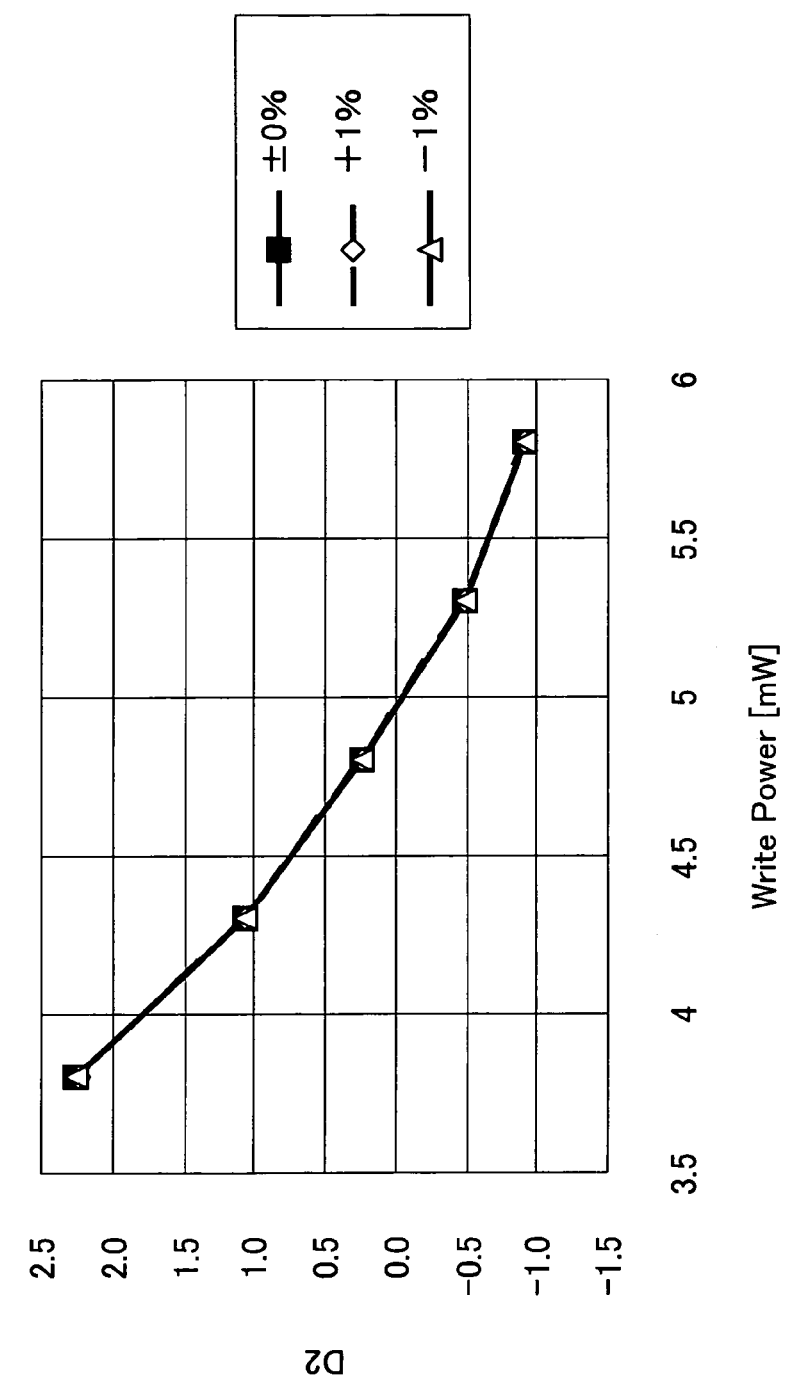
FIG. 18 is a graph representing results of reproduction (D2=D1+2×($\Delta Ms2-\Delta Mi2$)) from marks which are written with different write powers for cases where DC offsets are added which are 0 and ±1% of an ideal waveform amplitude.

FIG. 18 shows the new evaluation index D2 calculated from the reproduced signals plus the DC offset, the signal being reproduced from recording regions written with different write powers. It is understood that substantially the same results are obtained in the case of zero DC offset and in the cases where the DC offset is ±1% of the ideal waveform amplitude (−1 to +1) to which the offset is added.

Now let us consider cases where the second specific pattern is "00011" instead of "00111" and the second reverse pattern is the reverse pattern, "11100," of "00011" instead of "11000."

Figure 19:
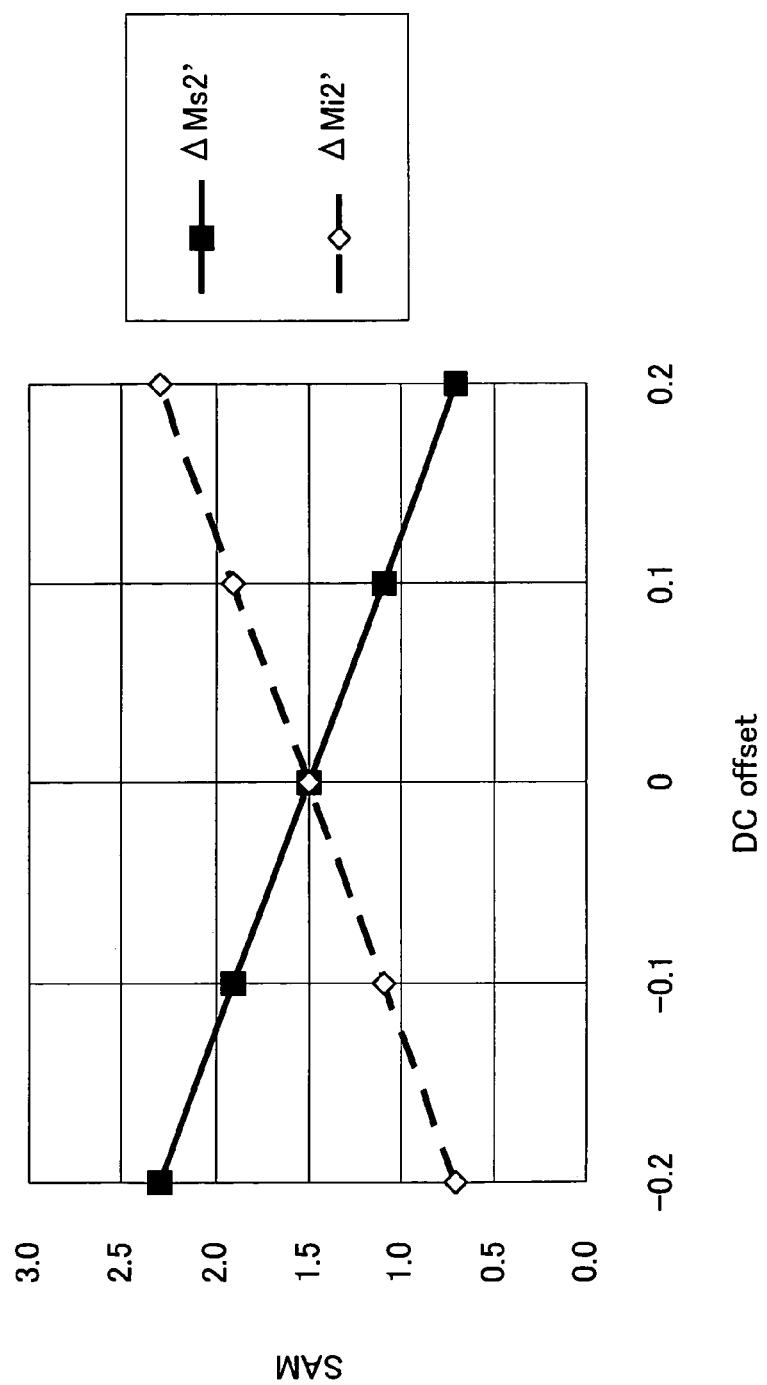
FIG. 19 is a graph representing changes in the value a path metric difference $\Delta Ms2'$ corresponding to a pattern "00011" and the value of a path metric difference $\Delta Mi2'$ corresponding to a reverse pattern "11100" when a DC offset is added to an ideal waveform.

FIG. 19 represents changes in the value of a path metric difference $\Delta Ms2'$ for the specific pattern "00011" and a path metric difference $\Delta Mi2'$ for the reverse pattern "11100" when a DC offset is added to the ideal waveform. When DC offset=0, $\Delta Ms2'$ and $\Delta Mi2'$ are both equal to 1.5. The values are variable due to the DC offset.

Figure 20:
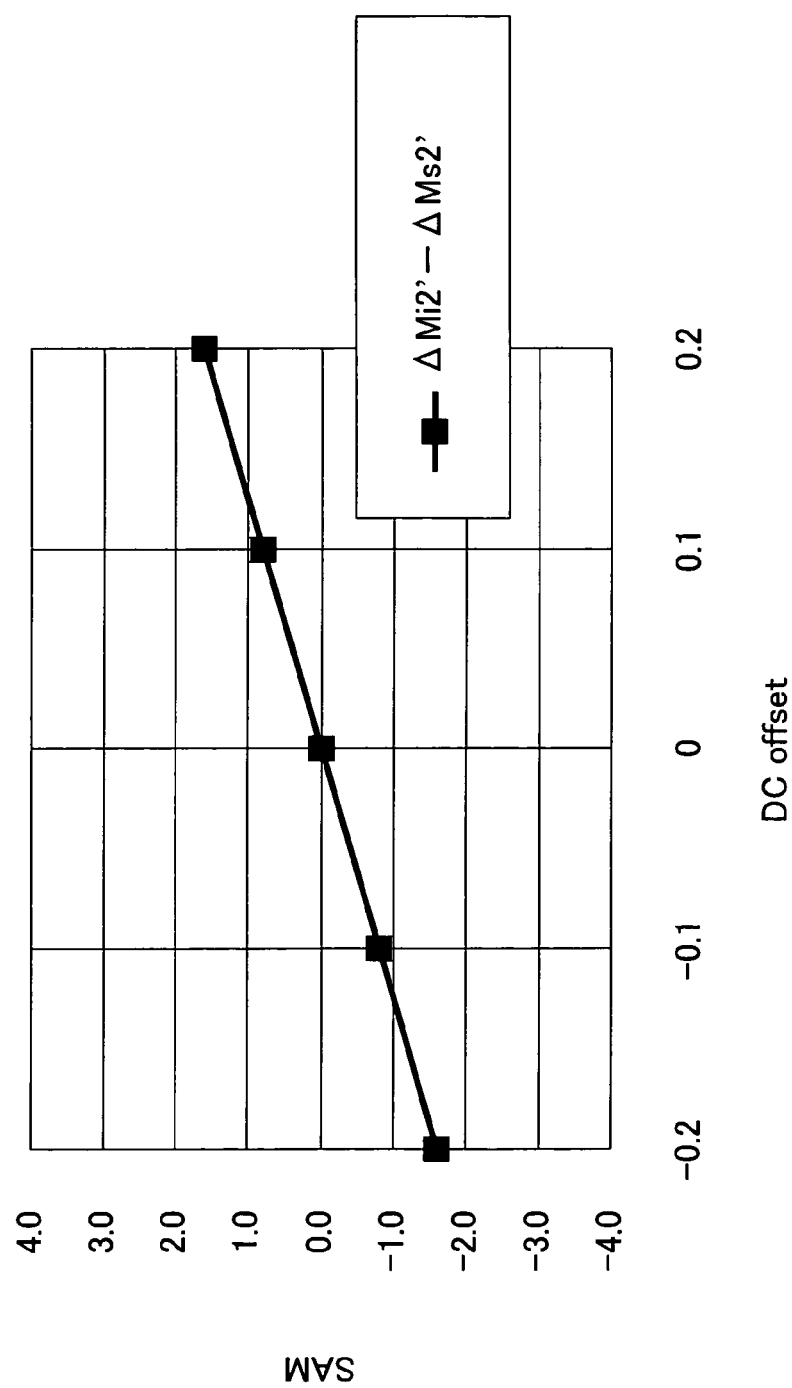
FIG. 20 is a graph representing changes in the value of $\Delta Mi2'-\Delta Ms2'$ which is the difference between the path metric difference $\Delta Mi3$ and the path metric difference $\Delta Ms3$ in FIG. 19.

Calculating $\Delta Mi2'-\Delta Ms2'$ (difference between the path metric difference $\Delta Mi2'$ for the second reverse pattern and the path metric difference $\Delta Ms2'$ for the second specific pattern), the graph in FIG. 20 can be plotted which shows that $\Delta Mi2'-\Delta Ms2'$ is variable due to the DC offset. Comparing FIG. 13 to FIG. 20, it is understood that the addition of the same DC offset results in changes of D1 and $\Delta Mi2'-\Delta Ms2'$ which have opposite signs and a ratio of 2:1. Devising a new reproduced signal evaluation index, $D3=D1+2\times(\Delta Mi2'-\Delta Ms2')$, using the relationship allows an evaluation of the reproduced signal where the DC offset causes reduced variations.

Now, it is explained why the addition of the same DC offset results in changes of D1 and $\Delta Mi2'-\Delta Ms2'$ of opposite signs in a ratio of 2:1. This explanation also assumes PR (A, B, A) and that the DC offset component for the ideal waveform is d.

When the second specific pattern is "00011," the ideal waveform for the correct path "00011" has levels $\{0, 0, A, A+B, 2A+B\}$, and the ideal waveform for the error path "00111" has levels $\{0, A, A+B, 2A+B, 2A+B\}$. When the ideal waveform for the correct path plus the DC offset component d is the waveform of the reproduced signal, the path metric difference $\Delta Ms2'$ is given by the equation:

$$\Delta Ms2' = \{d^2 - d^2\} + \{(A-d)^2 - d^2\} + \{(B-d)^2 - d^2\}$$
$$+ \{(A-d)^2 - d^2\} + \{d^2 - d^2\}$$
$$= \{2A^2 + 2B^2\} - 2d(2A+B)$$

Meanwhile, as to the path metric difference $\Delta Mi2'$ for the reverse pattern "11100," the ideal waveform for the correct path has levels $\{2A+B, 2A+B, A+B, A, 0\}$. The ideal waveform for the error path "11000" has levels $\{2A+B, A+B, A, 0, 0\}$. Therefore, $$\Delta Mi2'=\{d^2-d^2\}+\{(A+d)^2-d^2\}+\{(B+d)^2-d^2\}+$$
$$\{(A+d)^2-d^2\}+\{d^2-d^2\}$$
$$=\{2A^2+2B^2\}+2d(2A+B)$$

If the reproduced signal waveform is regarded as the ideal waveform, $\Delta Mi2'-\Delta Ms2'$ is equal to the difference between the two equations: $4d(2A+B)$.

Therefore, the changes of $D1=-8d(2A+B)$ and $\Delta Mi2'-\Delta Ms2'=4d(2A+B)$ has opposite signs and a ratio of 2:1.

Figure 21:
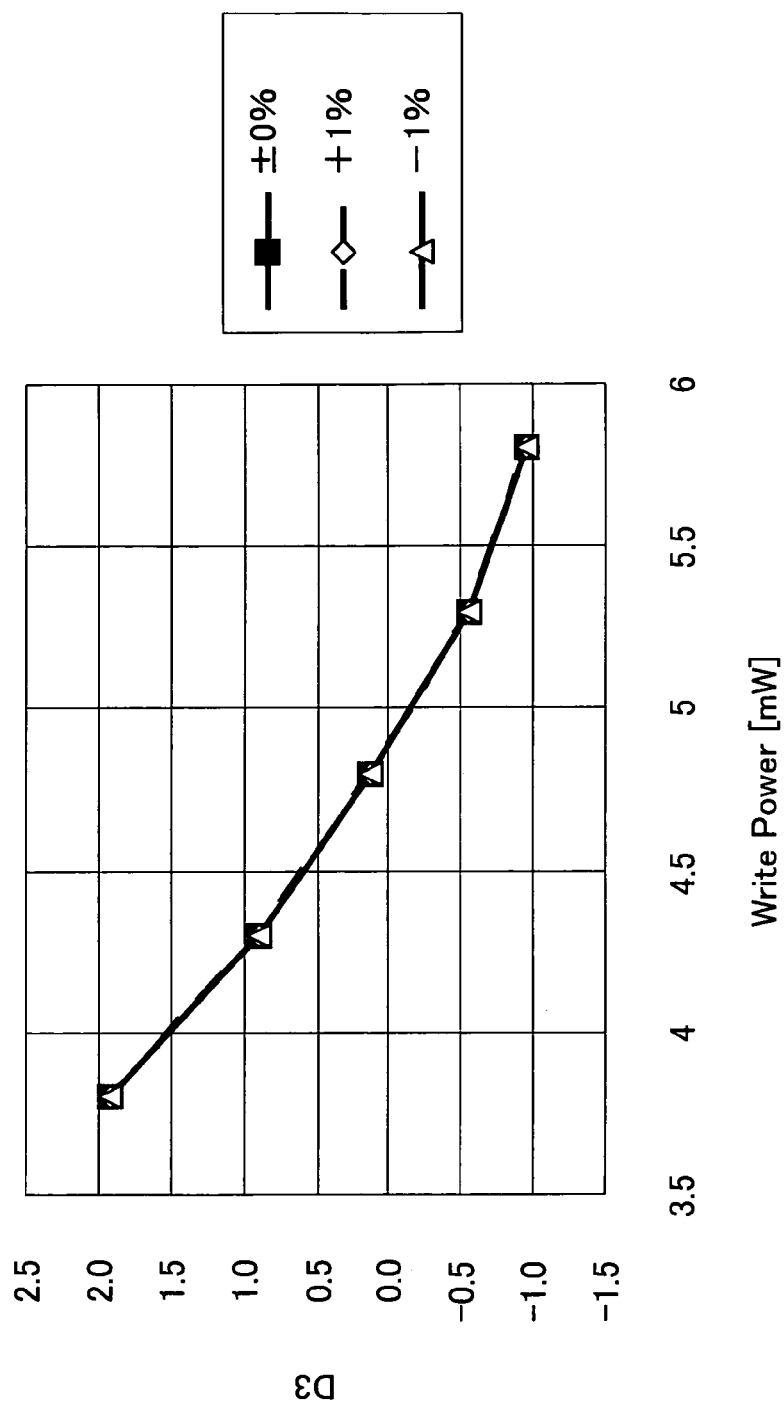
FIG. 21 is a graph representing results of reproduction (D3=D1+2×($\Delta Mi3-\Delta Ms3$)) from marks which are written with different write powers for cases where DC offset are added which are 0 and ±1% of an ideal waveform amplitude.

FIG. 21 shows the new evaluation index D3 calculated from the reproduced signals plus the DC offset, the signal being reproduced from recording regions written with different write powers. It is understood that substantially the same results are obtained in the case of zero DC offset and in the cases where the DC offset is ±1% of the ideal waveform amplitude (−1 to +1) to which the offset is added.

The same results are obtainable by specifying a reproduced signal evaluation index from the specific pattern "000000" designated as the first specific pattern, the reverse pattern "111111" as the first reverse pattern, "00111" as the second specific pattern, "11000" as the second reverse pattern, "00011" as the third specific pattern, and "11100" as the third reverse pattern.

Figure 22:
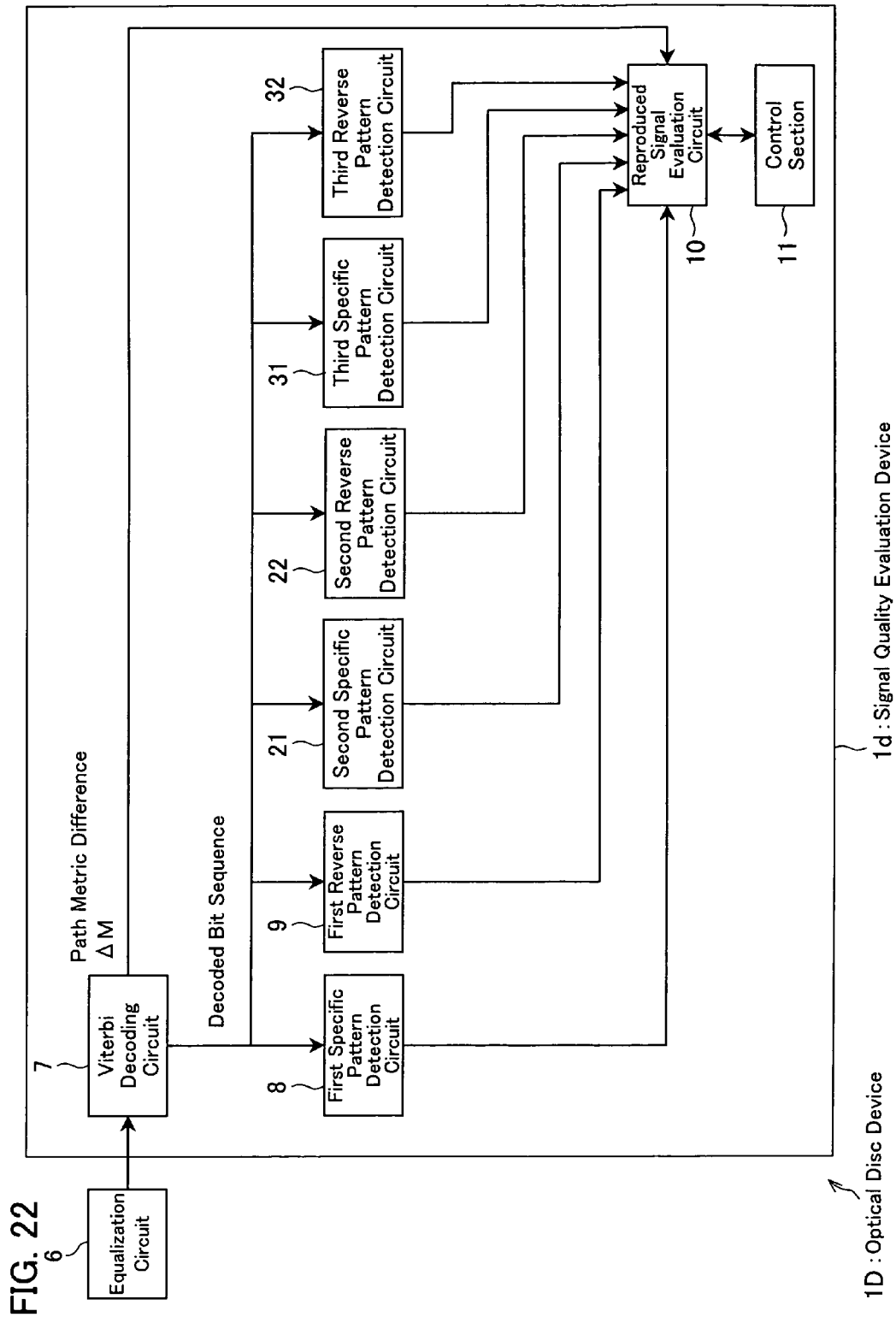
FIG. 22 is a block diagram illustrating the structure of a major part of another optical disc device in accordance with the third embodiment of the present invention.

To do that, as shown in FIG. 22, an optical disc device 1D may be used which includes a signal quality evaluation device 1d in place of the signal quality evaluation device 1c in the optical disc device 1C. When compared to the signal quality evaluation device 1c, the device 1d includes additional members: a third specific pattern detection circuit 31 and a third reverse pattern detection circuit 32. The first to third specific pattern detection circuits 8, 21, 31 serve as specific pattern detection means. The first to third reverse pattern detection circuits 9, 22, 32 serve as reverse pattern detection means. FIG. 22 shows only the arrangement in and around the signal quality evaluation device 1d in the optical disc device 1D. The members in the optical disc device 1D that have the same arrangement and function as members in the optical disc device 1C are indicated by the same reference numerals, and the description thereof is omitted.

The second specific pattern and the second reverse pattern are specified as the patterns that should be detected respectively in the second specific pattern detection circuit 21 and the second reverse pattern detection circuit 22 in FIG. 22. The third specific pattern and the third reverse pattern are specified as the patterns that should be detected respectively the third specific pattern detection circuit 31 and the third reverse pattern detection circuit 32 in FIG. 22.

In the optical disc device 1D, if the patterns are detected in the decoded bit sequence which is an output from the Viterbi decoding circuit 7, the detection circuit sends a signal to the reproduced signal evaluation circuit 10 in accordance with the patterns so that the path metric difference ΔM which is an output from the Viterbi decoding circuit 7 corresponding to the patterns is recorded in a memory (not shown) in the reproduced signal evaluation circuit 10 as a path metric difference corresponding to the patterns.

Figure 23:
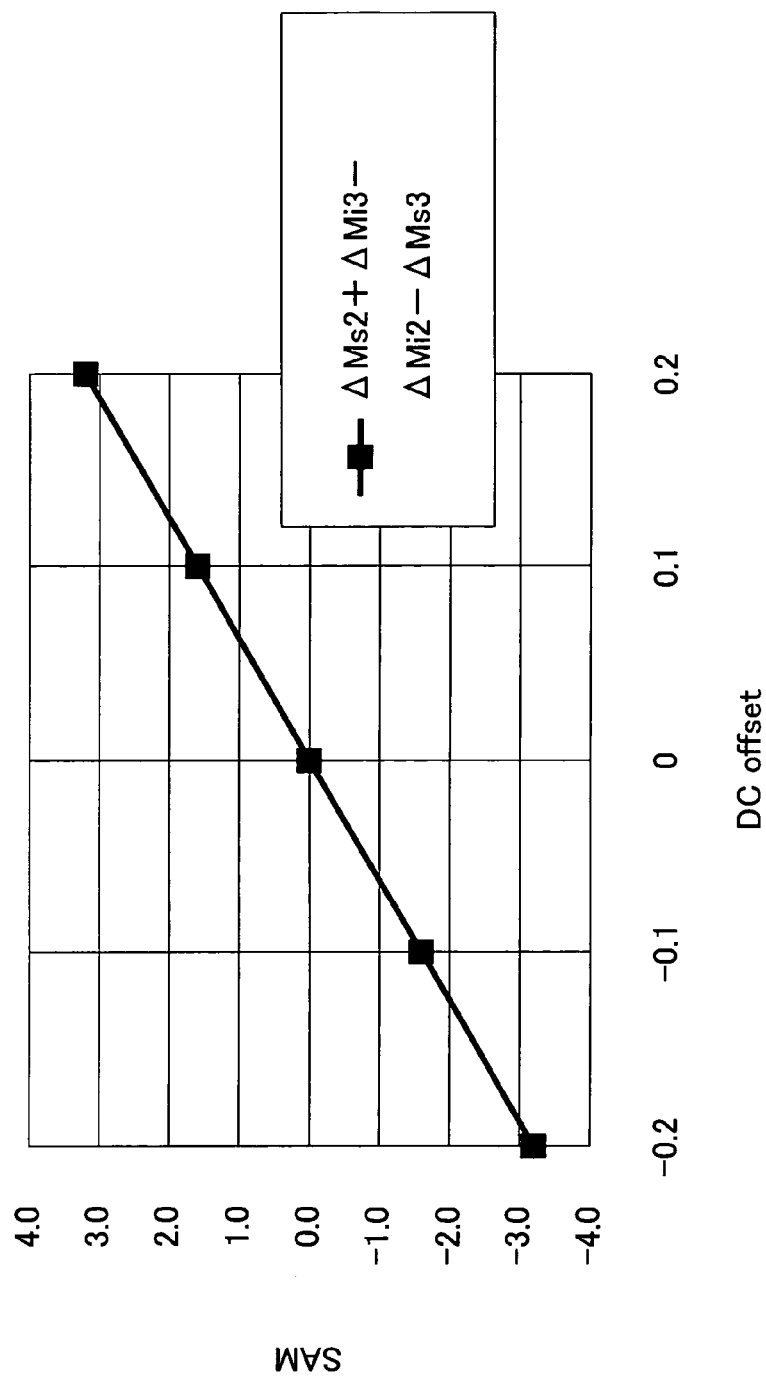
FIG. 23 is a graph representing changes in the value of $\Delta Ms2+\Delta Mi3-\Delta Mi2-\Delta Ms3$ which is the sum of $\Delta Ms2-\Delta Mi2$ in FIG. 17 and $\Delta Mi3-\Delta Ms3$ in FIG. 20.

Specifically, calculating ΔMs2+ΔMi3−ΔMi2−ΔMs3 from the path metric difference ΔMs2 for the second specific pattern, the path metric difference ΔMi2 for the second reverse pattern, the path metric difference ΔMs3 for the third specific pattern, and the path metric difference ΔMi3 for the third reverse pattern, the graph in FIG. 23 can be plotted which shows that ΔMs2+ΔMi3−ΔMi2−ΔMs3 is variable due to the DC offset. Comparing FIG. 13 to FIG. 23, it is understood that the addition of the same DC offset results in changes of D1 and ΔMs2+ΔMi3−ΔMi2−ΔMs3, which have opposite signs and a ratio of 1:1. Devising a new reproduced signal evaluation index, D4=D1+(ΔMs2+ΔMi3−ΔMi2−ΔMs3), using the relationship allows an evaluation of the reproduced signal where the DC offset causes reduced variations.

The reasons why the addition of the same DC offset results in changes of D1 and ΔMs2+ΔMi3−ΔMi2−ΔMs3 of opposite signs in a ratio of 1:1 are also understandable by assuming PR (A, B, A) and that the DC offset component for the ideal waveform is d and calculating the path metric difference in the same fashion as above.

Figure 24:
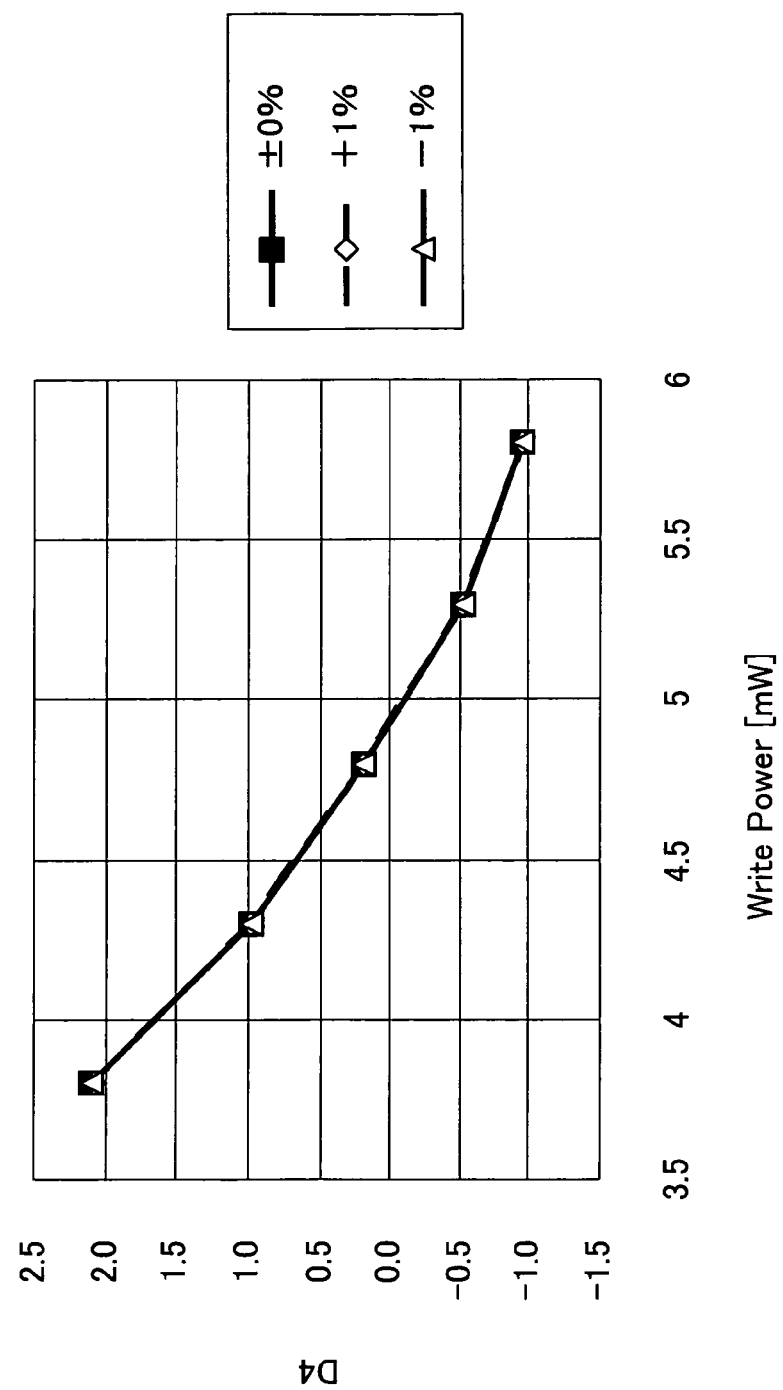
FIG. 24 is a graph representing results of reproduction (D4=D1+($\Delta Ms2+\Delta Mi3-\Delta Mi2-\Delta Ms3$)) from marks which are written with different write powers for cases where DC offset are added which are 0 and ±1% of an ideal waveform amplitude.

FIG. 24 shows the new evaluation index D4 calculated from the reproduced signals plus the DC offset, the signal being reproduced from recording regions written with different write powers. It is understood that substantially the same results are obtained in the case of zero DC offset and in the cases where the DC offset is ±1% of the ideal waveform amplitude (−1 to +1) to which the offset is added.

As described in the foregoing, unlike the conventional signal quality evaluation technique where consideration is given only to the bit sequence with which the probability of SAM<0 is highest due to noise, in other words, the bit sequence with a minimum ideal SAM value, the optical disc devices 1C, 1D are capable of evaluation with amplitude asymmetry in the signal being considered. The devices 1C, 1D are therefore more accurate in signal quality evaluation.

The optical disc devices 1C, 1D performs such calculations that the variations in the evaluation index D1 caused by the variations in the DC offset added to the reproduced signal cancel out the variations in 2×(ΔMs2−ΔMi2), 2×(ΔMi2'−ΔMs2'), or ΔMs2+ΔMi3−ΔMi2−ΔMs3. Accordingly, the evaluation indices D2 to D4 are not susceptible to the DC offset added to the reproduced signal. The devices 1C, 1D are therefore more accurate in signal quality evaluation.

As described in embodiment 1, the difference between the single path metric difference corresponding to the specific pattern and the single path metric difference corresponding to the reverse pattern may be calculated instead of the difference between the average value of the path metric differences corresponding to the specific pattern and the average value of the path metric differences corresponding to the reverse pattern, so as to calculate an average value of the differences for use. The difference between the single path metric difference corresponding to the specific pattern and the single path metric difference corresponding to reverse pattern may be used by itself.

Embodiment 4

The following will describe a fourth embodiment of the present invention in reference to FIG. 25 to FIG. 28.

The present embodiment is realized using the optical disc devices 1A, 1B, 1C, 1D described in embodiments 1 to 3.

If recording regions are written with different write powers, the signals reproduced from the regions may vary in amplitude depending on the size of the recorded marks. The signal reproduced from a mark written with a relatively small write power has a small amplitude. The greater the write power, the greater the amplitude of the reproduced signal. Even if the amplitude gain for the reproduced signal is fixed in the A/D converter 5, etc. (see FIGS. 1 and 6) in the optical disc devices 1A, 1B, 1C, 1D, similar results to those obtained when the amplitude gain is varied may be obtained depending on the recording mark.

Figure 25:
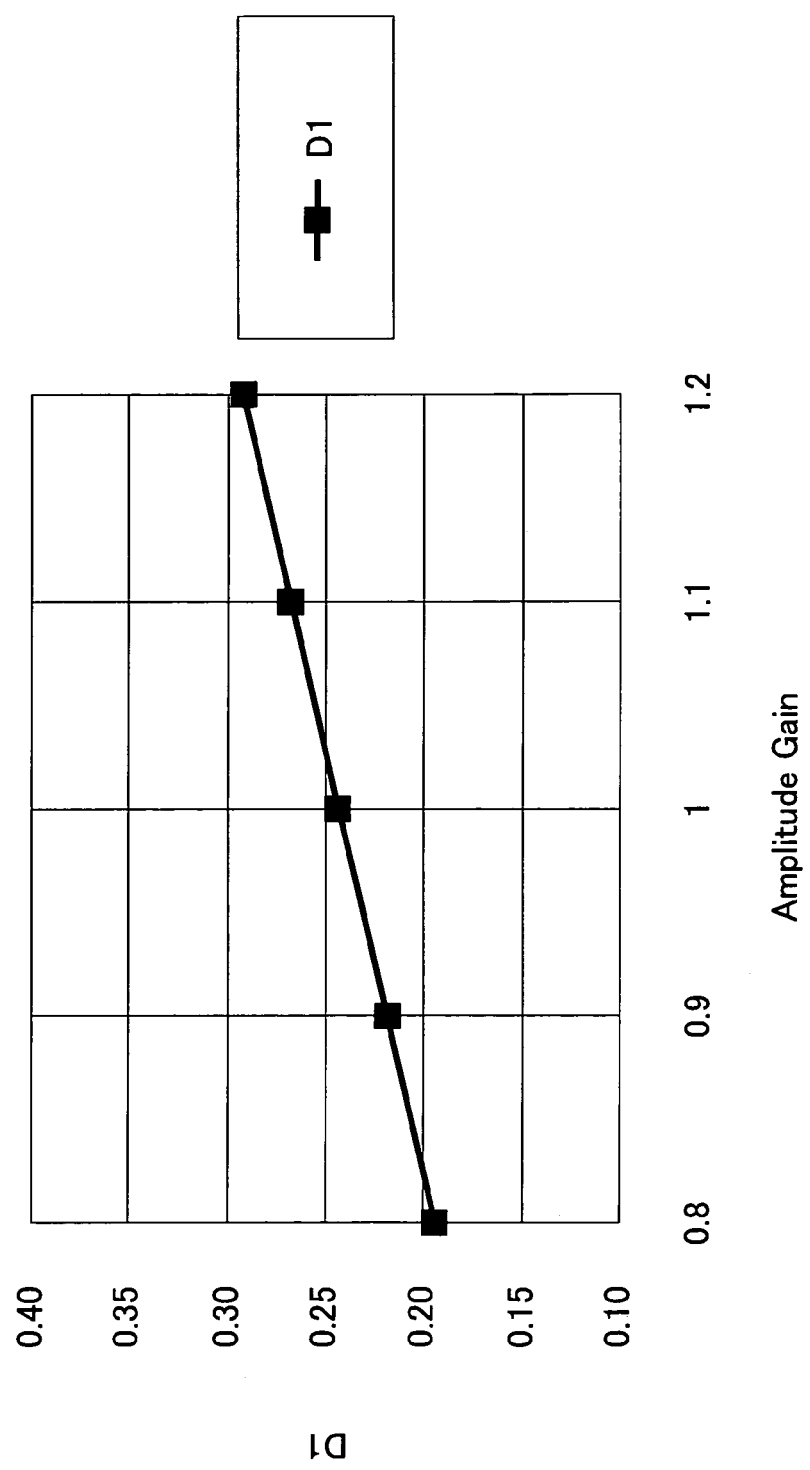
FIG. 25 is a graph representing changes of D1 which is the difference between the path metric difference $\Delta Ms1$ for the pattern "000000" and the path metric difference $\Delta Mi1$ for the reverse pattern "111111" in a case where an amplitude gain is given to the results of reproduction in FIG. 5 at a write power=4.8 mW.

FIG. 25 represents changes of D1 when an amplitude gain is provided to results with a write power of 4.8 mW in FIG. 5. D1 is the difference between the path metric difference ΔMs1 for the specific pattern "000000" and the path metric difference ΔMi1 for the reverse pattern "111111." FIG. 25 demonstrates that the D1 value is in proportion to the amplitude gain.

Figure 26:
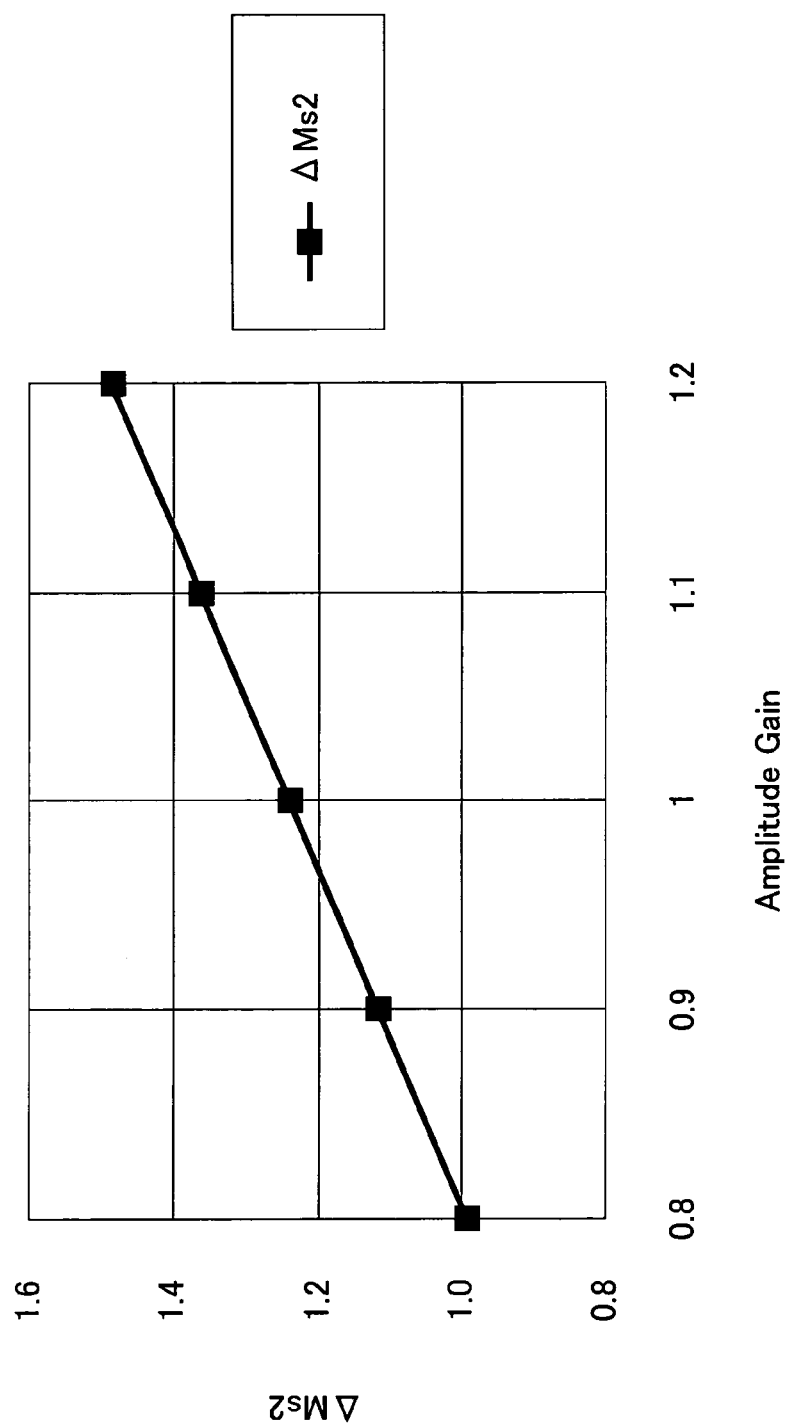
FIG. 26 is a graph representing changes in the value of the path metric difference $\Delta Ms2$ for a second specific pattern "00111" for a case where an amplitude gain is given to the results in FIG. 5 at a write power=4.8 mW.

FIG. 26 represents changes in the path metric difference ΔMs2 for the second specific pattern "00111" when an amplitude gain is provided to results with a write power=4.8 mW in FIG. 5. FIG. 26 demonstrates that the value of the path metric difference ΔMs2 is in proportion to the amplitude gain. The values of the path metric difference ΔMi2 for the second reverse pattern "11000," the path metric difference ΔMs3 for the third specific pattern "00011," and the path metric difference ΔMi3 for the third reverse pattern "111100" are in proportion to the amplitude gain as is ΔMs2.

Therefore, D1, ΔMs2, ΔMi2, ΔMs3, and ΔMi3 all have a common coefficient which represents changes of the amplitude.

The fact is written with the following expressions:

$D1 = G \cdot d1$ $\Delta Ms2 = G \cdot \Delta ms2$ $\Delta Mi2 = G \cdot \Delta mi2$ $\Delta Ms3 = G \cdot \Delta ms3$ $\Delta Mi3 = G \cdot \Delta mi3$ where G is the amplitude gain.

Figure 27:
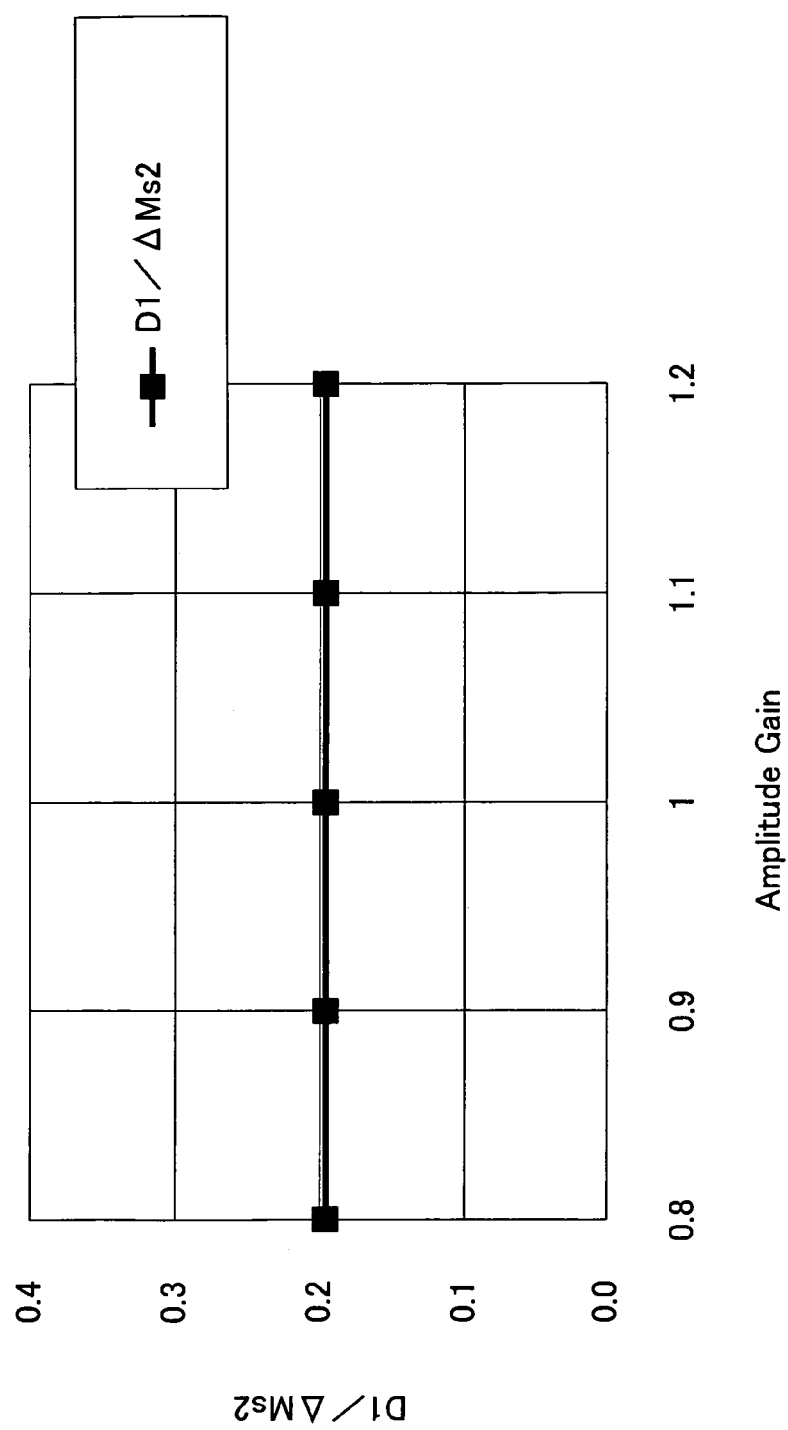
FIG. 27 is a graph representing changes in the value of D1/$\Delta Ms2$ which is a ratio of D1 in FIG. 25 to $\Delta Ms2$ in FIG. 26.

Therefore, the amplitude gain will have less effect if evaluation index D1=ΔMs1−ΔMi1 is normalized with at least one of ΔMs2, ΔMi2, ΔMs3, and ΔMi3. FIG. 27 represents changes of D1 divided by ΔMs2 (=D1/ΔMs2) when an amplitude gain is provided to results with a write power=4.8 mW in FIG. 5. The figure demonstrates that D1/ΔMs2 is substantially constant despite the changes of the amplitude gain.

Figure 28:
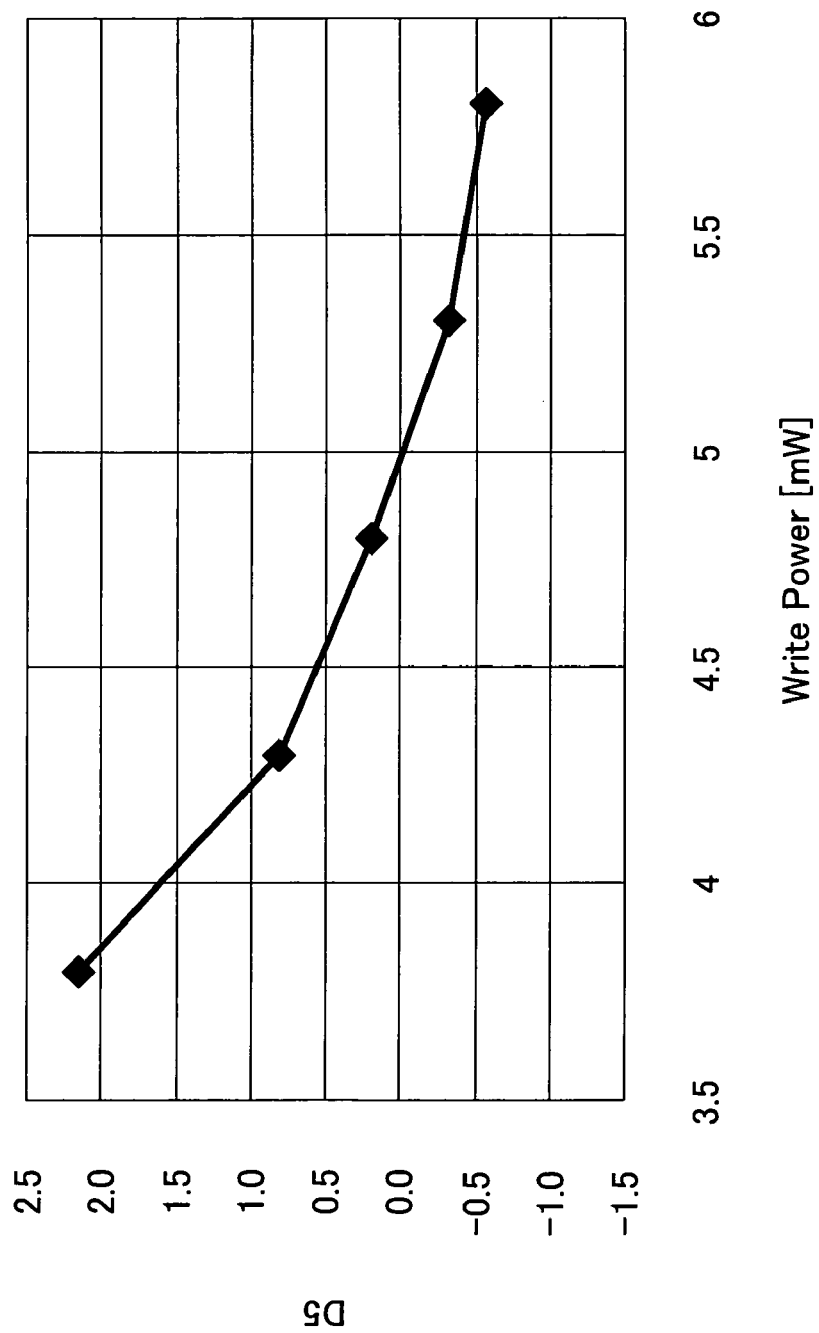
FIG. 28 is a graph showing D5=D1/$\Delta Ms2$ for reproduced signals from recording regions which are written with different write powers.

FIG. 28 shows a new evaluation index D5=D1/ΔMs2 calculated from signals reproduced from recording regions written with different write powers.

It is understood from these results that even if the amplitudes due to a change of write power and similar results to those obtained when the amplitude gain changes, the effect of the change of amplitude is reduced by the calculation of D1/ΔMs2 to realize the evaluation of the reproduced signal. In addition, a change of the write power causes a smaller change of ΔMs2 than in D1; therefore, the general trend in changes of D5 is hardly different from that of D1. Accordingly, the evaluation of the reproduced signal is possible using D5 similarly to the evaluation indices D1, D2, D3, D4.

The present embodiment takes D1/ΔMs2 as an example. ΔMs2 may be replaced with at least one of ΔMs2, ΔMi2, ΔMs3, and ΔMi3, still producing similar effect, because each of them includes a common component G which represents the effect of a change in the amplitude. For example, the average value of the four, i.e. ΔMs2, ΔMi2, ΔMs3, and ΔMi3, also includes a common component G which represents the effect of a change in the amplitude, and therefore produces similar effect. In addition, D1 may be replaced with D2 D3, or D4 described in embodiment 3, still producing a similar effect that the effect of changes in the amplitude is reduced, because the components constituting the respective evaluation indices include a common component G which represents the effect of a change in the amplitude.

As described in the foregoing, unlike the conventional signal quality evaluation technique where consideration is given only to the bit sequence with which the probability of SAM<0 is highest due to noise, in other words, the bit sequence with a minimum ideal SAM value, the optical disc device of the present embodiment is capable of evaluation with amplitude asymmetry in the signal being considered. The device is therefore more accurate in signal quality evaluation.

In addition, in the optical disc device of the present embodiment, one of the evaluation indices D1 to D4 is normalized so that the evaluation index becomes constant with respect to the amplitude gain for the reproduced signal. Accordingly, the device is more accurate in the quality evaluation of the reproduced signal.

As described in the foregoing, the present invention may be carried out in the form of embodiments 1 to 4. The present invention is however by no means limited to embodiments 1 to 4. The invention is variable within the range defined by the claims. In the following, a variation based on embodiments 1 to 4 will be described.

Embodiments 1 to 4 above have described the evaluation of reproduced signals using one of the evaluation indices D1, D2, D3, D4, D5. The evaluation may be done using a combination of two or more evaluation indices which are selected from the evaluation indices D1, D2, D3, D4, D5. For example, to evaluate a signal considering the DC offset and amplitude gain, the quality of the reproduced signal may be evaluated using one of D2, D3, and D4 and D5 in accordance with whether both the evaluation indices are within a predetermined range near 0.

In addition, in embodiment 2, the write conditions have specified using the evaluation index D1 described in embodiment 1. The write conditions may be specified using the evaluation indices D2 to D5 described in embodiments 3 and 4.

In addition, each embodiment has taken as an example PRML detection based on PR (1,2,1) properties. This is by no means limiting the present invention. As another example, the following will describe PRML detection based on PR (1,2,2,1) properties.

Figure 29:
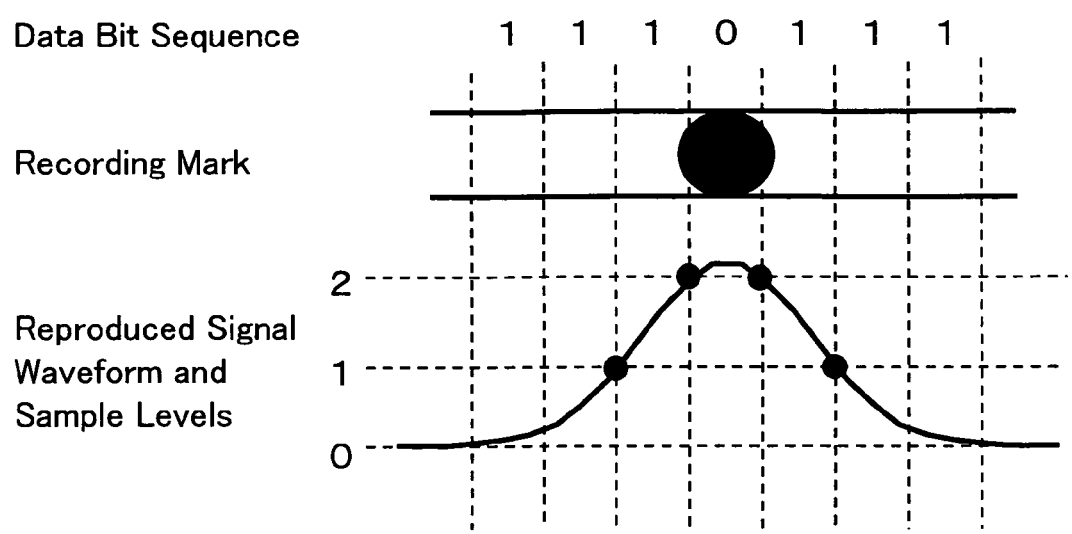
FIG. 29 is an illustration of a reproduced signal waveform in line with PR (1,2,2,1) in association with a data bit sequence and a recording mark.

As shown in FIG. 29, the reproduced signal waveform for an ideal 1T mark which reflects PR (1,2,2,1) and is free of distortion and noise has a 1:2:2:1 sample level ratio for each channel clock. The reproduced signal waveform for a mark longer than or equal to 2T is obtainable through superimpose of waveforms like this one for a 1T mark. For example, the sample level ratio is 1:3:4:3:1 for a 2T mark, 1:3:5:5:3:1 for a 3T mark, and 1:3:5:6:5:3:1 for a 4T mark. An ideal reproduced signal waveform for a given bit sequence is thus known. There are seven ideal sample levels: 0, 1, 2, 3, 4, 5, and 6.

Figure 30:
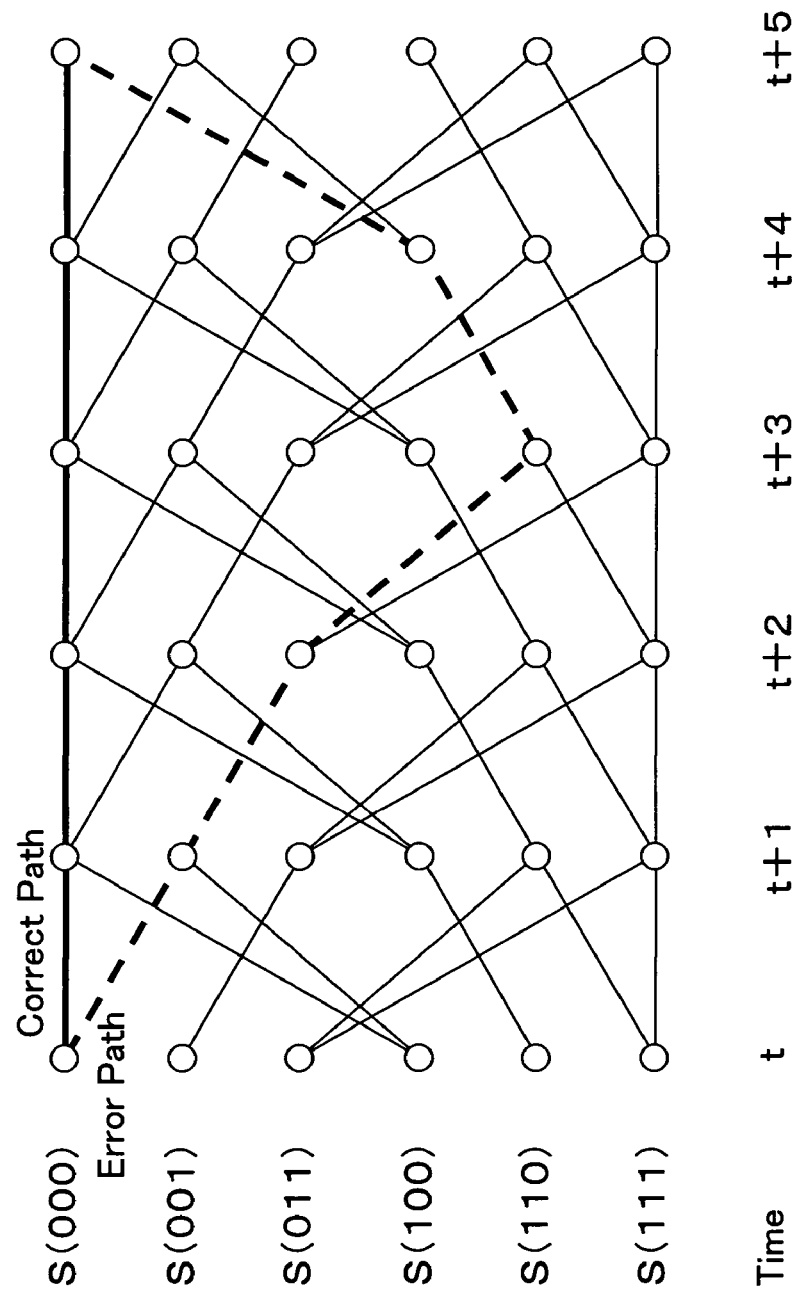
FIG. 30 is a trellis diagram showing a correct path (solid line) and an error path (broken line) corresponding to the pattern "00000000" in Viterbi decoding.

Let us examine the trellis diagram shown in FIG. 30 which is drawn for the Viterbi decoding with the sample levels specified above. In FIG. 30, S(000), S(001), S(011), S(100), S(110), and S(111) denote different states. The trellis diagram demonstrates that the bit sequences 010 and 101 cannot occur due to the d=1 Run Length Limit in the (1,7) RLL code.

Figure 31:
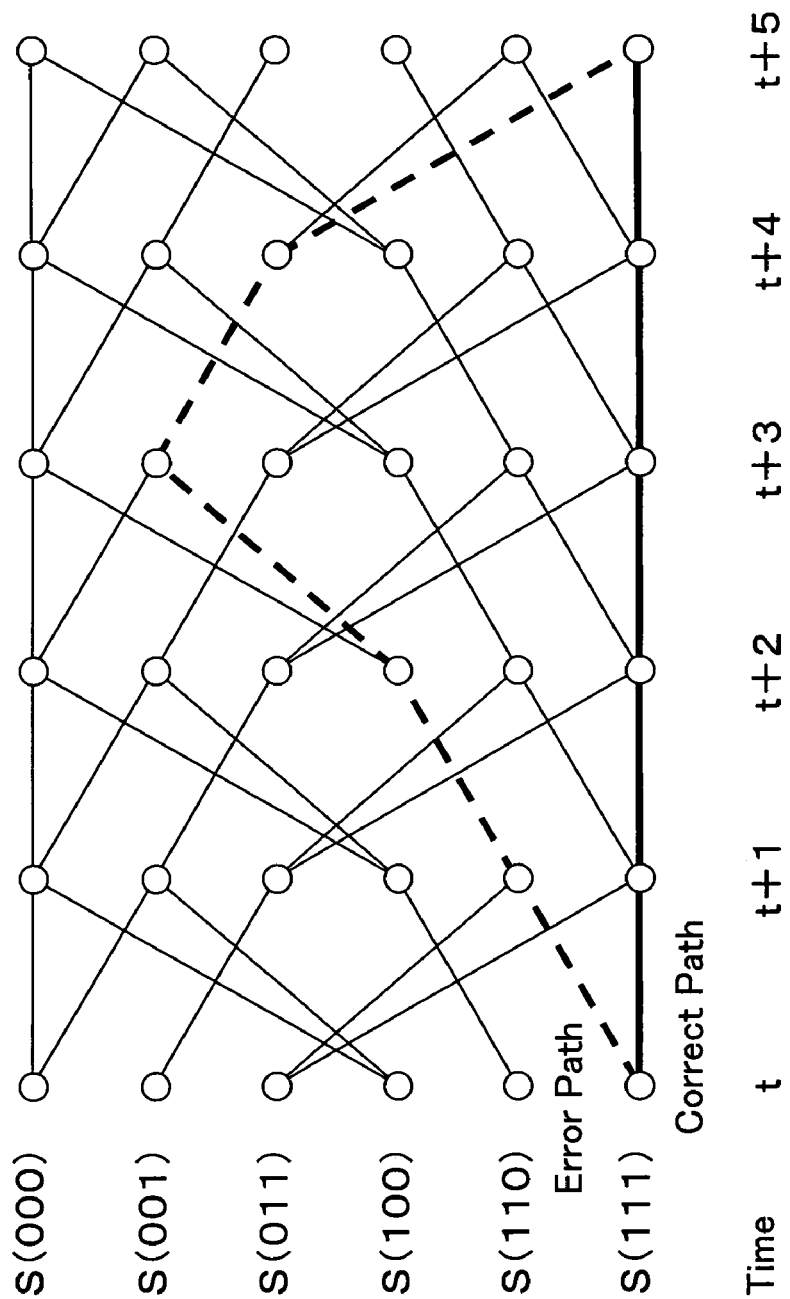
FIG. 31 is a trellis diagram showing a correct path (solid line) and an error path (broken line) corresponding to the pattern "11111111" in Viterbi decoding.

FIG. 30 shows two paths leading to a correct state in a trellis diagram for a specific pattern of "00000000." The thick sold line is the correct path. The thick broken line is the error path. FIG. 31 shows two paths leading to a correct state in a trellis diagram for a the reverse pattern "11111111" for the specific pattern "00000000." The thick sold line is the correct path. The thick broken line is the error path. Similar effects to the embodiments are obtained by utilizing, as the path metric difference Ms1 and the path metric difference Mi1, the path metric differences obtained when these patterns are detected.

In addition, in FIG. 30, the path starts from state S(000) at time t. The path may start from state S(100), still producing similar effects to the embodiments. In addition, the path ends at S(000) at time t+5. The path may end at state S(001), still producing similar effects to the embodiments. The specific pattern, if containing "000000," may take 0 or 1 in the preceding and succeeding bits. Similarly, the reverse pattern, if containing "111111," may take 0 or 1 in the preceding and succeeding bits.

Figure 32:
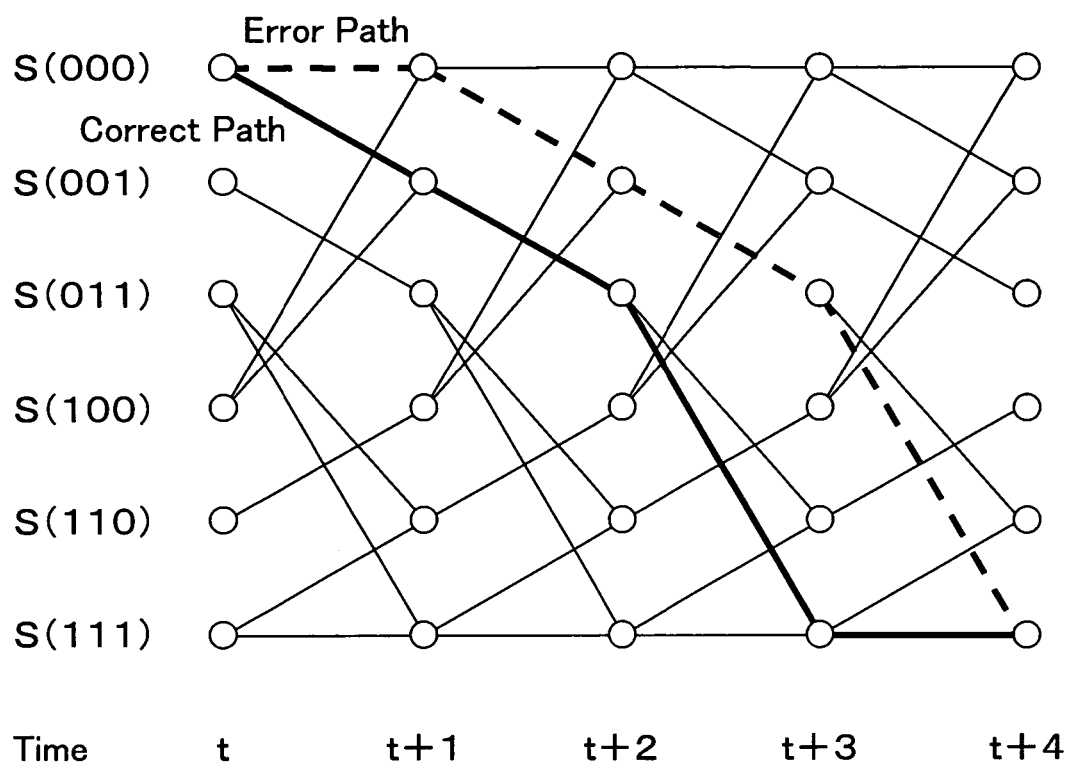
FIG. 32 is a trellis diagram showing a correct path (solid line) and an error path (broken line) corresponding to a pattern "0001111" in Viterbi decoding.
Figure 33:
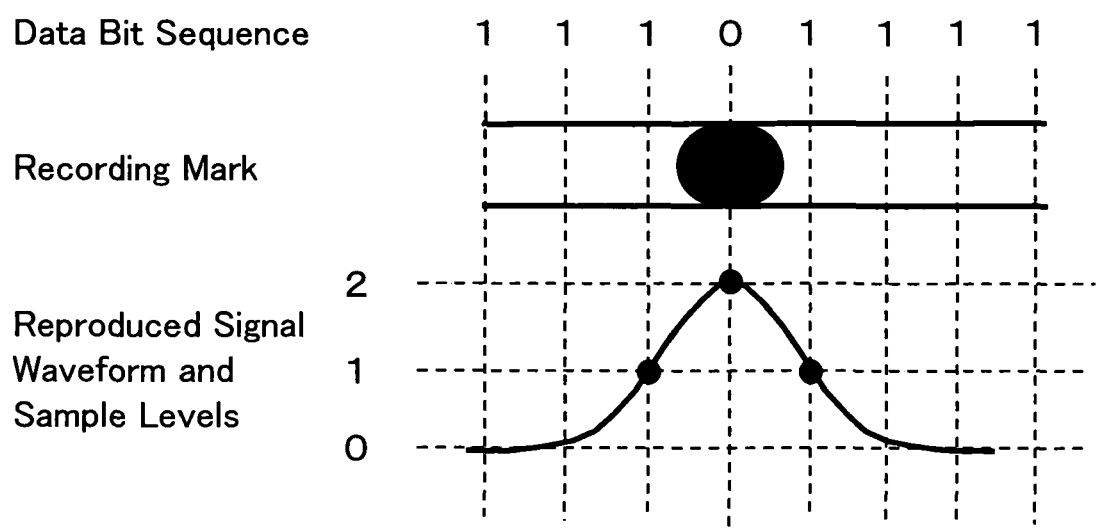
FIG. 33 is an illustration of a reproduced signal waveform in line with PR (1,2,1) in association with a data bit sequence and a recording mark.
Figure 34:
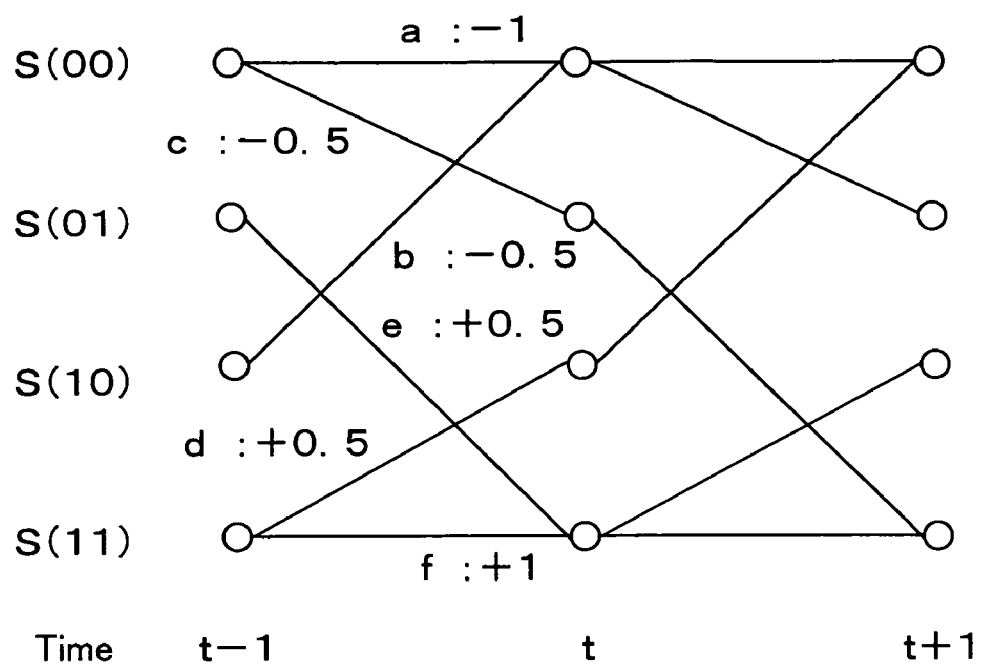
FIG. 34 is a trellis diagram used in Viterbi decoding.

FIG. 32 shows two paths leading to a correct state in a trellis diagram for a second specific pattern of "0001111." The thick sold line is the correct path. The thick broken line is the error path. Similar effects to the embodiments are obtained by utilizing, as the path metric difference Ms1 and the path metric difference Mi1, the path metric difference obtained when the pattern is detected and the path metric difference corresponding to the reverse pattern of the pattern respectively.

In addition, in FIG. 32, the path starts from state S(000) at time t. The path may start from state S(100), still producing similar effects to the embodiments. In addition, the path ends at state S(111) at time t+4. The path may end at state S(110), still producing similar effects to the embodiments. The specific pattern, if containing "00111," may take 0 or 1 in the preceding and succeeding bits. Similarly, the second reverse pattern, if containing "11000," may take 0 or 1 in the preceding and succeeding bits. Similarly to the second specific pattern, the third specific pattern, if containing "00011," may again take 0 or 1 in the preceding and succeeding bits.

In addition, the embodiments have used (1,7) RLL code as the d=1 Run Length Limit code. This is of course never limiting the invention.

In addition, the embodiments have described optical disc devices of optical modulation recording scheme as an example of application of the signal quality evaluation device. This is by no means limiting the present invention which is effective equally in devices where quality evaluation of Viterbi-decodable signals is needed. Specifically, the present invention is applicable to magneto-optical disc devices of optical and magnetic field modulation recording scheme, magnetic disc device, and data communications devices.

In addition, the embodiments have described rewriteable optical discs as an example. The invention is also applicable to quality evaluation of reproduced signals from read-only optical discs (ROM).

In addition, the signal quality evaluation devices $1a$, $1c$, $1d$, the equalization circuit 6, and the write conditions setting circuit 12 may be constructed of hardware, for example, circuitry designed to implement the functions of the members. Alternatively, the members may be either partly or entirely realized by software, in other words, predetermined computer programs executed on a computer. The computer contains a CPU (central processing unit) executing instructions from the computer programs and RAM (random access memory) into which the computer programs are loaded. The computer also retrieves the computer programs from a storage medium containing the computer programs.

Therefore, the objective of the present invention is achieved by loading into a computer a computer-readable storage medium containing program codes of the computer program (execution program, intermediate code program, or source program) and causing the computer to read and execute the program codes contained in the storage medium. In a case like this, the program codes per se which is retrieved from the storage medium realizes the aforementioned functions, and the program codes per se and the storage medium containing the program codes also constitute the present invention.

The storage medium as the program medium is either integrated into the computer or separable from the computer. The storage medium may be a medium which contains the computer program in a fixed manner: for example, a tape, such as a magnetic tape or a cassette tape; a magnetic disc, such as a floppy (registered trademark) disc or a hard disk, or an optical disc, such as a CD-ROM/MO/MD/DVD; a card, such as an IC card (memory card) or an optical card; or a semiconductor memory, such as mask ROM/EPROM/EEPROM/flash ROM.

A signal quality evaluation device in accordance with the present invention is a signal quality evaluation device for evaluating quality of a Viterbi-decodable signal, and to solve the problems, characterized in that the device includes: Viterbi decoding means for Viterbi decoding the signal to generate a decoded bit sequence and to generate a path metric difference obtained in the Viterbi decoding; specific pattern detection means for detecting a specific pattern in the decoded bit sequence; reverse pattern detection means for detecting a reverse pattern of the specific pattern in the decoded bit sequence; and signal quality evaluation means for detecting respective path metric differences for the specific pattern and the reverse pattern from the path metric difference generated by the Viterbi decoding means and results of detection by the specific pattern detection means and the reverse pattern detection means, to evaluate quality of the signal from the respective path metric differences for the specific pattern and the reverse pattern.

A signal quality evaluation method in accordance with the present invention is a method of evaluating quality of a Viterbi-decodable signal, and to solve the problems, characterized in that the method includes the steps of: (a) Viterbi decoding the signal to generate a decoded bit sequence and to generate a path metric difference obtained in the Viterbi decoding; (b) detecting a specific pattern in the decoded bit sequence; (c) detecting a reverse pattern of the specific pattern in the decoded bit sequence; and (d) detecting respective path metric differences for the specific pattern and the reverse pattern from the path metric difference generated in step (a) and results of steps (b) and (c), to evaluate quality of the signal from the respective path metric differences for the specific pattern and the reverse pattern.

With the structure and method, a specific pattern and a reverse pattern are detected in a decoded bit sequence decoded by Viterbi decoding. Path metric differences for these patterns are then detected respectively. The signal quality evaluated from the Path metric differences. A path metric difference is the difference between path metrics for two respective paths one of which will be the survivor path in the decoding of patterns detected in a decoded bit sequence decoded by Viterbi decoding.

Signal quality can be evaluated from the path metric difference for the specific pattern and the path metric difference for the reverse pattern for the following reasons.

The quality of a Viterbi-decodable signal can be evaluated on the basis of the waveform of the signal. Generally, a signal has good quality if its amplitude is symmetric with respect to the amplitude center of the ideal waveform (hereinafter, "0 level"). If the amplitude is asymmetric, the signal has poor quality.

With the ideal waveform, the waveform level of the specific pattern and the waveform level of the reverse pattern are symmetric with respect to the 0 level. Furthermore, the waveform level of the error pattern with respect to the specific pattern and the waveform level of the error pattern with respect to the reverse pattern are symmetric with respect to the 0 level.

Therefore, the amplitude asymmetry in the signal which is the evaluation target appears in the relationship between the path metric difference for the specific pattern and the path metric difference for the reverse pattern. In other words, the smaller the difference between the path metric difference for the specific pattern and the path metric difference for the reverse pattern, the smaller the amplitude asymmetry in the signal waveform; the larger the difference between the path metric difference for the specific pattern and the path metric difference for the reverse pattern, the larger the amplitude asymmetry in the signal waveform.

By utilizing these properties, the quality of the signal can be evaluated from the path metric difference for the specific pattern and the path metric difference for the reverse pattern.

As described in the foregoing, unlike the signal quality conventional evaluation technique where consideration is given only to the bit sequence with which the probability of SAM<0 is highest due to noise, in other words, the bit sequence with a minimum ideal SAM value, the above structure and method is capable of evaluation with amplitude asymmetry in the signal being considered. The structure and method is therefore more accurate in signal quality evaluation.

The signal quality evaluation device in accordance with the present invention may be the signal quality evaluation device and arranged so that the signal quality evaluation means evaluates the quality of the signal using a differential value which is a difference between the path metric difference for the specific pattern and the path metric difference for the reverse pattern.

The signal quality evaluation device in accordance with the present invention may be the signal quality evaluation device and arranged so that the signal quality evaluation means evaluates the quality of the signal using a differential value which is a difference between an average value of path metric differences for the specific pattern and an average value of path metric differences for the reverse pattern.

The signal quality evaluation device in accordance with the present invention may be the signal quality evaluation device and arranged so that: the specific pattern detection means detects a first specific pattern in the decoded bit sequence; the reverse pattern detection means detects in the decoded bit sequence a first reverse pattern which is a reverse pattern of the first specific pattern; and the signal quality evaluation means detects a first specific pattern path metric difference for the first specific pattern and a first reverse pattern path metric difference for the first reverse pattern and calculates a first differential value which is a differential value between the first specific pattern path metric difference and the first reverse pattern path metric difference, to evaluate the quality of the signal using the first differential value as an evaluation index.

The signal quality evaluation device in accordance with the present invention may be the signal quality evaluation device and arranged so that: the specific pattern detection means detects a first specific pattern in the decoded bit sequence; the reverse pattern detection means detects in the decoded bit sequence a first reverse pattern which is a reverse pattern of the first specific pattern; the signal quality evaluation means detects first specific pattern path metric differences for the first specific pattern and first reverse pattern path metric differences for the first reverse pattern and calculates a first differential value which is a differential value between an average value of the first specific pattern path metric differences and an average value of the first reverse pattern path metric differences, to evaluate the quality of the signal using the first differential value as an evaluation index.

With the structure, by the evaluation using the first differential value as an evaluation index, it is determined whether or not the signal quality is satisfactory by comparing the first differential value to a predetermined reference.

The signal quality evaluation device in accordance with the present invention may be the signal quality evaluation device and arranged so that: the specific pattern detection means detects first and second specific patterns which are different from each other in the decoded bit sequence; the reverse pattern detection means detects first and second reverse patterns of the respective first and second specific patterns in the decoded bit sequence; and the signal quality evaluation means detects first and second specific pattern path metric differences for the respective first and second specific patterns and first and second reverse pattern path metric differences for the respective first and second reverse patterns, calculates first and second differential values which are differential values respectively between the first and second specific pattern path metric differences and the associated first and second reverse pattern path metric differences, and computes from the first and second differential values, to evaluate the quality of the signal using a result of the computation as an evaluation index.

The signal quality evaluation device in accordance with the present invention may be the signal quality evaluation device and arranged so that: the specific pattern detection means detects first and second specific patterns which are different from each other in the decoded bit sequence; the reverse pattern detection means detects first and second reverse patterns of the respective first and second specific patterns in the decoded bit sequence; and the signal quality evaluation means detects first and second specific pattern path metric differences for the respective first and second specific patterns and first and second reverse pattern path metric differences for the respective first and second reverse patterns, calculates first and second differential values which are differential values respectively between an average value of the first and second specific pattern path metric differences and an average value of the associated first and second reverse pattern path metric differences, and computes from the first and second differential values, to evaluate the quality of the signal using a result of the computation as an evaluation index.

The differential value between the path metric difference for the specific pattern and the path metric difference for the reverse pattern may vary due to variation in DC offset of the signal and other variations.

Accordingly, with the structure, the computation is done using the first and second differential values. Through the computation using the first and second differential values which vary due to variation in DC offset of the signal and other variations in this manner, the variations of the first and second differential values can be cancelled out. Accordingly, an evaluation index is thus obtained which is hardly affected by a signal DC offset. The quality evaluation of the signal is improved in accuracy.

The signal quality evaluation device in accordance with the present invention may be the signal quality evaluation device and arranged so that: the specific pattern detection means detects first, second, and third specific patterns which are different from each other in the decoded bit sequence; the reverse pattern detection means detects first, second, and third reverse patterns of the respective first, second, and third specific patterns in the decoded bit sequence; the signal quality evaluation means detects first, second, and third specific pattern path metric differences for the respective first, second, and third specific patterns and first, second, and third reverse pattern path metric differences for the respective first, second, and third reverse patterns, calculates first, second, and third differential values which are differential values respectively between the first, second, and third specific pattern path metric differences and the associated first, second, and third reverse pattern path metric differences, and computes from the first, second, and third differential values, to evaluate the quality of the signal using a result of the computation as an evaluation index.

The signal quality evaluation device in accordance with the present invention may be the signal quality evaluation device and arranged so that: the specific pattern detection means detects first, second, and third specific patterns which are different from each other in the decoded bit sequence; the reverse pattern detection means detects first, second, and third reverse patterns of the respective first, second, and third specific patterns in the decoded bit sequence; and the signal quality evaluation means detects first, second, and third specific pattern path metric differences for the respective first, second, and third specific patterns and first, second, and third reverse pattern path metric differences for the respective first, second, and third reverse patterns, calculates first, second, and third differential values which are differential values respectively between an average value of the first, second, and third specific pattern path metric differences and an average value of the associated first, second, and third reverse pattern path metric differences, and computes from the first, second, and third differential values, to evaluate the quality of the signal using a result of the computation as an evaluation index.

The differential value between the path metric difference for the specific pattern and the path metric difference for the reverse pattern may vary due to variation in DC offset of the signal and other variations.

Accordingly, with the structure, the computation is done using the first, second, and third differential values. Through the computation using the first, second, and third differential values which vary due to variation in DC offset of the signal and other variations in this manner, the variations of the differential values are cancelled out. Accordingly, an evaluation index is thus obtained which is hardly affected by a signal DC offset. The quality evaluation of the signal is improved in accuracy.

The signal quality evaluation device in accordance with the present invention may be the signal quality evaluation device and arranged so that in the evaluation, the signal quality evaluation means normalizes the evaluation index so that the evaluation index remains constant despite a change in amplitude of the signal.

The evaluation indices may vary due to a change in amplitude of the signal. Accordingly, with the structure, one of the evaluation indices is normalized so that the evaluation index remains constant despite a change in amplitude of the signal. The quality evaluation of the signal is improved in accuracy.

For the normalization, the evaluation index is divided by a path metric difference which is in proportional to a change in amplitude.

The signal quality evaluation device in accordance with the present invention may be the signal quality evaluation device and arranged so that the signal quality evaluation means determines whether or not the quality of the signal is satisfactory in accordance with whether the evaluation index is within a predetermined tolerance range.

With the structure, it is determined whether or not the quality of the signal is satisfactory in accordance with whether the evaluation index is within a predetermined tolerance range. The tolerance range may be, for example, a range with a center at 0.

The first specific pattern desirably contains "000000." The second specific pattern desirably contains either "00111" or "00011." The third specific pattern is desirably "00011" if the second specific pattern contains "00111" and "00111" if the second specific pattern contains "00011."

The signal quality evaluation device in accordance with the present invention may be the signal quality evaluation device and is arranged so that the signal quality evaluation means calculates a frequency distribution of the path metric differences for the specific pattern and a frequency distribution of the path metric differences for the reverse pattern to evaluate the quality of the signal on the basis of the frequency distributions.

An information read/write device in accordance with the present invention is an information read/write device for reading and writing information on a storage medium, and to solve the problems, characterized in that the device includes: reading means for reading information from the storage medium to generate a reproduced signal; writing means for writing information to the storage medium; any one of the signal quality evaluation device for evaluating the quality of the reproduced signal; and write condition setting means for specifying, on the basis of a result of evaluation by the signal quality evaluation device, a write condition under which the writing means writes the information.

A write condition determining method in accordance with the present invention is a method of determining a write condition under which information is written to a storage medium, and to solve the problems, characterized in that the method includes the steps of: (m) writing information to a storage medium under a write condition; (n) reading information from the storage medium to generate a reproduced signal; (o) evaluating quality of the reproduced signal by the signal quality evaluation method mentioned above; and (p) determining whether or not the write condition is suited on the basis of a result of evaluation in step (o) so as to, if the condition is determined to be suited, determine the write condition as a write condition to be employed.

With the structure and method, a storage medium is subjected to test write operation under a write condition. The test-written information is read to generate a reproduced signal. The quality of the reproduced signal is evaluated by the signal quality evaluation method to determine whether or not the write condition is suited. By repeating the procedure, a suitable write condition can be found.

The information read/write device in accordance with the present invention may be the information read/write device and arranged so that the write condition setting means performs predetermined computation on the write condition obtained on the basis of the result of evaluation by the signal quality evaluation device, to specify a result of the computation as the write condition under which the writing means writes the information.

With the structure, even if the write condition obtained on the basis of a result of evaluation by the signal quality evaluation device does not match with the write condition under which the actual error rate is a minimum, a suitable write condition is specified by the computation.

The information read/write device in accordance with the present invention may be the information read/write device and arranged so that: the storage medium stores computation information for use in the computation; and the write condition setting means retrieves the computation information for use. Alternatively, the information read/write device in accordance with the present invention may be the information read/write device and arranged so that: the information read/write device has memory means storing computation information for use in the computation; and the write condition setting means retrieves the computation information from the memory means for use.

The information read/write device in accordance with the present invention may be the information read/write device and arranged so that the write condition setting means specifies at least write power as the write condition.

Results of the evaluation are varied greatly by insufficient or excess write power among other write conditions. It is therefore desirable if the write power is specified on the basis of results of the evaluation as with the structure.

Any of the signal quality evaluation devices may be operated by a signal quality evaluation program causing a computer functions as each of the means. The program may be stored on a computer-readable storage medium.

The present invention is widely applicable to devices and methods which evaluate Viterbi-decodable signal quality: for example, optical disc devices, magneto-optical disc devices, magnetic disc devices, and data communications devices.

The features of the present invention may be described as follows.

A reproduced signal evaluation method in accordance with the present invention includes the steps of: generating a path metric difference while decoding a bit sequence by Viterbi decoding; detecting a specific pattern in the bit sequence decoded by the Viterbi decoding; detecting a reverse pattern of the specific pattern in the bit sequence decoded by the Viterbi decoding; extracting a first path metric difference which is a path metric difference for the specific pattern; extracting a second path metric difference which is a path metric difference for the reverse pattern; and evaluating a reproduced signal on the basis of the first path metric difference and the second path metric difference.

The reproduced signal evaluation method in accordance with the present invention is the method above and arranged so that the reproduced signal is evaluated using an evaluation index obtained on the basis of relationship between the first path metric difference and the second path metric difference.

The reproduced signal evaluation method in accordance with the present invention is the method above and arranged so that the evaluation index is obtained on the basis of a differential value which is a difference between an average value of the first path metric difference and an average value of the second path metric difference.

The reproduced signal evaluation method in accordance with the present invention is the method above and arranged so that a first specific pattern containing "000000" is used as the specific pattern.

The reproduced signal evaluation method in accordance with the present invention is the method above and arranged so that a second specific pattern containing "00111" is used as the specific pattern.

The reproduced signal evaluation method in accordance with the present invention is the method above and arranged so that a third specific pattern containing "00011" is used as the specific pattern.

The reproduced signal evaluation method in accordance with the present invention is the method above and arranged so that the differential value when the specific pattern is a first specific pattern is a first differential value; the differential value when the specific pattern is a second specific pattern is a second differential value; the differential value when the specific pattern is a third specific pattern is a third differential value; and the reproduced signal is evaluated using an evaluation index obtained on the basis of relationship between the first differential value, the second differential value, and/or the third differential value.

The reproduced signal evaluation method in accordance with the present invention is the method above and arranged so that the reproduced signal is evaluated using an evaluation index obtained on the basis of (i) at least one of an average value of the first path metric difference when the specific pattern is a second specific pattern, an average value of the second path metric difference when the reverse pattern is a reverse pattern of the second specific pattern, an average value of the first path metric difference when the specific pattern is a third specific pattern, and an average value of the second path metric difference when the reverse pattern is a reverse pattern of the third specific pattern and (ii) a combination containing at least the first differential value among combinations of the first differential value, the second differential value, and the third differential value.

A write condition specify method in accordance with the present invention specifies a write condition on the basis of an evaluation index provided by the reproduced signal evaluation method.

The write condition specify method in accordance with the present invention is the method above and arranged so that at least write power is contained as the write condition.

A read/write device in accordance with the present invention includes: Viterbi decoding means for generating a path metric difference while decoding a bit sequence by Viterbi decoding; specific pattern detection means for detecting a specific pattern in the bit sequence decoded by the Viterbi decoding; reverse pattern detection means for detecting a reverse pattern of the specific pattern in the bit sequence decoded by the Viterbi decoding; first path metric difference extracting means for extracting a first path metric difference which is a path metric difference for the specific pattern; second path metric difference extracting means for extracting a second path metric difference which is a path metric difference for the reverse pattern; and reproduced signal evaluation means for evaluating a reproduced signal on the basis of the first path metric difference and the second path metric difference.

The read/write device in accordance with the present invention has the structure above and is arranged so that the reproduced signal evaluation means evaluates the reproduced signal using an evaluation index obtained on the basis of relationship between the first path metric difference and the second path metric difference.

The read/write device in accordance with the present invention has the structure above and is arranged so that the reproduced signal evaluation means evaluates the reproduced signal using: first average value calculation means for calculating a first average value which is an average of the first path metric difference extracted by the first path metric difference extracting means; second average value calculation means for calculating a second average value which is an average of the second path metric difference extracted by the second path metric difference extracting means; and an evaluation index obtained on the basis of a differential value which is a difference between the first average value and the second average value.

The read/write device in accordance with the present invention has the structure above and is arranged so that a first specific pattern containing "000000" is used as the specific pattern.

The read/write device in accordance with the present invention has the structure above and is arranged so that the device includes write condition determine means for determining a write condition on the basis of the evaluation index.

A control computer program in accordance with the present invention operates the read/write device and causes a computer to function as each of the means.

A storage medium in accordance with the present invention is a computer-readable storage medium containing the control program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A signal quality evaluation device for evaluating quality of a Viterbi-decodable signal, comprising:
    Viterbi decoding means for Viterbi decoding the signal to generate a decoded bit sequence and to generate a path metric difference obtained in the Viterbi decoding;
    specific pattern detection means for detecting a specific pattern in the decoded bit sequence;
    reverse pattern detection means for detecting a reverse pattern of the specific pattern in the decoded bit sequence; and
    signal quality evaluation means for detecting respective path metric differences for the specific pattern and the reverse pattern from the path metric difference generated by the Viterbi decoding means and results of detection by the specific pattern detection means and the reverse pattern detection means, to evaluate quality of the signal from the respective path metric differences for the specific pattern and the reverse pattern.

2. The signal quality evaluation device of claim 1, wherein the signal quality evaluation means evaluates the quality of the signal using a differential value which is a difference between the path metric difference for the specific pattern and the path metric difference for the reverse pattern.

3. The signal quality evaluation device of claim 1, wherein
the signal quality evaluation means evaluates the quality of the signal using a differential value which is a difference between an average value of path metric differences for the specific pattern and an average value of path metric differences for the reverse pattern.

4. The signal quality evaluation device of claim 1, wherein:
the specific pattern detection means detects a first specific pattern in the decoded bit sequence;
the reverse pattern detection means detects in the decoded bit sequence a first reverse pattern which is a reverse pattern of the first specific pattern; and
the signal quality evaluation means detects a first specific pattern path metric difference for the first specific pattern and a first reverse pattern path metric difference for the first reverse pattern and calculates a first differential value which is a differential value between the first specific pattern path metric difference and the first reverse pattern path metric difference, to evaluate the quality of the signal using the first differential value as an evaluation index.

5. The signal quality evaluation device of claim 1, wherein:
the specific pattern detection means detects a first specific pattern in the decoded bit sequence;
the reverse pattern detection means detects in the decoded bit sequence a first reverse pattern which is a reverse pattern of the first specific pattern; and
the signal quality evaluation means detects first specific pattern path metric differences for the first specific pattern and first reverse pattern path metric differences for the first reverse pattern and calculates a first differential value which is a differential value between an average value of the first specific pattern path metric differences and an average value of the first reverse pattern path metric differences, to evaluate the quality of the signal using the first differential value as an evaluation index.

6. The signal quality evaluation device of claim 1, wherein:
the specific pattern detection means detects first and second specific patterns which are different from each other in the decoded bit sequence;
the reverse pattern detection means detects first and second reverse patterns of the respective first and second specific patterns in the decoded bit sequence; and
the signal quality evaluation means detects first and second specific pattern path metric differences for the respective first and second specific patterns and first and second reverse pattern path metric differences for the respective first and second reverse patterns, calculates first and second differential values which are differential values respectively between the first and second specific pattern path metric differences and the associated first and second reverse pattern path metric differences, and computes from the first and second differential values, to evaluate the quality of the signal using a result of the computation as an evaluation index.

7. The signal quality evaluation device of claim 1, wherein:
the specific pattern detection means detects first and second specific patterns which are different from each other in the decoded bit sequence;
the reverse pattern detection means detects first and second reverse patterns of the respective first and second specific patterns in the decoded bit sequence; and
the signal quality evaluation means detects first and second specific pattern path metric differences for the respective first and second specific patterns and first and second reverse pattern path metric differences for the respective first and second reverse patterns, calculates first and second differential values which are differential values respectively between an average value of the first and second specific pattern path metric differences and an average value of the associated first and second reverse pattern path metric differences, and computes from the first and second differential values, to evaluate the quality of the signal using a result of the computation as an evaluation index.

8. The signal quality evaluation device of claim 1, wherein:
the specific pattern detection means detects first, second, and third specific patterns which are different from each other in the decoded bit sequence;
the reverse pattern detection means detects first, second, and third reverse patterns of the respective first, second, and third specific patterns in the decoded bit sequence; and
the signal quality evaluation means detects first, second, and third specific pattern path metric differences for the respective first, second, and third specific patterns and first, second, and third reverse pattern path metric differences for the respective first, second, and third reverse patterns, calculates first, second, and third differential values which are differential values respectively between the first, second, and third specific pattern path metric differences and the associated first, second, and third reverse pattern path metric differences, and computes from the first, second, and third differential values, to evaluate the quality of the signal using a result of the computation as an evaluation index.

9. The signal quality evaluation device of claim 1, wherein:
the specific pattern detection means detects first, second, and third specific patterns which are different from each other in the decoded bit sequence;
the reverse pattern detection means detects first, second, and third reverse patterns of the respective first, second, and third specific patterns in the decoded bit sequence; and
the signal quality evaluation means detects first, second, and third specific pattern path metric differences for the respective first, second, and third specific patterns and first, second, and third reverse pattern path metric differences for the respective first, second, and third reverse patterns, calculates first, second, and third differential values which are differential values respectively between an average value of the first, second, and third specific pattern path metric differences and an average value of the associated first, second, and third reverse pattern path metric differences, and computes from the first, second, and third differential values, to evaluate the quality of the signal using a result of the computation as an evaluation index.

10. The signal quality evaluation device of claim 4, wherein
in the evaluation, the signal quality evaluation means normalizes the evaluation index so that the evaluation index remains constant despite a change in amplitude of the signal.

11. The signal quality evaluation device of claim 5, wherein
in the evaluation, the signal quality evaluation means normalizes the evaluation index so that the evaluation index remains constant despite a change in amplitude of the signal.

12. The signal quality evaluation device of claim 6, wherein
in the evaluation, the signal quality evaluation means normalizes the evaluation index so that the evaluation index remains constant despite a change in amplitude of the signal.

13. The signal quality evaluation device of claim 7, wherein
in the evaluation, the signal quality evaluation means normalizes the evaluation index so that the evaluation index remains constant despite a change in amplitude of the signal.

14. The signal quality evaluation device of claim 8, wherein
in the evaluation, the signal quality evaluation means normalizes the evaluation index so that the evaluation index remains constant despite a change in amplitude of the signal.

15. The signal quality evaluation device of claim 9, wherein
in the evaluation, the signal quality evaluation means normalizes the evaluation index so that the evaluation index remains constant despite a change in amplitude of the signal.

16. The signal quality evaluation device of claim 4, wherein
the signal quality evaluation means determines whether or not the quality of the signal is satisfactory in accordance with whether the evaluation index is within a predetermined tolerance range.

17. The signal quality evaluation device of claim 5, wherein
the signal quality evaluation means determines whether or not the quality of the signal is satisfactory in accordance with whether the evaluation index is within a predetermined tolerance range.

18. The signal quality evaluation device of claim 6, wherein
the signal quality evaluation means determines whether or not the quality of the signal is satisfactory in accordance with whether the evaluation index is within a predetermined tolerance range.

19. The signal quality evaluation device of claim 7, wherein
the signal quality evaluation means determines whether or not the quality of the signal is satisfactory in accordance with whether the evaluation index is within a predetermined tolerance range.

20. The signal quality evaluation device of claim 8, wherein
the signal quality evaluation means determines whether or not the quality of the signal is satisfactory in accordance with whether the evaluation index is within a predetermined tolerance range.

21. The signal quality evaluation device of claim 9, wherein
the signal quality evaluation means determines whether or not the quality of the signal is satisfactory in accordance with whether the evaluation index is within a predetermined tolerance range.

22. The signal quality evaluation device of claim 16, wherein
the tolerance range is a range with a center at 0.

23. The signal quality evaluation device of claim 17, wherein
the tolerance range is a range with a center at 0.

24. The signal quality evaluation device of claim 18, wherein
the tolerance range is a range with a center at 0.

25. The signal quality evaluation device of claim 19, wherein
the tolerance range is a range with a center at 0.

26. The signal quality evaluation device of claim 20, wherein
the tolerance range is a range with a center at 0.

27. The signal quality evaluation device of claim 21, wherein
the tolerance range is a range with a center at 0.

28. The signal quality evaluation device of claim 4, wherein
the first specific pattern contains "000000."

29. The signal quality evaluation device of claim 5, wherein
the first specific pattern contains "000000."

30. The signal quality evaluation device of claim 6, wherein
the first specific pattern contains "000000."

31. The signal quality evaluation device of claim 7, wherein
the first specific pattern contains "000000."

32. The signal quality evaluation device of claim 8, wherein
the first specific pattern contains "000000."

33. The signal quality evaluation device of claim 9, wherein
the first specific pattern contains "000000."

34. The signal quality evaluation device of claim 6, wherein
the second specific pattern contains either "00111" or "00011."

35. The signal quality evaluation device of claim 7, wherein
the second specific pattern contains either "00111" or "00011."

36. The signal quality evaluation device of claim 8, wherein
the second specific pattern contains either "00111" or "00011."

37. The signal quality evaluation device of claim 9, wherein
the second specific pattern contains either "00111" or "00011."

38. The signal quality evaluation device of claim 8, wherein
the second specific pattern contains either "00111" or "00011," the third specific pattern is "00011" if the second specific pattern is "00111" and "00111" if the second specific pattern is "00011."

39. The signal quality evaluation device of claim 9, wherein
the second specific pattern contains either "00111" or "00011," the third specific pattern is "00011" if the second specific pattern is "00111" and "00111" if the second specific pattern is "00011."

40. The signal quality evaluation device of claim 1, wherein
the signal quality evaluation means calculates a frequency distribution of the path metric differences for the specific pattern and a frequency distribution of the path metric differences for the reverse pattern to evaluate the quality of the signal on the basis of the frequency distributions.

41. A method of evaluating quality of a Viterbi-decodable signal, comprising the steps of:
  (a) Viterbi decoding the signal to generate a decoded bit sequence and to generate a path metric difference obtained in the Viterbi decoding;
  (b) detecting a specific pattern in the decoded bit sequence;
  (c) detecting a reverse pattern of the specific pattern in the decoded bit sequence; and
  (d) detecting respective path metric differences for the specific pattern and the reverse pattern from the path metric difference generated in step (a) and results of steps (b) and (c), to evaluate quality of the signal from the respective path metric differences for the specific pattern and the reverse pattern.

42. A computer program for signal quality evaluation embodied in a computer-readable storage medium, causing a computer to operate as the signal quality evaluation device of claim 1,
  the program causing the computer to function as each of the means.

43. A signal quality evaluation device for evaluating quality of a Viterbi-decodable signal, comprising:
  a Viterbi decoding circuit for Viterbi decoding the signal to generate a decoded bit sequence and to generate a path metric difference obtained in the Viterbi decoding;
  a specific pattern detection circuit for detecting a specific pattern in the decoded bit sequence;
  a reverse pattern detection circuit for detecting a reverse pattern of the specific pattern in the decoded bit sequence; and
  a signal quality evaluation circuit for detecting respective path metric differences for the specific pattern and the reverse pattern from the path metric difference generated by the Viterbi decoding circuit and results of detection by the specific pattern detection circuit and the reverse pattern detection circuit, to evaluate quality of the signal from the respective path metric differences for the specific pattern and the reverse pattern.

44. The signal quality evaluation device of claim 1, wherein the signal quality evaluation means calculates an evaluation value which reflects a difference between the path metric difference for the specific pattern and the path metric difference for the reverse pattern, and which indicates amplitude asymmetry of the signal so as to evaluate the quality of the signal on the basis of the evaluation value.

45. The method of claim 41, wherein in step (d), an evaluation value is calculated which reflects a difference between the path metric difference for the specific pattern and the path metric difference for the reverse pattern, and which indicates amplitude asymmetry of the signal so as to evaluate the quality of the signal on the basis of the evaluation value.

46. The signal quality evaluation device of claim 43, wherein the signal quality evaluation circuit calculates an evaluation value which reflects a difference between the path metric difference for the specific pattern and the path metric difference for the reverse pattern, and which indicates amplitude asymmetry of the signal so as to evaluate the quality of the signal on the basis of the evaluation value.

* * * * *